United States Patent [19]
Suzuki et al.

[11] Patent Number: 5,959,704
[45] Date of Patent: Sep. 28, 1999

[54] DISPLAY DEVICE HAVING DIFFRACTION GRATING

[75] Inventors: Toshihiro Suzuki; Yukio Iigahama; Hisashi Yamaguchi; Takeshi Gotoh; Tetsuya Hamada; Keiji Hayashi; Junji Tomita; Hirokazu Aritake; Tetsuya Kobayashi; Mari Sugawara; Motohiko Fukuhara; Koji Yoshioka; Kazuhiro Takahara, all of Kawasaki, Japan

[73] Assignee: Fujitsu Limited, Kawasaki, Japan

[21] Appl. No.: 08/741,258

[22] Filed: Oct. 30, 1996

[30] Foreign Application Priority Data

Feb. 8, 1996 [JP] Japan ................................. 8-022511
Jun. 4, 1996 [JP] Japan ................................. 8-141834

[51] Int. Cl.⁶ .......................... G02F 1/1335; G03B 21/14
[52] U.S. Cl. ........................... 349/9; 349/5; 349/95; 349/104; 353/38
[58] Field of Search ........................... 349/9, 5, 95, 117, 349/104; 353/38, 102

[56] References Cited

U.S. PATENT DOCUMENTS

| 5,132,811 | 7/1992 | Iwaki et al. | 349/27 |
| 5,299,289 | 3/1994 | Omae et al. | 349/41 |
| 5,355,187 | 10/1994 | Ogino et al. | 349/57 |
| 5,519,518 | 5/1996 | Watanabe et al. | 349/57 |
| 5,526,147 | 6/1996 | Omae et al. | 349/8 |
| 5,648,860 | 7/1997 | Ooi et al. | 349/10 |
| 5,737,040 | 4/1998 | Ichikawa et al. | 349/9 |
| 5,777,804 | 7/1998 | Nakamura et al. | 349/4 |

FOREIGN PATENT DOCUMENTS

| 62-293222 | 12/1987 | Japan . |
| 62-293223 | 12/1987 | Japan . |
| 1265228 | 10/1989 | Japan . |
| 341417 | 2/1991 | Japan . |
| 651262 | 2/1994 | Japan . |
| 6317794 | 11/1994 | Japan . |
| 6324329 | 11/1994 | Japan . |
| 7140886 | 6/1995 | Japan . |
| 7234316 | 9/1995 | Japan . |

OTHER PUBLICATIONS

Asia Display '95–pp. 727–729, "532–1 Holographic Ophinl Element For Liquid Ctystal Projector," Ichikawa.

Primary Examiner—William L. Sikes
Assistant Examiner—Toan Ton
Attorney, Agent, or Firm—Greer, Burns & Crain Ltd.

[57] ABSTRACT

A display device including a diffraction grating from which a diffracted light of the zeroth order and a diffracted light of the first order having different color light components emerge to establish color separation. An array of microlenses is arranged on a liquid crystal panel. The liquid crystal panel has a plurality of picture elements and each picture element includes a plurality of color display dots. The color display dots in each picture element are arranged in the vertical relationship and in the order of wavelength of the light. A green light component of diffracted light of the first order is made incident normal to the liquid crystal panel, and the diffracted light of the zeroth order passes through the liquid crystal panel at a greater angle relative to the normal to the liquid crystal panel.

19 Claims, 50 Drawing Sheets

DISPLAY DEVICE HAVING DIFFRACTION GRATING

BACKGROUND OF THE INVENTION

1. Field of the Invention

The present invention relates to a display device having a diffraction grating to separate an incident light into color light components to establish color separation and a transmission type light valve such as liquid crystal panel to receive the diffracted light for realizing a color display. The present invention also relates to a display device having a light source adapted to provide parallel light beams to a diffraction grating. The present invention also relates to a display device having a diffraction grating to separate an incident light into color light components and a polarization separation means enabling the separated light to be used.

2. Description of the Related Art

A color display device comprises a light valve such as a liquid crystal panel which has a color filter having red, green and blue portions. The display device also has display electrodes corresponding to the red, green and blue portions of the color filter, so that a light passing through a certain color portion passes through the corresponding display electrode or is blocked by the corresponding display electrode by controlling a voltage on or off. The color filter allows a light component having a particular color bandwidth of wavelength to pass therethrough and does not allow the remaining light components therethrough, the remaining light components being reflected or absorbed. Therefore, a viewer can see the transmitted light component having a particular color bandwidth or wavelength. A problem in this type of color display device resides in that a portion of the light which passes through the color filter is used but the remaining portion of the light is not used.

A color display device using a diffraction grating, in place of a color filter, is disclosed, for example, in Japanese Unexamined Patent Publication (Kokai) No. 62-293222 and No. 62-293223.

The diffraction grating separates an incident light such as natural light into a diffracted light of a zeroth order which is not substantially diffracted, a diffracted light of first order having different color light components having respective color bandwidths or wavelengths, a diffracted light of second order and so on. If the diffracted light of zeroth order and diffracted light of first order can be effectively used, it is expected that efficiency of available light can be increased, compared with the case using the color filter. However, it is difficult to match the diffracted light of zeroth order and the diffracted light of first order with the pitch of the display electrodes, since the diffracted light of zeroth order and the diffracted light of first order emerge from the diffraction grating at different angles. If a portion of the diffracted light of zeroth order and the diffracted light of first order is not used for display and emerges from the display device in an uncontrolled manner, an image with high quality cannot be realized.

In the above described Japanese Unexamined Patent Publication (Kokai) No. 62-293222, the display electrodes of the liquid crystal panel are formed so that light components having red, green and blue bandwidth or wavelength of the diffracted light of first order pass through the display electrodes and the diffracted light of zeroth order is directed to a shading portion of the liquid crystal panel. In this case, the shading portion is arranged at a position between the red, green and blue display electrodes of one picture element or at a position just adjacent to the red, green and blue display electrodes of one picture element.

Therefore, the diffracted light of zeroth order and the diffracted light of first order are made incident to a region within one picture element. However, it is difficult to arrange that the diffracted light of zeroth order and the diffracted light of first order impinge against the surface of the liquid crystal panel at a constant pitch, since the angle between the diffracted light of zeroth order and the diffracted light of first order is different from angles between the light components of the diffracted light of first order. Therefore, it is difficult to form the respective color display electrodes of one picture element so that the display electrodes have an identical shape and are arranged at a constant pitch. Therefore, it is difficult to form many, small picture elements within a certain display area. In addition, if the diffracted light of first order on the ± sides is to be used, the difference of the incident angle to the liquid crystal panel becomes larger.

In the above described Japanese Unexamined Patent Publication (Kokai) No. 62-293223, light components having red and blue bandwidths or wavelength of the diffracted light of first order passing through the diffraction grating are used but the light component having the green bandwidth of wavelength of the diffracted light of first order is not used; The diffracted light of zeroth order is used to realize a green color. However, the incident light must include a large amount of the light component having the green bandwidth or wavelength since the diffracted light of zeroth order is substantially identical to the incident light made incident to the diffraction grating, so the amounts of the light components having red and blue bandwidths or wavelength of the diffracted light of first order is reduced.

Also, in the case too, it is difficult for the diffracted light of the zeroth order and the diffracted light of the first order to impinge against the surface of the liquid crystal panel at a constant pitch, since the angle between the diffracted light of zeroth order and the diffracted light of first order is different from angles between the light components of the diffracted light of first order. Therefore, it is difficult to obtain a display device with high definition. In this case, particularly, the light component having the green bandwidth or wavelength of the diffracted light is shaded, but this light component is located at the center of the region in which the diffracted light of first order is distributed. Therefore, the shading portion must be provided in a narrow region between the red and blue display electrodes.

In the display device having the diffraction grating to separate an incident light into color light components, it is desirable that light beams are as parallel as possible to each other and parallel beams are made incident to the diffraction grating.

In the liquid crystal display device, a polarizer and an analyzer are usually used with a liquid source, and generates heat by absorbing the light. Particularly, in the projection type display device, it is necessary to use a strong light source, so the amount of heat generated by the polarizer increases and it is necessary to cool the polarizer.

The polarizer absorbs approximately one half of the light from the source, and the absorbed light is not used, so the efficiency of the available light is reduced. Therefore, means for improving the efficiency of the available light is required. For example, Japanese Unexamined Patent Publication (Kokai) No. 6-324329 discloses a liquid crystal display device having a polarization beam splitter and an array of micro-lenses. According to this arrangement, it is possible to use both the P-polarized light and the S-polarized separated by the polarization beam splitter. However, it is further desired to more and more effectively use the separated P- and S-polarized lights.

SUMMARY OF THE INVENTION

The object of the present invention is to provide a display device having a diffraction grating which can realize a high definition display, by effectively treating a diffracted light of zeroth order and a diffracted light of first order passing through the diffraction grating.

Another object of the present invention is to provide a projection type display device having a diffraction grating and a light source which can supply light beams as parallel as possible to the diffraction grating.

A further object of the present invention is to provide a display device in which the disposition of display dots is improved to provide a high definition display.

According to one aspect of the present invention, there is provided a display device having a diffraction grating arranged such that a diffracted light of the zeroth order and a diffracted light of the first order having different color light components emerge from the diffraction grating, a condenser means, and a light valve arranged to receive the light passing through the diffraction grating and the condenser means to modulate the light to form an image. The light valve has a plurality of minute unit regions, each unit region including a plurality of color display dots, the display dots in each unit region being arranged in a vertical relationship and in the order of wavelength of the light. An incident angle of the diffracted light of zeroth order made incident to the light valve is greater than incident angles of the color light components of diffracted light of first order made incident to the light valve. The diffracted light of first order diffracted at a certain area of the diffraction grating passes through the display dots in one unit region. The diffracted light of the zeroth order passing through said certain area of the diffraction grating passes through a different unit region from said one unit region.

In this arrangement, the display dots in one unit region constitute one picture element. The diffracted light of the zeroth order passes through the different unit region from the unit region through which the diffracted light of first order passes. Therefore, the diffracted light of the zeroth order passes through the light valve at a greater angle relative to the normal to the display surface, and the diffracted light of first order passes through the light valve at a smaller angle relative to the normal to the display surface. Therefore, it is possible to arrange the display device such that the angles between the different color light components of the diffracted light of first order are identical to each other and the display dots of the light valve are thus arranged at a constant pitch and have an identical size. Since the diffracted light of the zeroth order passes through the light valve at a greater angle relative to the normal to the display surface, a viewer does see the diffracted light of zeroth order within a usual field of vision and the display produced by the diffracted light of first order is not affected by the diffracted light of zeroth order. Therefore, it is possible to obtain a display device with high quality and high definition.

In particular, the display dots in each unit region are arranged in the vertical relationship and in the order of wavelength of the light. By the arrangement in this manner, the diffracted light of zeroth order passes obliquely upward or obliquely downward through the light valve. In the display device, a viewing angle is one direction in which a good image can be seen is relatively wide but a viewing angle in the other direction perpendicular to the former one direction in which a good image can be seen is relatively narrow. It is usual that the direction in which the viewing angle is wide is arranged horizontally, and the direction in which the viewing angle is narrow is arranged vertically. Therefore, the diffracted light of zeroth order passes obliquely upward or obliquely through the liquid crystal panel, so the light travels outside the fundamentally narrow viewing angle.

Preferably, the diffracted light of first order include red, green, and blue light components, and the diffracted light of the zeroth order passing through said certain area of the diffraction grating passes through the next and next unit region from said one unit region. The angular relationship between the diffracted light of the zeroth order and the diffracted light of first order in this arrangement is advantageous in obtaining a high definition display.

Preferably, the diffracted light of first order includes red, green, and blue light components, and the green light component of the diffracted lights of first order is made incident to the light valve substantially perpendicular to the latter. By this arrangement, all the color light components can be made incident to the light valve at angles as close as possible to the normal to the display surface.

Preferably, the condenser means includes a condenser lens having condenser elements corresponding to the unit regions of the light valve, for example, an array of microlenses and is arranged in front of the diffraction grating or between the diffraction grating and light valve. Alternatively, the condenser means has condenser elements corresponding to the unit regions of the light valve and incorporated in the diffraction grating. The condenser lens causes the light travelling from the diffraction grating to the light valve to be condensed on each display dot, to increase the efficiency of available light.

Preferably, the light valve comprises at least one liquid crystal panel, and it is possible to provide a high definition display device which is thin.

As one of the arrangements for arranging the display dots in the order of wavelength of the light and in the vertical relationship, it is advisable to arrange such that the upper display dot provides a longer wavelength and the lower display dot provides a shorter wavelength. By this arrangement, the diffracted light of the zeroth order passes obliquely through the light valve. Alternatively, it is advisable to arrange such that the upper display dot provides a shorter wavelength and the lower display dot provides a longer wavelength. By this arrangement, the diffracted light of zeroth order passes obliquely upward through the light valve.

Preferably, said display device includes an upper part and a lower part, and said display dots are arranged so that in the lower part, the diffracted light of the zeroth order emerges downward from the light valve, and in the upper part, the diffracted light of the zeroth order upwardly emerges the light valve.

Preferably, in this case, said display device is formed in a multi-panel structure comprising a plurality of liquid crystal panels.

A display device according to another feature of the present invention comprises a diffraction grating arranged such that a diffracted light of the zeroth order and a diffracted light of the first order having different color light components emerge from the diffraction grating, a condenser means, and a light valve arranged to receive the light passing through the diffraction grating and the condenser means to modulate the light to form an image. The light valve has a plurality of minute unit regions, each unit region including a plurality of color display dots and an additional display dot. The display dots in each unit region are arranged in the order of wavelength of the light. An incident angle of the diffracted light of zeroth order made incident to the light valve is greater then incident angles of the color light components of the diffracted light of first order made incident to the light valve. The diffracted light of first order diffracted at a certain area of the diffraction grating passes through said the display dots in one unit region, and the diffracted light of the zeroth order passing through said certain area of the diffraction grating passes through the additional display dot in the different unit region from said one unit region.

In this arrangement too, the diffracted light of the zeroth order passes through the different unit region from the unit region through which the diffracted light of the first order passes, and the diffracted light of the zeroth order passes through the light valve at a greater angle relative to the normal to the display surface. Therefore, it is possible to obtain a high definition display device. Also, in this case, the diffracted light of the zeroth order can be used.

A display device according to a further feature of the present invention includes a diffraction grating arranged such that a diffracted light of the zeroth order and a diffracted light of the first order having different color light components emerge from the diffraction grating, a condenser means, and a light valve arranged to receive the light passing through the diffraction grating and the condenser means to modulate the light to form an image. The light valve having a plurality of minute unit regions, each unit region including a plurality of color display dots and a shading portion. The display dots in each unit region are arranged in the order of wavelength of the light. An incident angle of the diffracted light of the zeroth order made incident to the light valve is greater than incident angles of the diffracted light of the first order made incident to the light valve. The diffracted light of the first order diffracted at a certain area of the diffraction grating passes through the display dots in one unit region, and the diffracted light of the zeroth order passing through said certain area of the diffraction grating passes through the shading portion in the different unit region from said one unit region.

In this arrangement too, the diffracted light of the zeroth order passes through the different unit region from the unit region through which the diffracted light of the first order passes, and the diffracted light of the zeroth order passes through the light valve at a greater angle relative to the normal to the display surface. Therefore, it is possible to obtain a high definition display device. Also, in this case, the diffracted light of the zeroth order is positively shaded by the shading portion, and a light leaking problem does not occur.

Preferably, the diffracted light of first order includes red, green, and blue light components, and the diffracted light of the zeroth order passing through said certain area of the diffraction grating passes through the shading portion in the unit region located next to said one unit region.

A projection type display device according to a further feature of the present invention includes a light source, an optical device having an aperture for converting beams of light emerging from said light source into parallel beams, a diffraction grating member arranged to receive the light passing through said optical device, a light valve arranged to receive the light passing through the diffraction grating member to modulate the light to form an image, and a projection lens for projecting the image formed by the light valve.

By providing the optical device having the aperture for converting beams of light emerging from said light source into parallel beams, light having a high degree of parallelism can be made incident to the diffraction grating and color separation by the diffraction grating can be reliable carried out. Therefore, it is possible to obtain a projection type display device having a splendid color purity.

A display device according to a further feature of the present invention includes a source of light, a polarization separating means, a condenser lens, a light valve arranged to receive the light passing through the condenser lens to modulate the light to form an image, and an analyzer. The polarization separating means comprises a polarization separating film for separating the light into P-polarized light and S-polarized light based on transmission and reflection, and a reflection mirror for reflecting the polarized light passing through or reflected by the polarization separating film, the polarized light passing through or reflected by the polarization separating film toward the reflection mirror and the polarized light reflected by the reflection mirror form a polarization separating angle therebetween and travel toward the condenser lens.

A display device according to a further feature of the present invention includes a source of light, a polarization separating means, a condenser lens, a light valve arranged to receive the light passing through the condenser lens to modulate the light to form an image, and an analyzer. The polarization separating means comprises a material formed in a prism-shaped cross-sectional shape and having birefringence.

A display device according to a further feature of the present invention includes a first diffraction grating, a second diffraction grating, and a polarization converting means arranged between the first and second diffraction gratings, whereby a polarization separation and a color separation can be carried out.

A display device according to a further feature of the present invention includes a plurality of picture elements, each picture element having three display dots arranged adjacent to each other. A disposition of triangles formed of segments connecting the centers of the three display dots or the centers of apertures of the three display dots is a tetragonal disposition in which triangles are arranged at constant pitches in the mutually perpendicular first and second directions.

A display device according to a further feature of the present invention includes a diffraction grating member and a light valve arranged to receive the light passing through the diffraction grating member to modulate the light to form an image. The light valve has a plurality of display dots defined by apertures of a shading layer, the display dots being identically shaped to each other, the shape of one display dot is symmetrical with respect to first and second mutually perpendicular lines passing through the center of said one display dot.

A display device according to a further feature of the present invention includes a diffraction grating member, and a light valve arranged to receive the light passing through the diffraction grating member to modulate the light to form an image. The light valve has a plurality of picture elements, each picture element having three display dots arranged adjacent to each other. Each display dots is defined by an aperture of a shading layer, one of three display dots having an aperture area smaller than that of the remaining display dots.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
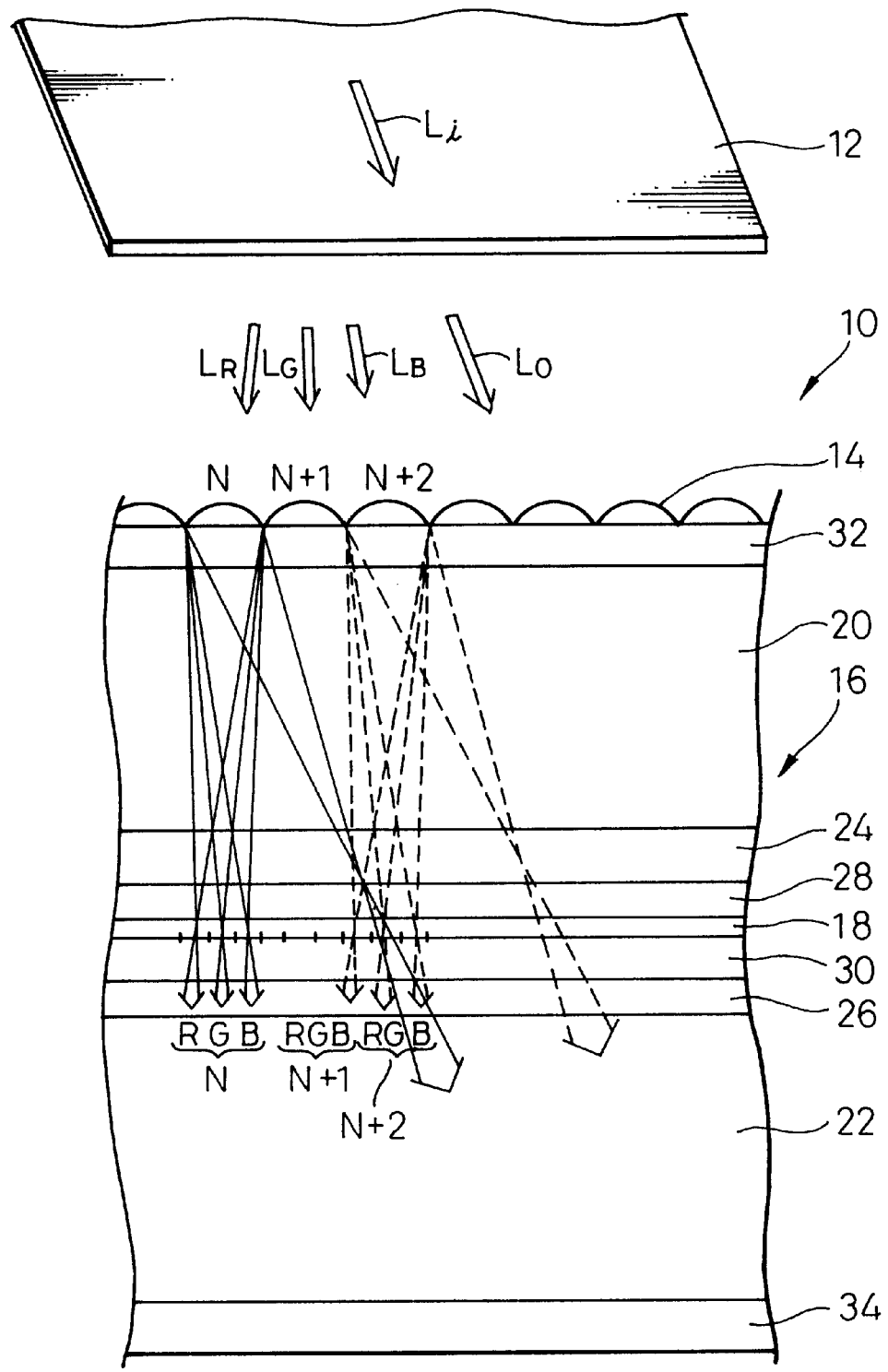
FIG. 1 is a view of a display device according to the first embodiment of the present invention, the display device including a one-dimensional diffraction grating, a condenser lens and a liquid crystal display panel.

FIG. 1 shows a display device according to the first embodiment of the present invention. The display device 10 includes a one-dimensional diffraction grating 12, a condenser lens 14, and a light valve 16. The condenser lens 14 includes an array of micro-lenses, and the light valve 16 includes a liquid crystal panel.

Figure 2:
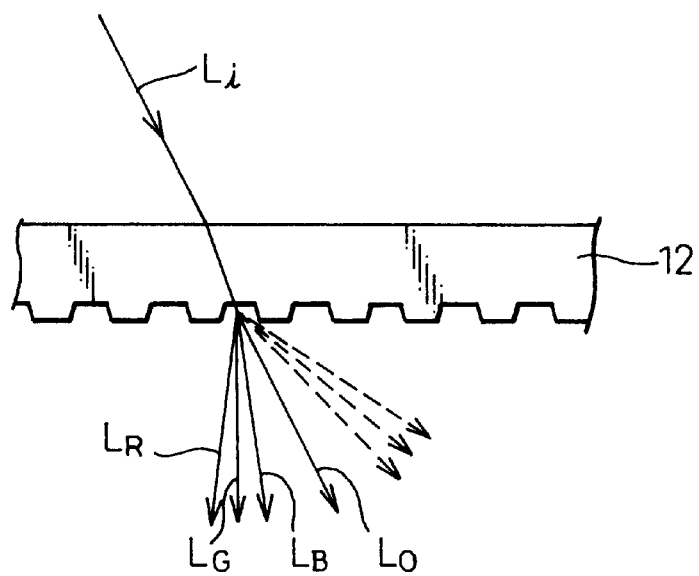
FIG. 2 is a partial cross-sectional view of the diffraction grating of FIG. 1.

As shown in FIGS. 1 and 2, the diffraction grating 12 includes a transparent plate having projections and recesses on the lower surface of the transparent plate at a grating pitch H. It will be apparent that the diffraction grating 12 is not limited to the illustrated one and any type of diffraction gratings can be used in the present invention. For example, the diffraction grating 12 can be of a refractive index distributed-type diffraction grating, such as a volume hologram. The condenser lens 14 can be arranged as a one-dimensional array of micro-lenses or a two-dimensional array of micro-lenses. The micro-lenses, as the components of the condenser lens 14, can be of refractive index distributed type lenses or Fresnel lenses.

When an incident light Li enters the diffraction grating 12, the light is diffracted when it passes through the diffraction grating 12, and the diffracted light of the zeroth order $L_0$ and the diffracted light of the first order having different color components $L_R$, $L_G$, and $L_B$ emerge from the diffraction grating 12. Here, diffracted lights of the second order and so on are neglected. The diffracted light of the zeroth order $L_0$ is not substantially diffracted, and the emerging angle of the light with respect to the normal to the diffraction grating 12 when it emerges from the latter is equal to the incident angle of the incident light Li. The light components $L_R$, $L_G$ and $L_B$ of diffracted light of the first order have respective color bandwidths or wavelengths, and the emerging angles of red, green and blue light components differ from each other and from the emerging angle of the diffracted light of the zeroth order $L_0$. It is well known that the emerging angle of the diffracted light of first order $L_R$, $L_G$ and $L_B$ depends on the wavelength. In the preferred embodiment of the present invention, the green light component $L_G$ of the diffracted light of the first order is made incident to the liquid crystal panel 16 and substantially perpendicular to the liquid crystal panel 16.

The diffracted light of the first order exists on either side of the diffracted light of the zeroth order $L_0$. The diffracted light of the first order appearing on one side of the diffracted light of the zeroth order $L_0$ is shown by the solid lines in FIG. 2, and the diffracted light of the first order appearing on the other side of the diffracted light of zeroth order $L_0$ is shown by the broken line in FIG. 2. The diffracted light of the first order shown by the solid line is made incident to the liquid crystal panel 16 at an angle close to the normal to the liquid crystal panel 14, but the diffracted light of the first order shown by the broken line is made incident to the liquid crystal panel 16 at a greater angle from the normal to the liquid crystal panel 14 and is not within an ordinary field of vision, so the latter light is not used here.

As shown in FIG. 1, the liquid crystal panel 16 includes, for example, a twisted nematic type liquid crystal panel includes a pair of transparent plates 20 and 22 and a layer of liquid crystal 18 held between the plates 20 and 22. The plates 20 and 22 have transparent electrodes 24 and 26 and orientation layers 28 and 30, respectively. A polarizer 32 and an analyzer 34 are arranged outside the plates 20 and 22, and the diffraction grating 12 and the condenser lens 14 are arranged on the side of the polarizer 32.

Figure 3:
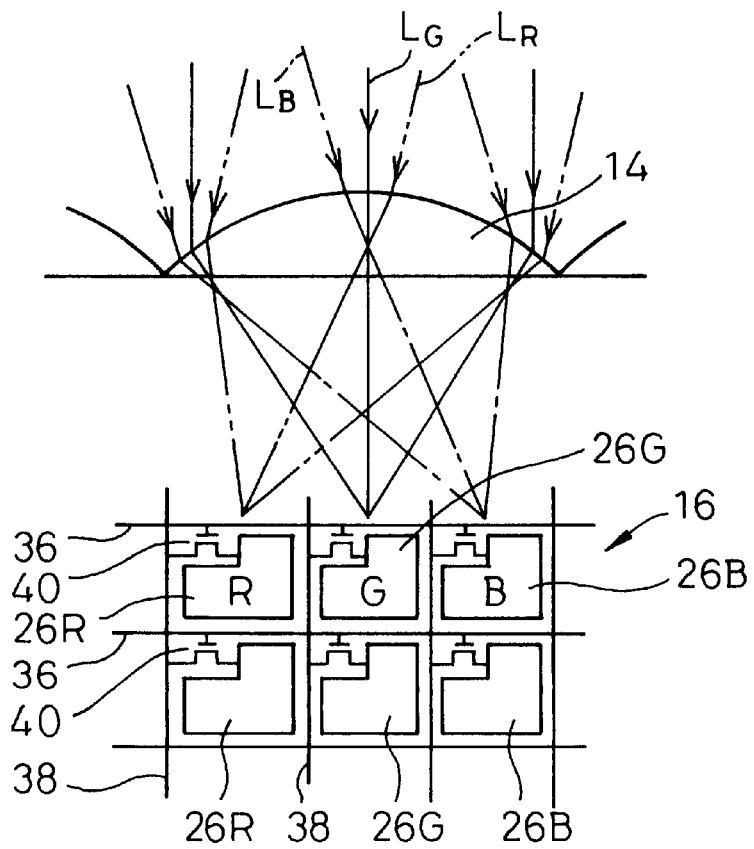
FIG. 3 is a view illustrating the relationship between the condenser lens and the picture electrodes of the liquid crystal panel.

The electrode 24 is a common electrode, for example, and the electrode 26 includes display electrodes which are arranged on the plate 22 with an active matrix, as shown in FIG. 3. The active matrix comprises gate bus lines 36, data bus lines 38, TFTs 40, and color display electrodes 26R, 26G and 26B as display dots. Three display electrodes 26R, 26G and 26B constitute a picture element (unit region), and the display electrodes 26R, 26G and 26B in one picture element are arranged in the order of the wavelength.

As shown in FIGS. 1 and 3, one picture element includes three display electrodes 26R, 26G and 26B is arranged corresponding to one condenser element (one micro-lens) of the condenser lens 14. In FIG. 1, the numbers N, N+1, and N+2 are applied to the condenser elements and the picture elements, respectively. The diffracted light of the first order $L_R$, $L_G$ and $L_B$ emerging from the diffraction grating 12 passes through the condenser lens 14 and is made incident to the liquid crystal panel 16. In this embodiment, the diffracted light of the first order $L_R$, $L_G$ and $L_B$ passing through the Nth condenser element of the condenser lens 14 is made incident to the Nth picture element of the liquid crystal panel 16. In the Nth picture element, the red component $L_R$ of diffracted light of first order passes through the red display electrode 26R, the green component $L_G$ of diffracted light of first order passes through the green display electrode 26G, and the blue component $L_B$ of diffracted light of first order passes through the blue display electrode 26B.

Figure 4:
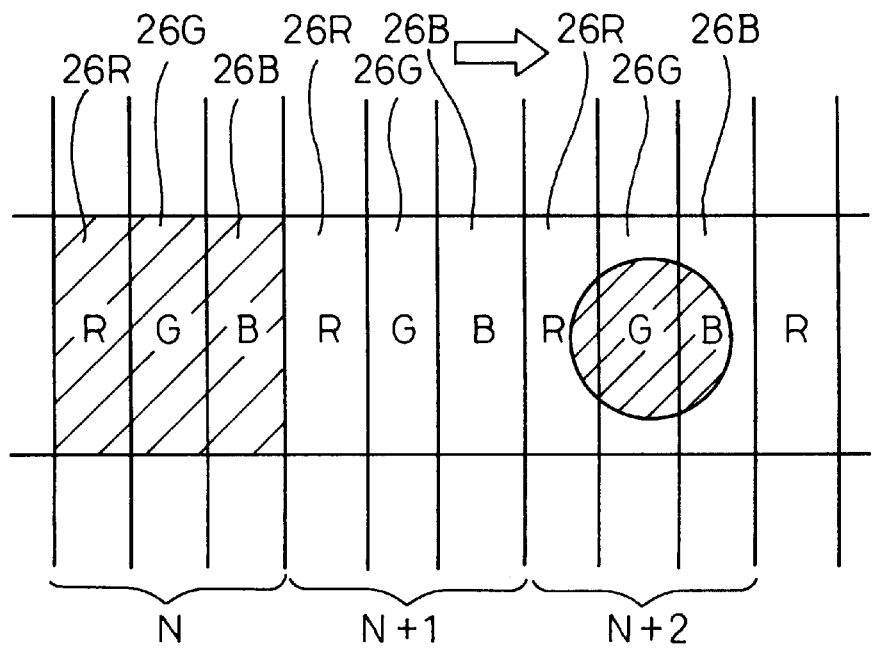
FIG. 4 is a view of a portion of the liquid crystal panel, illustrating the regions at which the diffracted light of the zero order and the diffracted light of the first order are made incident.

The diffracted light of the zeroth order $L_0$ passing through the Nth condenser element of the condenser lens 14 is made incident to the (N+2)th picture element of the liquid crystal panel 16, which is different from the Nth picture element. In FIG. 4, the display electrodes 26R, 26G and 26B of the Nth picture element, to which the diffracted light of the first order $L_R$, $L_G$ and $L_B$ passing through the Nth condenser element is made incident, are shown by hatching. The region of the (N+2)th picture element, to which the diffracted light of the zeroth order $L_0$ passing through the same Nth condenser element is made incident, is shown by hatching. The diffracted light of the zeroth order $L_0$ travels forward horizontally and obliquely, as shown by the arrow.

By this arrangement, it is possible to obtain a display device having the display electrodes 26R, 26G and 26B arranged at constant distances and in identical sizes, as will be apparent from the examples listed below. Therefore, it is possible to obtain a display device realizing high quality and high definition. The diffracted light of the zeroth order $L_0$ emerges from the liquid crystal panel 16, but its emerging angle is relatively large, so that a viewer will not see the diffracted light of the zeroth order $L_0$ within an ordinary field of vision. Therefore, the Diffracted light of zeroth order $L_0$ will not affect the quality of the display.

Figure 5:
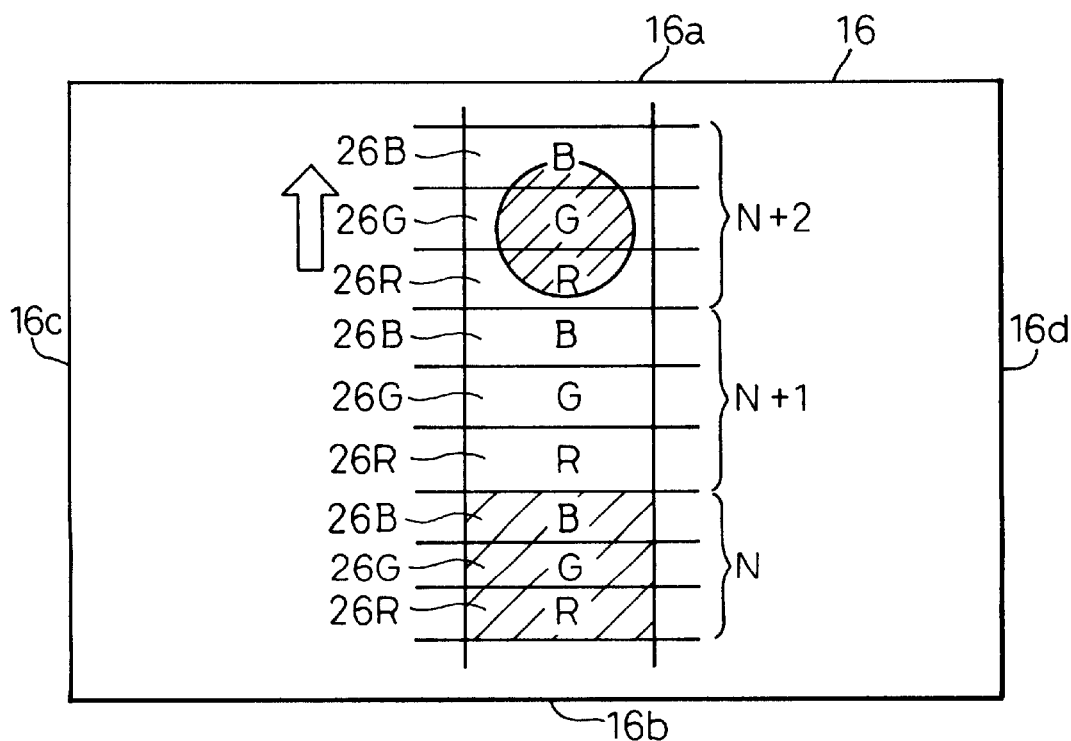
FIG. 5 is a view of an example of the liquid crystal panel designed such that the picture electrodes are arranged in the vertical relationship and the diffracted light of the zero order travels upward.

FIG. 5 shows that the liquid crystal panel 16 of the display device has a top edge 16a, a bottom edge 16b, a left edge 16c and a right edge 16d. In this liquid crystal panel 16, the display electrodes 26R, 26G and 26B of one picture element are arranged in a vertical relationship and in the order of wavelength of the light so that the upper display dot has a shorter wavelength and the lower display dot has a longer wavelength. In this arrangement, the incident light Li travels from below and obliquely, and the diffracted light of the zeroth order $L_0$ travels upward and obliquely, as shown by the arrow.

In the display device using the TN type liquid crystal panel, a viewing angle in one direction in which a good image can be seen is relatively wide but a viewing angle in the other direction perpendicular to the former one direction in which a good image can be seen is relatively narrow. It is usual that the direction in which the viewing angle is wide is arranged horizontally, and the direction in which the viewing angle is narrow is arranged vertically. According to the arrangement of FIG. 5, the diffracted light of the zeroth order $L_0$ passes through the liquid crystal panel 16 upward, and the viewing angle is narrow in that direction. Therefore, the light travels outside the fundamentally narrow viewing angle, and the display is not affected by the diffracted light of the zeroth order. It will be apparent that the arrangement of FIG. 5 can be reversed up and down. That is, the display electrodes 26R, 26G and 26B of one picture element are arranged in the vertical relationship and in the order of wavelength of the light so that the upper display dot provides a longer wavelength and the lower display dot provides a shorter wavelength. In this arrangement, the incident light Li travels from above and obliquely, and the diffracted light of zeroth order $L_0$ travels downward and obliquely.

Figure 6:
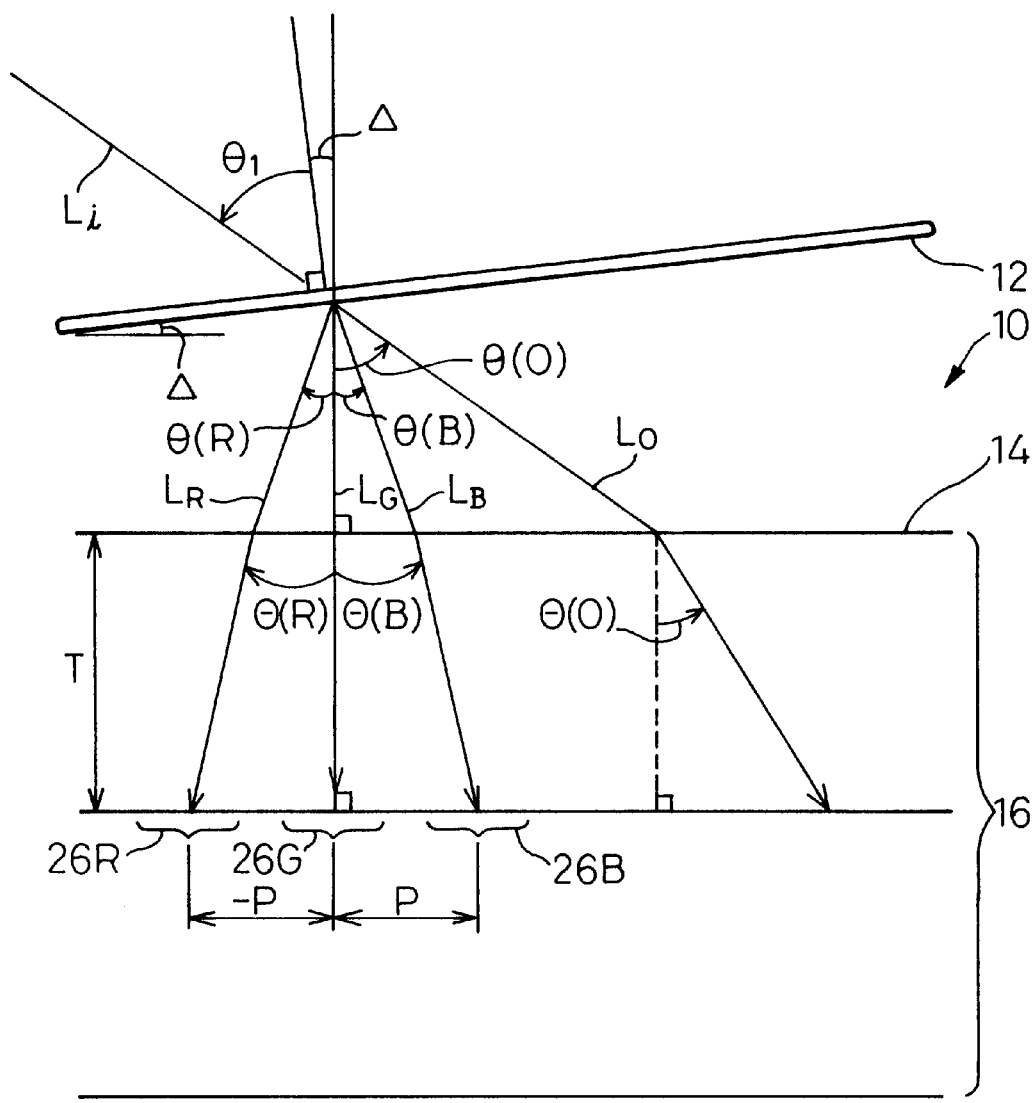
FIG. 6 is a view illustrating the geometry of the diffraction grating and the liquid crystal display panel to calculate the travelling direction and the dot pitches of the diffracted light of the zero order and the diffracted lights of the first order.

FIG 6 shows the geometry of the diffraction grating 12 and the liquid crystal display panel 16 to calculate the travelling direction and the dot pitches of the diffracted light of the zero the order $L_0$ and the diffracted light of first order $L_R$, $L_G$ and $L_B$. In FIG. 6, the diffraction grating 12 is shown in an oblique position relative to the liquid crystal display panel 16 by the angle Δ. In the following description, it is supposed that the angle Δ is zero, i.e., the diffraction grating 12 is parallel to the liquid crystal display panel 16. However, the same result can be obtained if the angle Δ is not zero.

Characters used in FIG. 6 and in the following description are as follows.

H: grating pitch of the diffraction grating 12 n: refractive index of the plate 20 of the LC panel 16

T: thickness of the plate 20

P: dot pitch of the display electrodes 26R, 26G and 26B $θ_1$: incident angle of incident light Li to the diffraction grating 12

θ(R), θ(B): emerging angles of red and blue components of diffracted light of first order $L_R$ and $L_B$ emerging from the diffraction grating 12, taken relative to the emerging angle of the green component of the diffracted light of the first order $L_G$ when the green component is made incident substantially perpendicular to the liquid crystal panel 16 (i.e., θ(G)=0)

θ(0): emerging angle of the diffracted light of the zeroth order $L_0$ emerging from the diffraction grating 12

θ(R), θ(B): angles of refraction of red and blue components of the diffracted light of the first order $L_R$ and $L_B$ in the plate 20 of the LC panel 12

θ(0): angle of refraction of the diffracted light of the zeroth order $L_0$ in the plate 20 of the LC panel 12 h(R), h(G), h(B): wavelengths of red, green and blue components of the diffracted lights of the first order $L_R$, $L_G$ and $L_B$ There are following relationships between the incident angle of the light made incident to the diffraction grating 12 and the emerging angles of the color components $L_R$, $L_G$ and $L_B$ of the diffracted light of the first order light emerging from the diffraction grating 12. The incident angle $\theta_1$ is equal to the emerging angle θ(0).

$$h(G) = 2H \times \sin(\theta(0)/2) \quad (1)$$

$$h(R) = 2H \times \sin((\theta(0) - \theta(R))/2) \quad (2)$$

$$h(B) = 2H \times \sin((\theta(0) - \theta(B))/2) \quad (3)$$

From the relationship (1), it is possible to obtain the incident angle $\theta_1$ (and the emerging angle θ(0)) when the green component of diffracted light of first order $L_G$ is made incident substantially perpendicular to the liquid crystal panel 12 (θ(G)=0). The emerging angles θ(R) and θ(B) can be obtained, by inserting the obtained θ(0) into the relationships (2) and (3). In addition, there are following relationship, based on the refraction occurring when the light is made incident to the plate 20 of the liquid crystal panel 12.

$$n \times \sin(\theta(0)) = \sin(\theta(0)) \quad (4)$$

$$n \times \sin(\theta(R)) = \sin(\theta(R)) \quad (5)$$

$$n \times \sin(\theta(B)) = \sin(\theta(B)) \quad (6)$$

The pitch P of the display electrodes 26R, 26G and 26B is obtained from the following relationships.

$$T \times \tan(\theta(0)) = P \times f(N) \quad (7)$$

$$T \times \tan(\theta(R)) = -P \quad (8)$$

$$T \times \tan(\theta(B)) = P \quad (9)$$

In the relationship (7), f(N) is a function defining the positional relationship of the diffracted light of the zeroth order and the diffracted light of the first order travelling to the liquid crystal layer. In the embodiment, f(N)=0 was chosen. Using these relationships, the following examples 1 to 3 are obtained.

|  | EX-AMPLE 1 | EX-AMPLE 2 | EX-AMPLE 3 |
|---|---|---|---|
| PANEL SIZE (in) | 7.8 | 9.1 | 11.3 |
| DOT PITCH P (mm) | 0.248 | 0.185 | 0.14 |
| PLATE THICKNESS T (mm) | 0.7 | 1.1 | 1.1 |
| SPATIAL FREQUENCY OF DIFFRACTED GRATING (lp/mm) | 1100 | 930 | 1225 |
| GRATING PITCH (μm) | 0.92 | 1.08 | 0.816 |
| INCIDENT ANGLE θi (°) | 39 | 29 | 35 |

-continued

|  | EX-AMPLE 1 | EX-AMPLE 2 | EX-AMPLE 3 |
|---|---|---|---|
| DIVERGING ANGLE OF INCIDENT LIGHT (°) | 5 | 4 | 4.5 |
| EMERGING ANGLE OF 1st ORDER |  |  |  |
| θ(R) (°) | −6.6 | −4.9 | −5.9 |
| θ(G) (°) | 0 | 0 | 0 |
| θ(B) (°) | 6.6 | 4.9 | 5.9 |
| EMERGING ANGLE OF 0th ORDER |  |  |  |
| θ(0) (°) | 39 | 29 | 35 |

As shown in the examples 1 to 3, it is possible to form the display electrodes 26R, 26G and 26B having identical area at a constant pot pitch P, by setting the emerging angles of the diffracted light of the first order to a smaller value relative to the normal to the liquid crystal panel 16 and the emerging angle of the diffracted light of the zeroth order to a larger value. The diffracted light of the first order $L_R$, $L_G$ and $L_B$ is directed to the display electrodes 26R, 26G and 26B. The light source does not provide completely parallel beams, but it is possible to use substantially parallel beams with a diverging angle of the beams within five degrees, by using a parabolic reflector.

Figure 7:
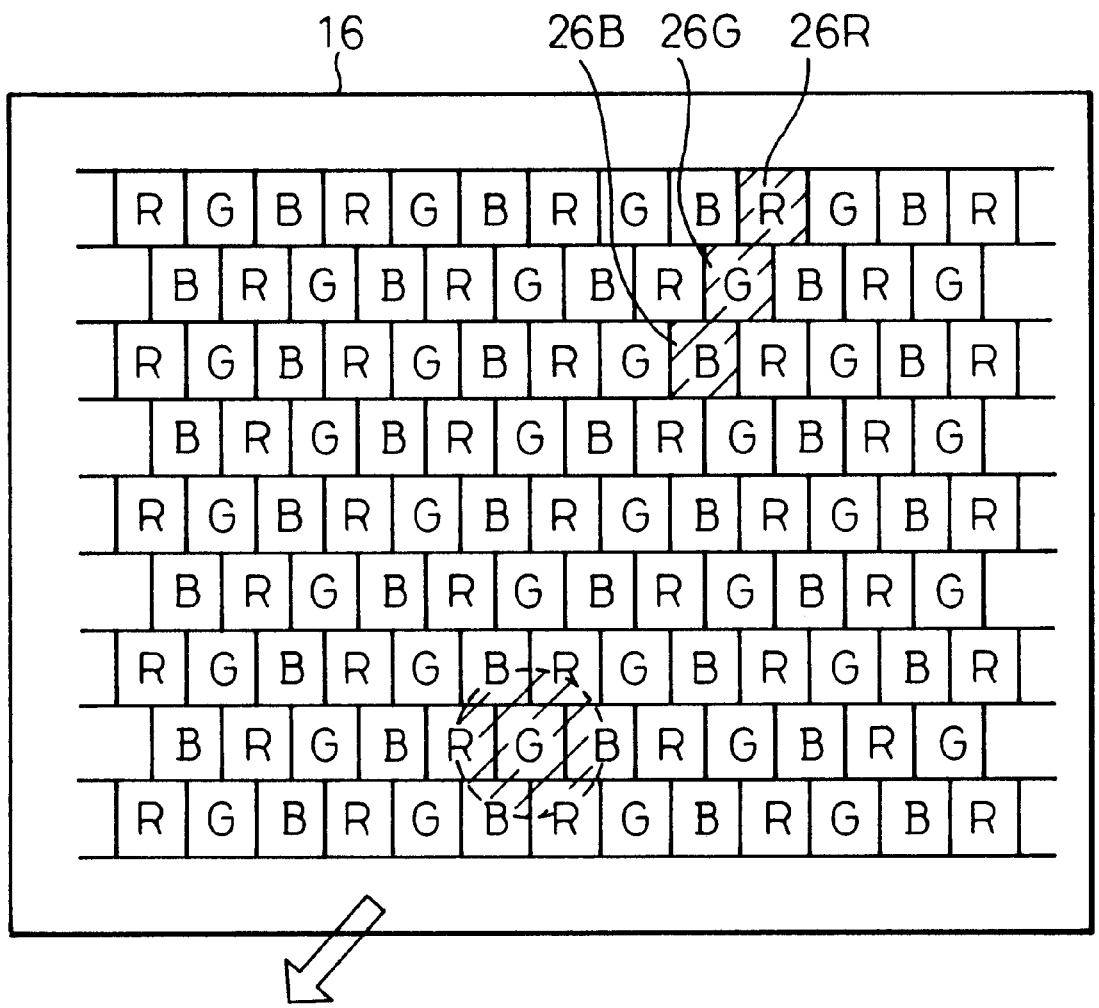
FIG. 7 is a view of another example of the liquid crystal panel designed such that the display electrodes are arranged in the vertical relationship and the diffracted light of the zero order travels upward.

FIG. 7 shows a modified example of the liquid crystal panel of FIG. 5. The display electrodes 26R, 26G and 26B are arranged in a delta disposition, and the display electrodes 26R, 26G and 26B of one picture element are arranged in the vertical relationship but obliquely. The display electrodes 26R, 26G and 26B of one picture element are arranged in the order of wavelength of the light so that the upper display dot provides a longer wavelength and the lower display dot provides a shorter wavelength. Therefore, when the obliquely incident light is made incident to the diffraction grating 12 from above, the diffracted light of the zeroth order $L_0$ travels downward at an oblique angle and passes through a picture element next to the picture element through which the diffracted light of first order passes.

Figure 8:
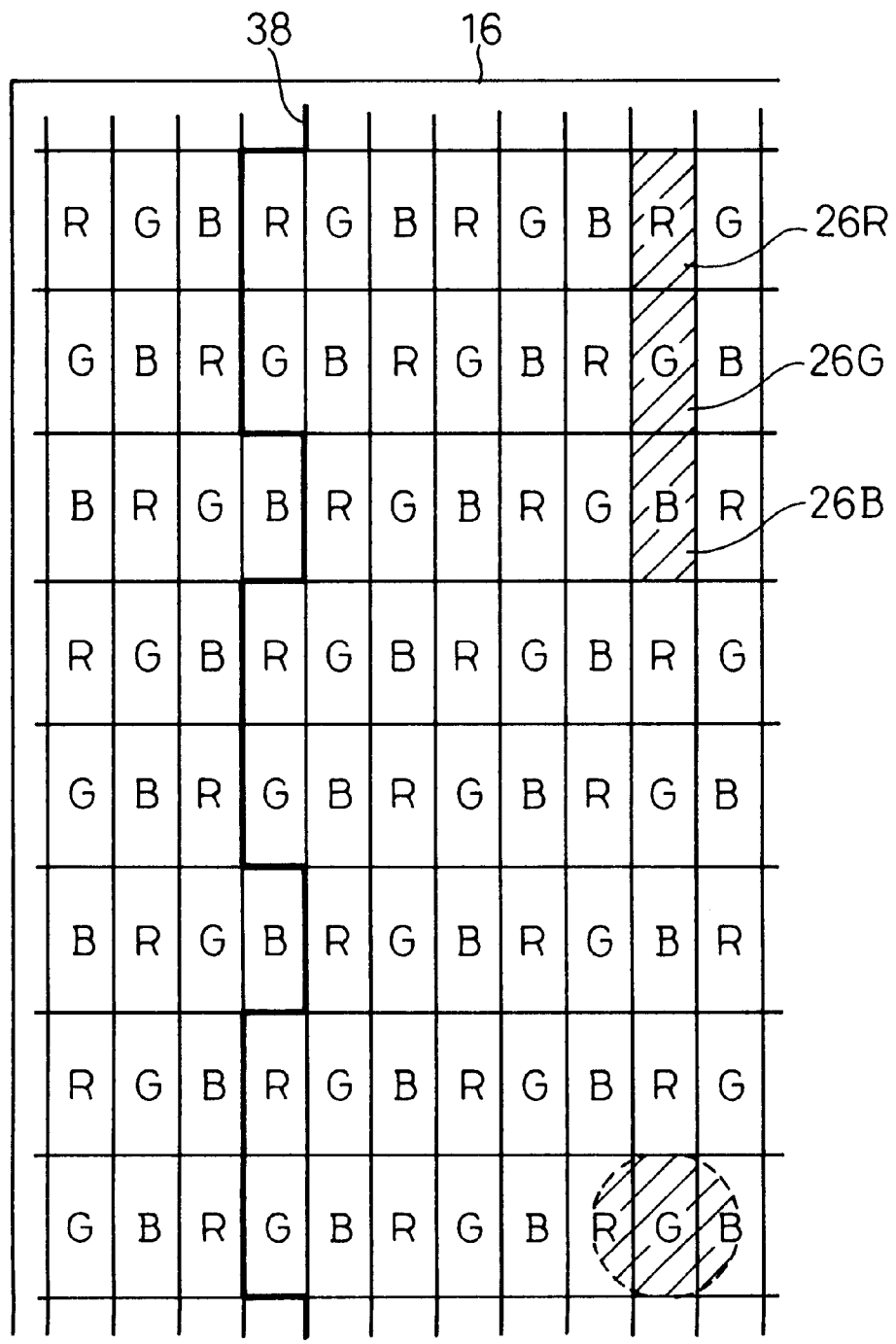
FIG. 8 is a view of another example of the liquid crystal panel designed such that the picture electrodes are arranged in the vertical relationship and the diffracted light of zero order travels downward.

FIG. 8 shows a modified example of the liquid crystal panel of FIG. 5. This example is similar to the previous example, except that the display electrodes 26R, 26G and 26B are shaped in an elongated shape along the vertical direction of the display device, so it is necessary to increase the emerging angles of the diffracted light of the first order even if the area of the display electrodes 26R, 26G and 26B is reduced and it is also possible to increase the emerging angle of the diffracted light of the zeroth order. In addition, the data bus lines 38 are not linear, so that the data bus lines 38 do not intersect the wirings of the TFTs of the display electrodes 26R, 26G and 26B. Therefore, the possibility of wire breakage is reduced.

Figure 9:
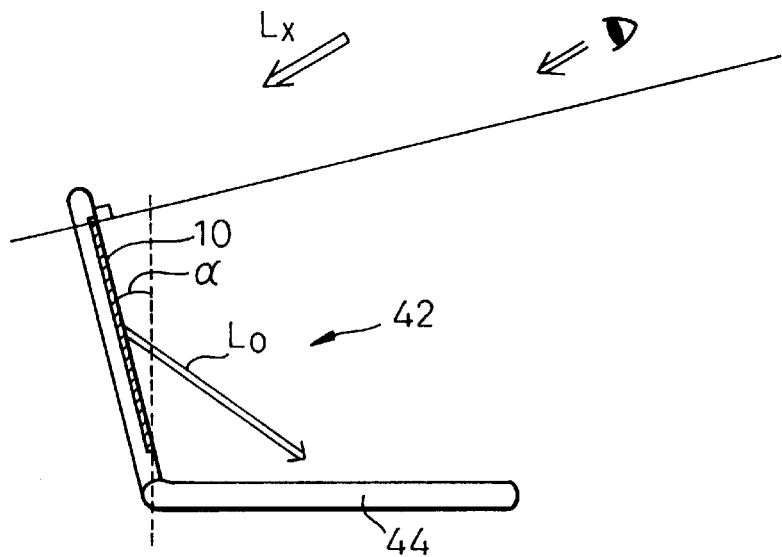
FIG. 9 is a view of an example in which the display device is incorporated in a personal computer.

FIG 9 shows an example in which the display device 10 is arranged in a personal computer or a word processor. The numeral 44 indicates a keyboard. The display device 10 is generally used at a tilting angle ranging from 15 degrees at a displaying surface upwardly facing condition (angle α) to 5 degrees at a displaying surface downwardly facing condition. The display device 10 is used, so that the eyes of a user are above the normal to the display device 10 at the upper edge thereof and an illuminating light Lx from a ceiling illumination is reflected by the surface of the display device 10 and does not enter the eyes. In this case, it is advisable that the diffracted light of the zeroth order $L_0$ which is not used for the display emerges downward from the display device 10. In this way, the diffracted light of the zeroth order $L_0$ does not enter eyes at all, and it is possible to realize a wide viewing angle. In addition, color light components are not separated in the horizontal direction, so a color shift and a color unevenness can be avoided.

Figure 10:
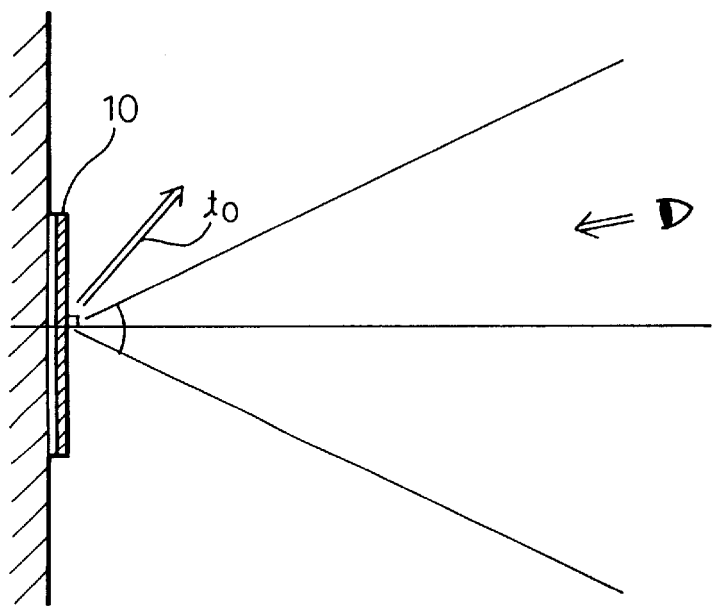
FIG. 10 is a view of an example of a wall hung-type display device.

FIG. 10 shows an example of the wall hanging-type display device 10. In this case, the display device 10 is applied to a television. In the wall hanging-type television, the upper viewing angle and the lower viewing angle are usually identical and are in the range from 15 to 30 degrees. In the actual use, such a television is seen from the normal to the display or from slightly below. Therefore, it is desirable that the lower viewing angle is wider than the upper viewing angle. In this case, it is advisable that the diffracted light of the zeroth order $L_0$ which is not used for the display upwardly emerges from the display device 10. In this way, the diffracted light of zeroth order $L_0$ does not enter the eyes at all, and it is possible to realize a wide viewing angle.

Figure 11:
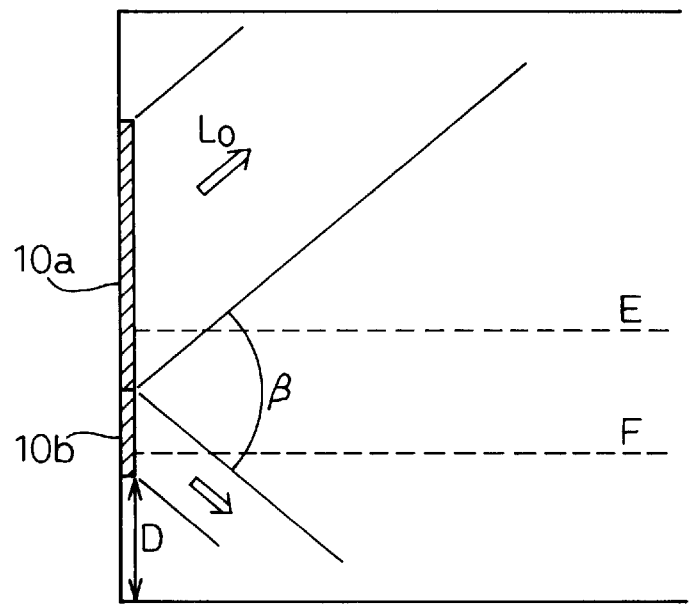
FIG. 11 is a view of an example of the multi-panel type display device.
Figure 12:
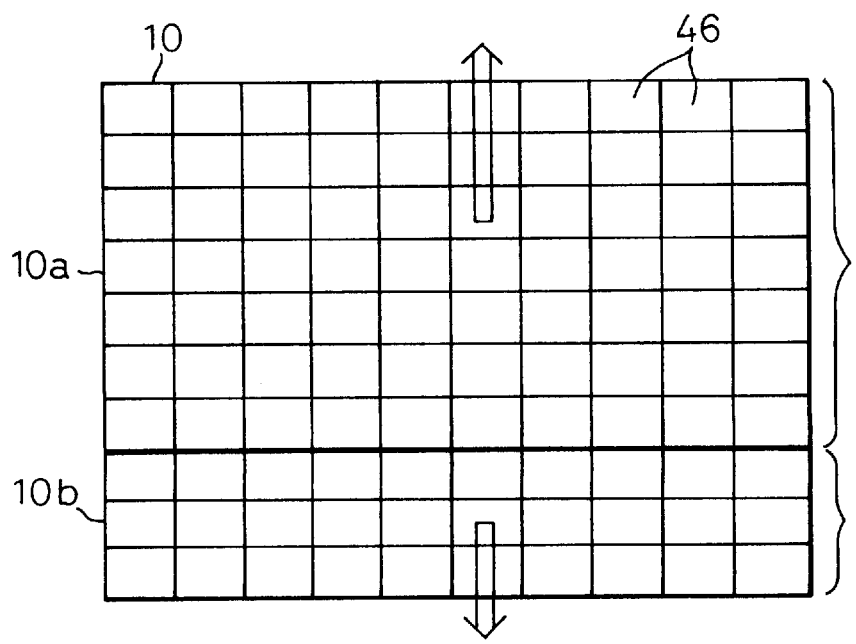
FIG. 12 is a front view of the display device of FIG. 11.

FIGS. 11 and 12 show an example of the multi-panel type display device 10. The multi-panel type display device 10. The multi-panel type display device 10 comprises a hundred liquid crystal panels 46 arranged in vertical and horizontal rows. Each liquid crystal panel 46 has a diagonal size of 15 inch and the display has a diagonal size of 150 inch (2.3 meter in height, 3.1 meter in width). Diffraction grating and condenser lens (not shown) are combined to each liquid crystal panel 46 in a manner disclosed hereinabove, so that the diffracted light of the zeroth order $L_0$ passes through each liquid crystal panel 46.

The display device 10 has an upper part 10a and a lower part 10b. The upper part 10a is formed by the top to seventh rows of liquid crystal panels 46, and the lower part 10b is formed by the eighth to bottom rows of liquid crystal panels 46. The liquid crystal panels 46 of the upper part 10a are arranged so that the diffracted light of the zeroth order $L_0$ emerges downward from the liquid crystal panels 46, and the liquid crystal panels 46 of the lower part 10b are arranged so that the diffracted light of the zeroth order $L_0$ upwardly emerges from the liquid crystal panels 46. That is, in the upper part 10a, the display electrodes 26R, 26G and 26B in the order of wavelength of the light so that the upper display dot provides a shorter wavelength and the lower display dot provides a longer wavelength, and the incident light is made incident to the diffraction grating 12 from below to above, so the diffracted light of the zeroth order $L_0$ passes through the liquid crystal panels 46 upward. In the lower part 10b, the display electrodes 26R, 26G and 26B are arranged in the order of wavelength of the light so that the upper display dot provides a longer wavelength and the lower display dot provides a shorter wavelength, and the incident light is made incident to the diffraction grating 12 from above to below, so the diffracted light of the zeroth order $L_0$ passes through the liquid crystal panels 46 downward. Therefore, the viewing angle in which a good image can be seen is widened, as shown by the range β.

This display device 10 is attached to the wall of a room having a height of 3.5 meter, and the height of its bottom is 0.75 meter from the floor. Assuming that, for example, the height E of eyes of a standing viewer is 1.8 meter, and the height F of eyes of a sitting viewer is 1.0 meter, the diffracted light of the zeroth order $L_0$ does not enter the eyes of a viewer who views the display in any position.

Figure 13:
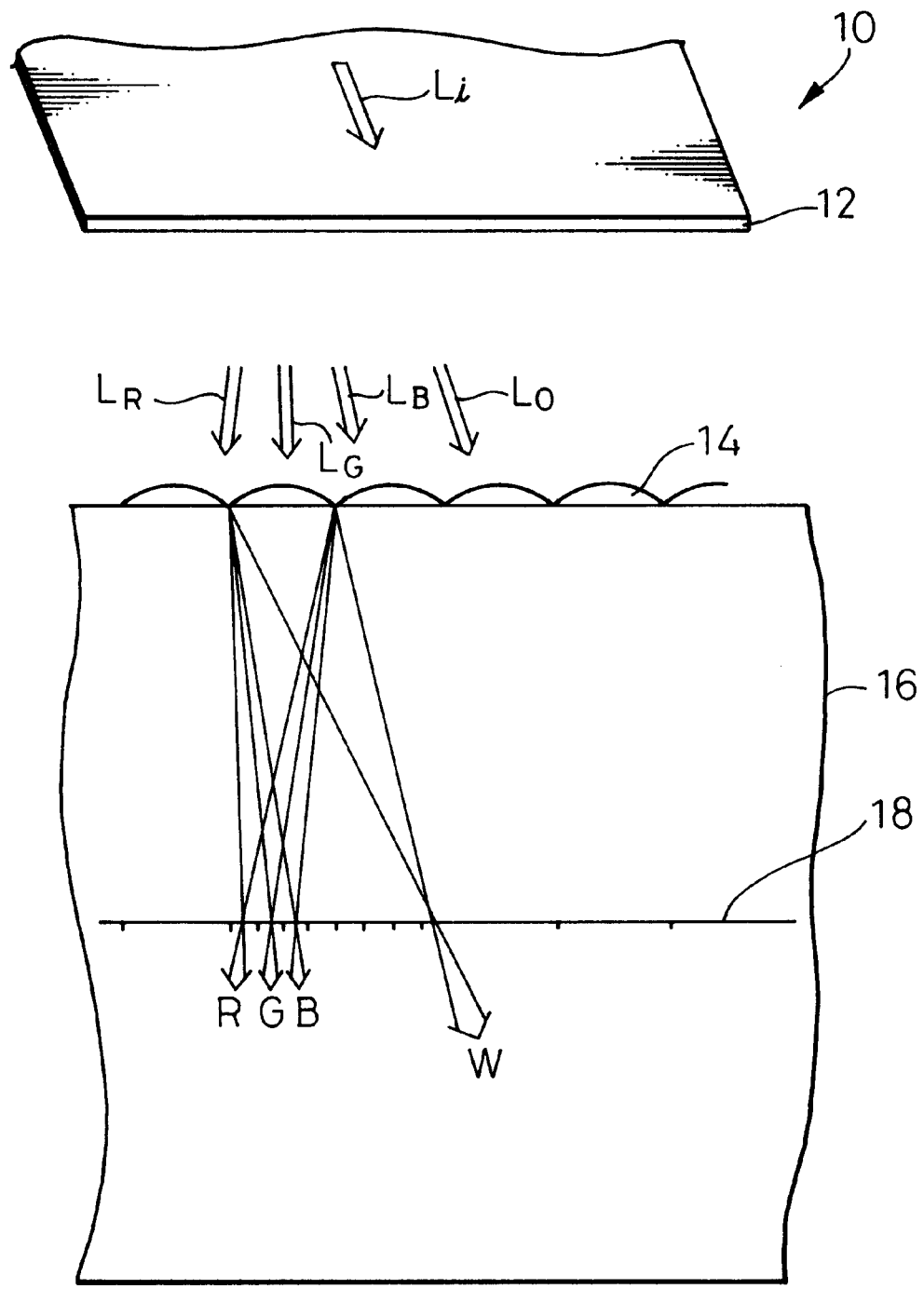
FIG. 13 is a view of a display device according to the second embodiment of the present invention.
Figure 14:
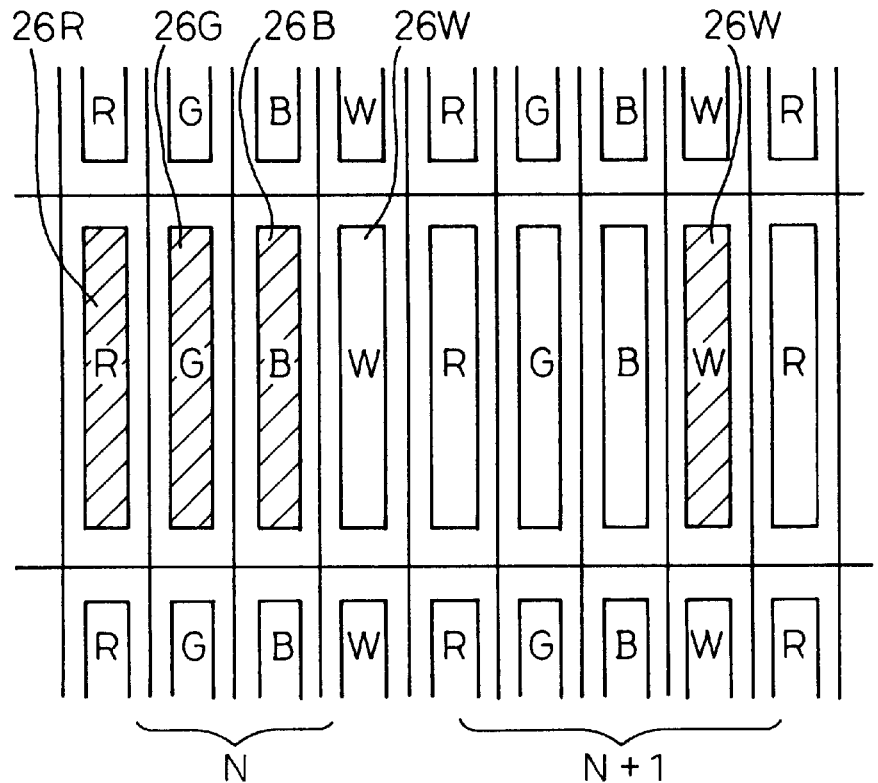
FIG. 14 is a view illustrating the picture electrodes of the display device of FIG. 13.
Figure 15:
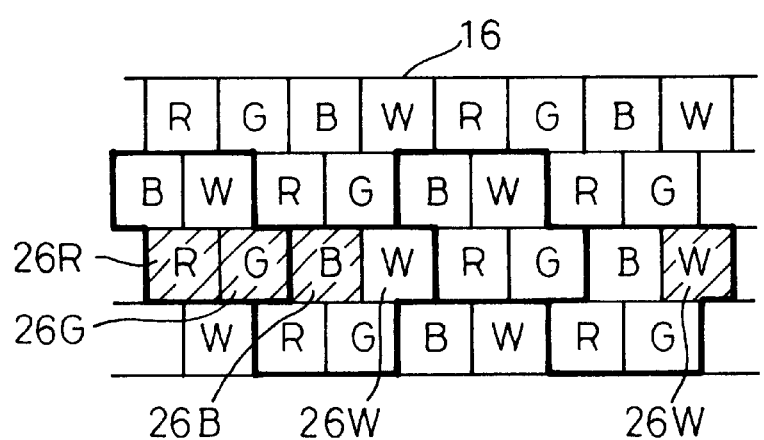
FIG. 15 is a view of a modified example of the display device of FIG. 13.

FIGS. 13 and 14 show a display device according to the second embodiment of the present invention. In this embodiment, similar to the previous embodiment, the display device 10 includes a one-dimensional diffraction grating 12, a condenser lens 14, and a liquid crystal panel 16 as a light valve. In the diffraction grating 12, when an incident light Li is made incident to the diffraction grating 12, a diffracted light of the zeroth order $L_0$ and a diffracted light of the first order having different color light components $L_R$, $L_G$ and $L_B$ emerge from the diffraction grating 12. Also, the green light component $L_G$ is made incident substantially perpendicular to the liquid crystal panel 16.

The liquid crystal panel 16 includes a TN type liquid crystal panel similar to that of FIG. 1, and includes color display electrodes 26R, 26G and 26B as display dots. In this embodiment, an additional white display electrode 26W is arranged, and the display electrodes 26R, 26G and 26B and the additional white display electrode 26W constitute one picture element (unit region). In one picture element, the display electrodes 26R, 26G and 26B are arranged in the order of the wavelength.

One picture element is arranged corresponding to one condenser element of the condenser lens 14. The diffracted light of first order $L_R L_G$ and $L_B$ emerging from the diffracted grating 12 passes through the Nth condenser element of the condenser lens 14, and is made incident to the display electrodes 26R, 26G and 26B of the Nth picture element of the liquid crystal panel 16. The diffracted light of the zeroth order $L_0$ passing through the Nth condenser element of the condenser lens 14 is made incident to the additional white display electrode 26W of the (N+1)th picture element of the liquid crystal panel 16, which is different from the Nth picture element. In FIG. 14, the display electrodes 26R, 26G and 26B of the Nth picture element, to which the diffracted light of the first order $L_R$, $L_G$ and $L_B$ passing through the Nth condenser element is made incident, are shown by hatching. The region of the additional white display electrode 26W of the (N+1)th picture element, to which the diffracted light of the zeroth order $L_0$ passing through the same Nth condenser element is made incident, is shown by hatching. Therefore, in this case, the diffracted light of the zeroth order $L_0$ can be used for the display and a highly effective and bright display can be realized.

The display electrodes 26R, 26G and 26B and the additional white display electrode 26W of one picture element are arranged at constant distances and in identical sizes. Therefore, it is possible to obtain a display device realizing high quality and high definition.

The following examples 4 to 6 are examples of the display device having the display electrodes 26R, 26G and 26B and the additional white display electrode 26W arranged at constant distances and in identical sizes. The characters are used in a similar sense to the previous embodiment.

|  | EX-AMPLE 4 | EX-AMPLE 5 | EX-AMPLE 6 |
| --- | --- | --- | --- |
| PANEL SIZE (in) | 10.4 | 12.1 | 15 |
| DOT PITCH P (mm) | 0.33 | 0.246 | 0.146 |
| PLATE THICKNESS T (mm) | 0.7 | 1.1 | 1.1 |
| SPATIAL FREQUENCY OF DIFFRACTED GRATING (lp/mm) | 1100 | 930 | 1225 |
| GRATING PITCH (μm) | 0.92 | 1.08 | 0.816 |
| INCIDENT ANGLE θi (°) | 39 | 29 | 35 |
| DIVERGING ANGLE OF INCIDENT LIGHT (°) | 5 | 4 | 4.5 |
| EMERGING ANGLE OF |  |  |  |

-continued

|  | EXAMPLE 4 | EXAMPLE 5 | EXAMPLE 6 |
|---|---|---|---|
| 1st ORDER |  |  |  |
| θ(R) (°) | −6.6 | −4.9 | −5.9 |
| θ(G) (°) | 0 | 0 | 0 |
| θ(B) (°) | 6.6 | 4.9 | 5.9 |
| EMERGING ANGLE OF 0th ORDER |  |  |  |
| θ(0) (°) | 39 | 29 | 35 |

FIG. 5 shows a modified example of the liquid crystal display device 16 of FIG. 14. This example is similar to that of FIG. 14, except that the picture elements are arranged in a delta (Δ) disposition. The thick line shows one picture elements. The details of this example are shown in the examples 7 to 9.

|  | EXAMPLE 7 | EXAMPLE 8 | EXAMPLE 9 |
|---|---|---|---|
| PANEL SIZE (in) | 5.2 | 6.1 | 7.5 |
| DOT PITCH P (mm) | 0.083 | 0.062 | 0.047 |
| PLATE THICKNESS T (mm) | 0.7 | 1.1 | 1.1 |
| SPATIAL FREQUENCY OF DIFFRACTED GRATING (lp/mm) | 1100 | 930 | 1225 |
| GRATING PITCH (μm) | 0.92 | 1.08 | 0.816 |
| INCIDENT ANGLE θi (°) | 39 | 29 | 35 |
| DIVERGING ANGLE OF INCIDENT LIGHT (°) | 5 | 4 | 4.5 |
| EMERGING ANGLE OF 1st ORDER |  |  |  |
| θ(R) (°) | −6.6 | −4.9 | −5.9 |
| θ(G) (°) | 0 | 0 | 0 |
| θ(B) (°) | 6.6 | 4.9 | 5.9 |
| EMERGING ANGLE OF 0th ORDER |  |  |  |
| θ(0) (°) | 39 | 29 | 35 |

Figure 16:
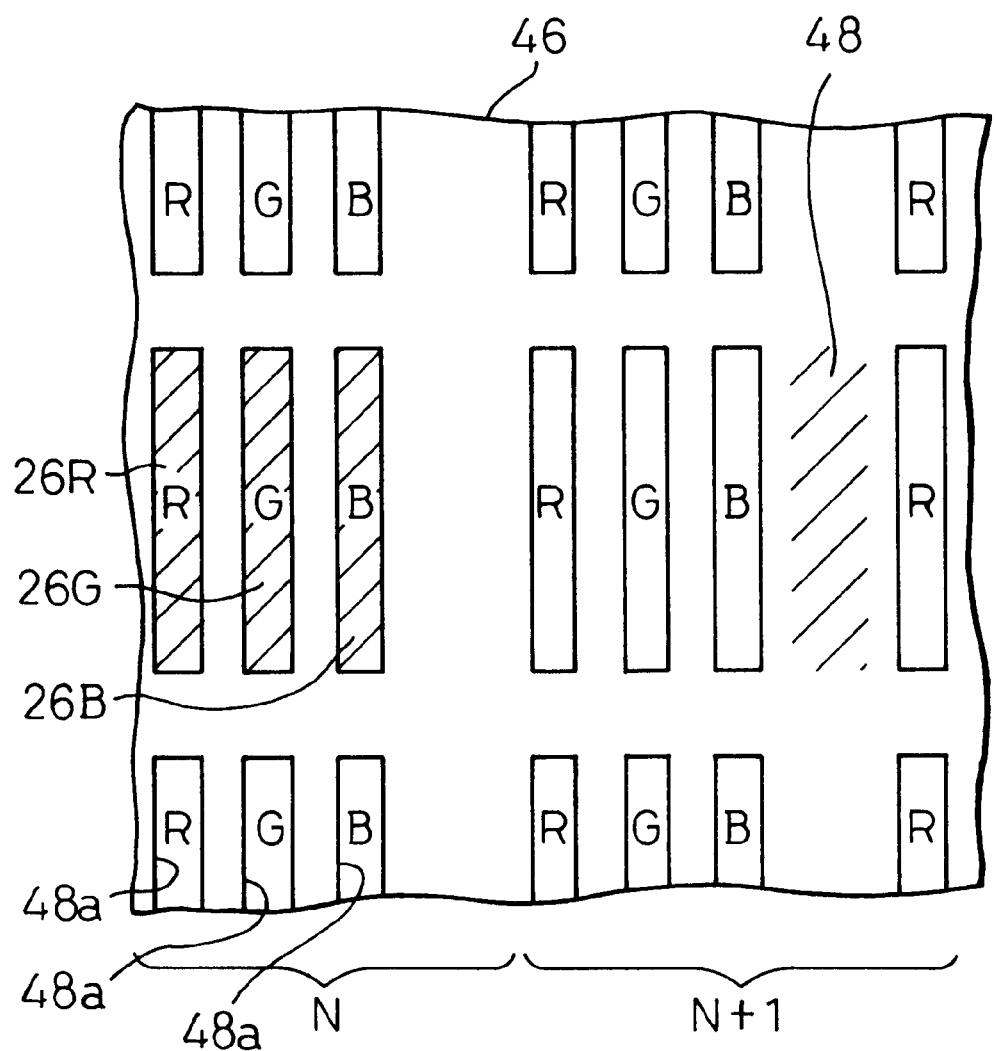
FIG. 16 is a view of a display device according to the third embodiment of the present invention.

FIG. 16 shows a display device according to the third embodiment of the present invention. In this embodiment, the display electrodes 26R, 26G and 26B in one picture element are arranged at a constant pitch, similar to the previous embodiment. Shading portions 48 are arranged in place of the additional white display electrodes 26W of FIG. 14. The shading portions 48 of FIG. 16 comprise a black matrix. Portions of the display electrodes 26R, 26G and 26B are openings in the black matrix, and the shading portions 48 are portions of the material of the black matrix.

In this case, the display electrodes 26R, 26G and 26B of the Nth picture element, to which the diffracted light of first order $L_R L_G$ and $L_B$ passing through the Nth condenser element is made incident, are shown by hatching. The shading portion 48 of the (N+1)th picture element, to which the diffracted light of the zeroth order $L_0$ passing through the same Nth condenser element is made incident, is shown by hatching. Therefore, in this case, the diffracted light of the zeroth order $L_0$ is completely blocked and a display without leaking light and with a good contrast can be realized. Also, the display electrodes 26R, 26G and 26B in one picture element are arranged at constant distances and in identical sizes. Therefore, it is possible to obtain the display device realizing high quality and high definition.

FIGS. 17 to 20 show a display device according to the fourth embodiment of the present invention. This embodiment is fundamentally similar to the first embodiment. This embodiment includes a diffraction grating 52 having a light diffracting function and a light condensing function, while the first embodiment includes the diffraction grating 12 and the condenser lens 14 separately. An example of such a diffraction grating 52 is disclosed, for example, in ASIA DISPLAY (1995), 727–729pp, "Holographic Optical Element for Liquid Crystal Projector".

Figure 18:
FIG. 18 is a cross-sectional view of the diffraction grating of FIG. 17.

The diffraction grating 52 has gratings comprising projections and recesses on the lower surface of the transparent plate, as shown in FIG. 18. Therefore, the light diffracting function based on the gratings of this diffraction grating 12 of FIGS. 1 and 2.

Figure 19:
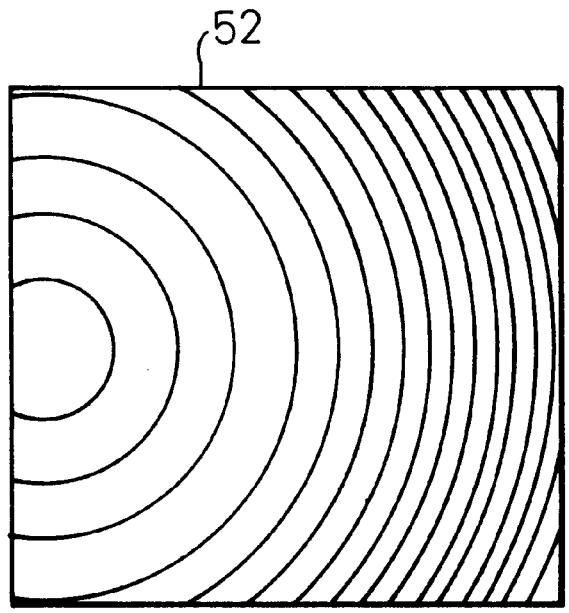
FIG. 19 is a view of a part of the diffraction grating of FIG. 17, the diffraction grating having the function of the condenser lens.

FIG. 19 shows a portion of the diffraction grating 52 corresponding to one picture element. The diffraction grating 52 has a distribution of refractive index in a predetermined pattern shown in FIG. 19 within the diffraction grating 52, and the distribution of refractive index functions as a condenser means.

Figure 17:
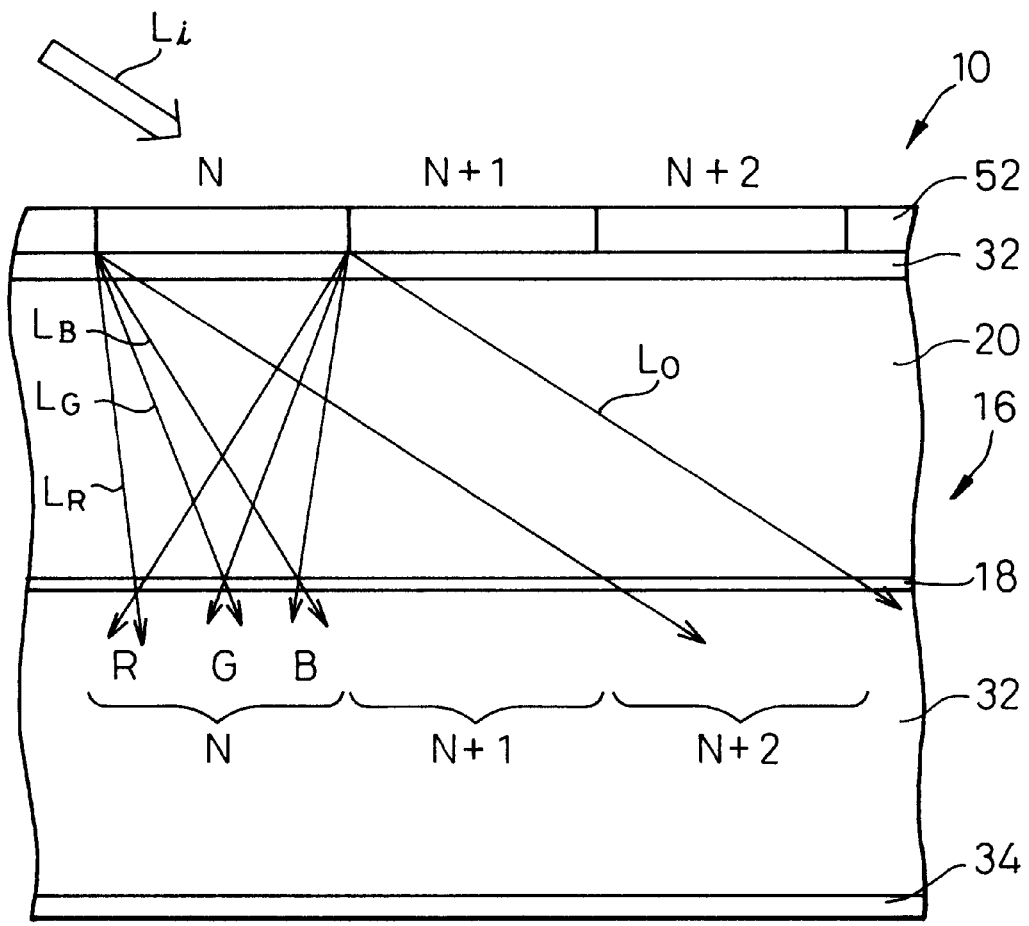
FIG. 17 is a view of a display device according to the fourth embodiment of the present invention.

Therefore, as shown in FIG. 17, when the light is made incident to the diffraction grating 52, the diffracted light of the first order $L_R$, $L_G$ and $L_B$ is diffracted and condensed by the diffraction grating 52, and made incident to the liquid crystal panel 16. The diffracted light of the first order $L_R$, $L_G$ and $L_B$, which is diffracted at a region of the diffraction grating 52 corresponding to one picture element and made incident to the liquid crystal panel 16, passes through the display electrodes 26R, 26G and 26B of one picture element. The diffracted light of the zeroth order $L_0$ is not diffracted and condensed by the diffraction grating 52, and made incident to the liquid crystal panel 16.

The angular relationship of the diffracted light of the first order $L_R$, $L_G$ is arranged in a manner similar to that of the first embodiment. The result of the examples 1 to 3 is also applied to the fourth embodiment. Therefore, the incident angle of the diffracted light of zeroth order $L_0$ made incident to the liquid crystal panel 16 is greater than the incident angle of the diffracted light of the first order $L_R$, $L_G$ is made incident to the liquid crystal panel 16, and the central portion of the green component in the green bandwidth light is made incident perpendicular to the liquid crystal panel 16.

The diffracted light of the first order $L_R$, $L_G$ and $L_B$ diffracted at a certain region N of the diffraction grating 52 passes through the display electrodes 26R, 26G and 26B of the Nth picture element (unit area) of the liquid crystal panel 16, and the diffracted light of the zeroth order $L_0$ passing through the Nth the region N of the diffraction grating 52 passes through the (N+2)th picture element (unit area) of the liquid crystal panel 16, which is different from the Nth picture element. The display electrodes 26R, 26G and 26B in one picture element are arranged in the order of the wavelength and in a vertical relationship. Therefore, the diffracted light of the zeroth order $L_0$ emerges upwardly and obliquely or downwardly and obliquely from the liquid crystal panel 16, and travels out of an ordinary field of vision. The diffracted light of the zeroth order $L_0$ will not affect the quality of the display.

As explained, in the embodiments of FIGS. 1 to 16, the light diffracting function and the light condenser function are carried out by the combination of the diffraction grating 12 and the condenser lens 14. In the embodiment of FIGS. 17 to 20, the light diffracting function and the light condenser function are carried out by the diffraction grating 52. It is possible to use both arrangements for carrying out color separation. In the following embodiments described hereinafter, a diffraction grating member 4 is used to represent both arrangements. It is to be understood that the condenser lens 14 is included in the diffraction grating member 54, if the diffraction grating member 54 is referred to the former arrangement. In addition, three display dots in one picture element are represented by the display electrodes 26R, 26G and 26B in the previous embodiments, but openings 26r, 26g and 26b of the black matrix (shading layer) overlapped on the display electrodes 26R, 26G and 26B are used to represent three display dots in one picture element in the following embodiments.

FURTHER FEATURE 1

Figure 21:
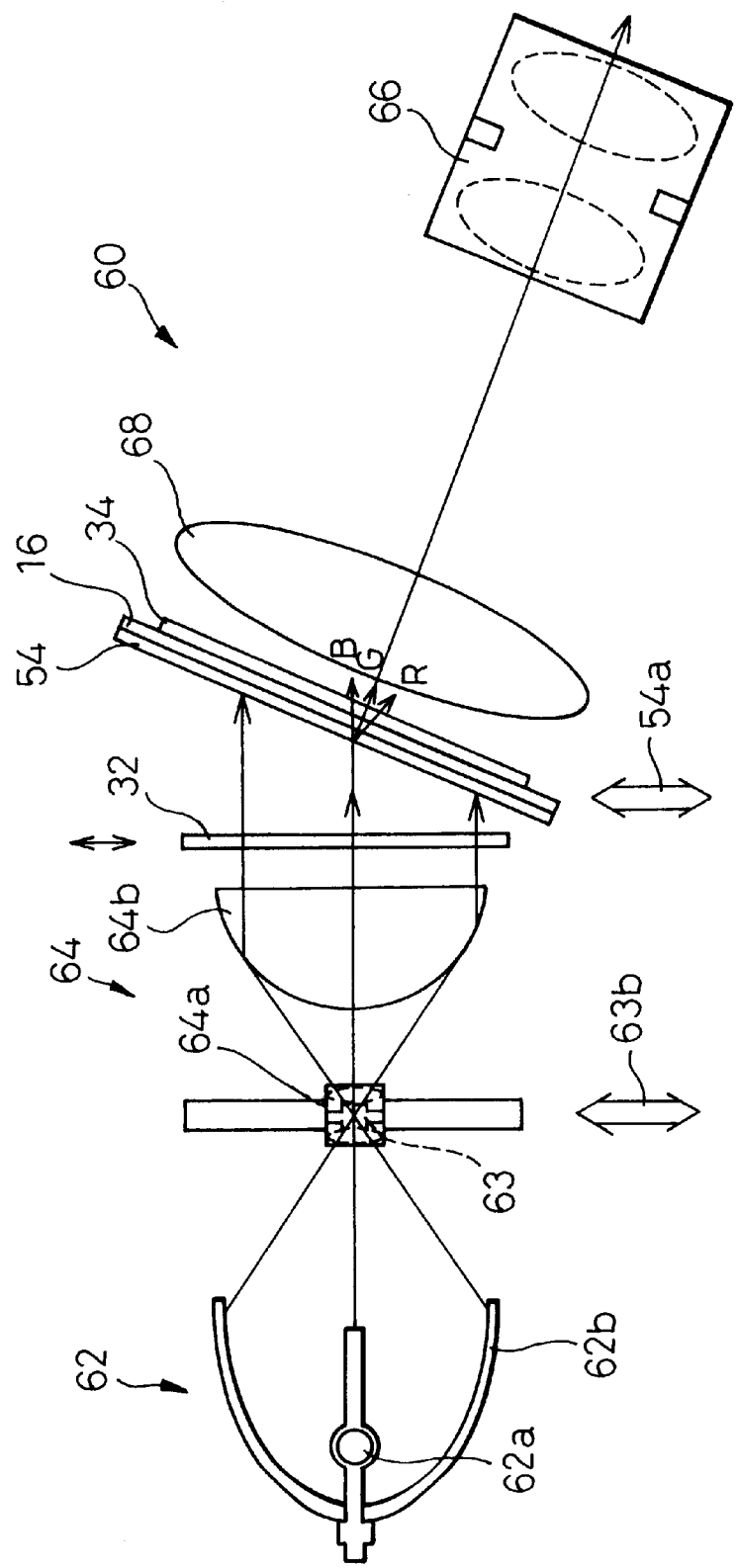
FIG. 21 is a view of a projection type display device according to the fifth embodiment of the present invention.

FIGS. 21 to 35 show a further feature of the present invention. FIG. 21 shows a projection type display device 60. The projection type display device 60 comprises a light source 62, an optical device 64 for converting light beams of the light emerging from the light source 62 into parallel beams, a diffraction grating member 54, a liquid crystal panel 16 as a light valve, and a projection lens 66. In this embodiment, a field lens 68 is arranged between the liquid crystal panel 16 and the projection lens 66.

The liquid crystal panel 16 comprises a TN type liquid crystal panel and is used with a polarizer 32 and an analyzer 34. The polarizer 32 is arranged at a position spaced from the liquid crystal panel 16. In the embodiment, the polarizer 32 is arranged between the optical device 64 and the diffraction grating member 54. With this arrangement, it is possible to effectively cool the polarizer 32 by forcibly supplying the cooling air since the polarizer 32 is not close to the liquid crystal panel 16 but is spaced apart from the latter. In this arrangement, the polarized light is made incident to the diffraction grating member 54, and the degree of polarization may be reduced. However, if the polarizer 32 is arranged such that P-polarized light or S-polarized light is made incident to the diffraction grating member 54, it is possible to avoid the reduction of contrast as much as possible. The analyzer 34 is adhered to the liquid crystal panel 16.

The light source 62 comprises a lamp 62a such as a metal halide lamp and a reflector 62b. The optical device 64 comprises an image extinguishing lens 64a and a collimater lens 64b. The image extinguishing lens 64a has an aperture 63 having a predetermined size. The reflector 62b has an ellipse shape, and is arranged so that the light supplied by the lamp 62a is condensed at the aperture 63. The collimater lens 64b converts light beams of light emerging from the aperture 63 into parallel beams. The image extinguishing lens 64a includes lenses therein to prevent an image of the lamp 62a from appearing in the light travelling toward the diffraction grating member 54.

Figure 22:
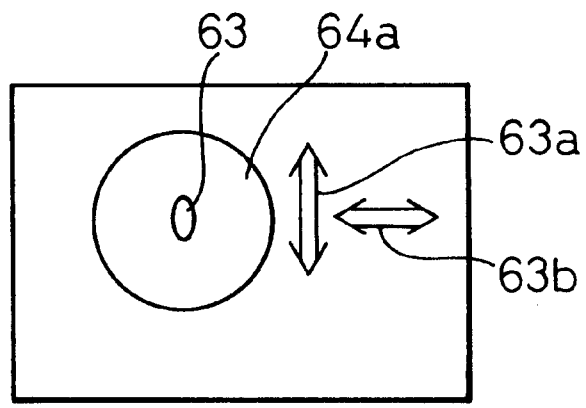
FIG. 22 is an enlarged front view of the aperture of FIG. 21.

As shown in FIG. 22, the aperture 63 does not have a real circular shape, but has a non-circular shape (ellipse shape in the embodiment). The aperture 63 thus has mutually perpendicular long and short axes directions 63a and 63b.

Figure 23:
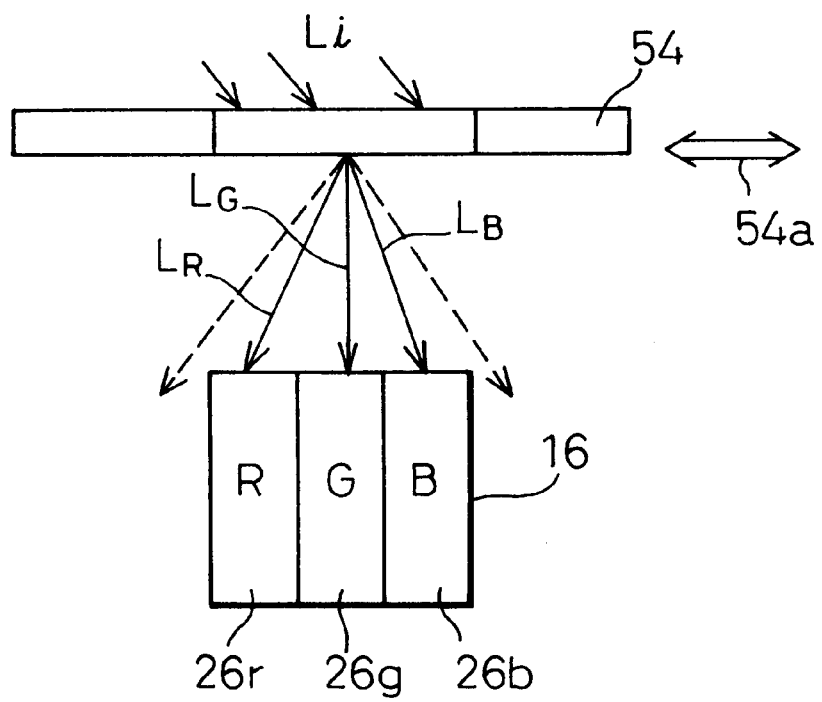
FIG. 23 is a diagrammatic view of the diffraction grating member and the liquid crystal panel.

As shown in FIG. 23, and as described above, the diffraction grating member 54 separates the incident light Li into the diffracted light of the zeroth order and color light components of the diffracted light of the first order $L_R$, $L_G$ and $L_B$. The color light components of the diffracted light of the first order $L_R$, $L_G$ and $L_B$ travel at color separation angles therebetween and are made incident to the liquid crystal panel 16. The incident light Li, the diffracted light of the zeroth order and the diffracted light of the first order $L_R$, $L_G$ and $L_B$ travel in the color separation plane 54a. In the examples 1 to 9 described above, the color separation angle between red and green color light components, and the color separation angle between green and blue color light components are 4.9°, 5.9°, 6.6° in the respective examples. However, the color separation angle is not limited to the illustrated values.

The higher the degree of parallelism of the light made incident to the diffraction grating member 54, the sharper the color separation can be carried out and the higher the color purity of the image formed by the liquid crystal panel 16. If the degree of parallelism of the light made incident to the diffraction grating member 54 is low, for example, the red component of the diffracted light of first order $L_G$, which must pass through the red display dot 26r, may be liable to travel out of the red display dot 26r, as shown by the broken arrow, and the quality of the display may be reduced.

Therefore, it is desirable that the optical device 64 supplies light with a high degree of parallelism to the diffraction grating member 54. To increase the degree of parallelism of light, it is necessary to reduce the size of the aperture 63 as much as possible. However, if the size of the aperture 63 is reduced, a portion of the light travelling from the reflector 62b to the aperture 63 is blocked by the aperture 63, and the amount of the available light is reduced. Therefore, the aperture 63 is shaped in an ellipse shape.

As shown in FIG. 21, the short axis directions 63b of the aperture 63 is generally parallel to the color separating plane 65a of the diffraction grating member 54. With this arrangement, the optical device 64 can supply the light with the high degree of parallelism to the diffraction grating member 54 in the color separating plane 65a.

Therefore, the long axis directions 63a of the aperture 63 is generally perpendicular to the color separating plane 65a of the diffraction grating member 54. However, in the plane perpendicular to the color separating plane 65, it is not necessary that the degree of parallelism of light is so high and it is desirable that a large quantity of light can be introduced. In this case, the display dots 26r, 26g and 26b. The degree of parallelism of light in the longer side direction of the display dots 26r, 26g and 26b is not so high, so the light can sufficiently spread in this direction and a bright display can be realized.

Figure 24:
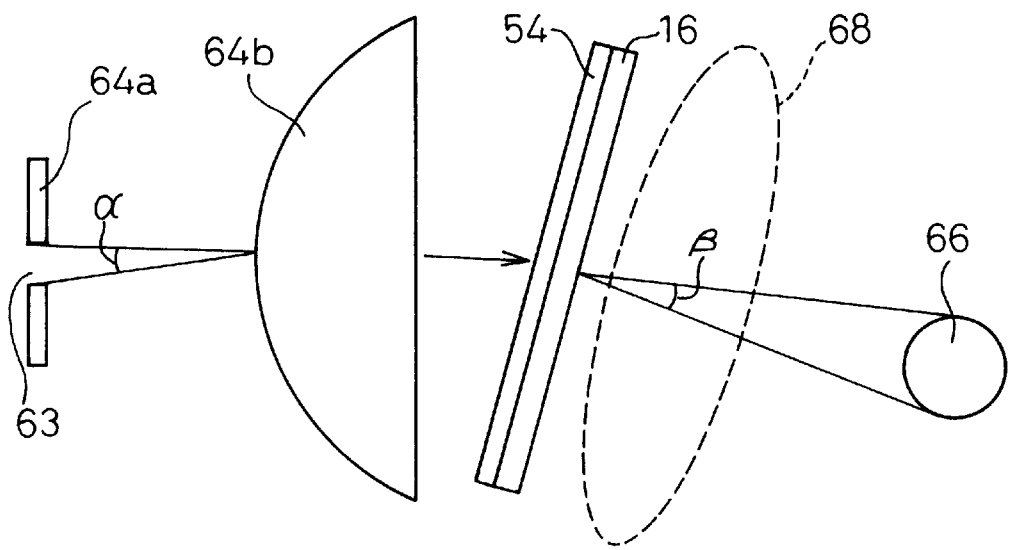
FIG. 24 is a view illustrating the relationship of the aperture and the collimater lens and the relationship of the liquid crystal panel and the projection lens.

As shown in FIG. 24, the degree of parallelism of light can be expressed by an apparent field angle α obtained by viewing the aperture 63 from a point on the collimater lens 64b. In the embodiment, the length of the aperture 63 in the long axis directions 63a thereof is 4 millimeter and the length of the aperture 63 in the short axis directions 63b thereof is 2 millimeter. The distance between the aperture 63 and the collimater lens 64b is 100 millimeter. Therefore, the apparent field angle α in the long axis directions 63a is 5.8°, and the apparent field angle α in the short axis directions 63b is 2.2°.

Also, in FIG. 24, a spreading angle β indicating that the light spreads from a point on the liquid crystal panel 16 toward the projection lens 66, is shown. This spreading angle β is the sum of the apparent field angle α and the color separation angle, and it is considerably large. If the projection lens 66 is arranged so as to directly project the liquid crystal panel 16, the projection lens 66 must have a larger diameter. In this embodiment, the field lens 68 is arranged between the liquid crystal panel 16 and the projection lens 66, so it is not necessary that the projection lens 66 must have a larger diameter.

Figure 25:
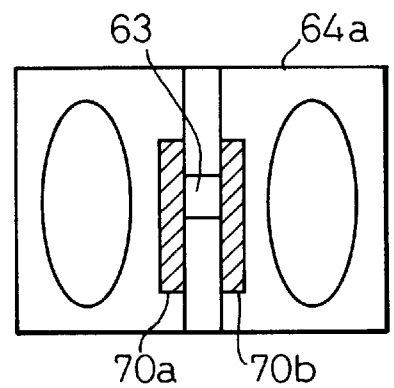
FIG. 25 is a view of the image extinguishing lens having an aperture and cut filters arranged therein.

FIG. 25 shows an example in which cut filters 70a and 70b are arranged in the image extinguishing lens 64a for cutting particular wavelength components. The image extinguishing lens 64a has the small aperture, and the cut filters 70a and 70b can be of a small size. Therefore, the cut filters 70a and 70b can be made cheaply, compared with the case where the cut filters 70a and 70b are arranged on the front and rear sides of the liquid crystal panel 16.

Figure 26:
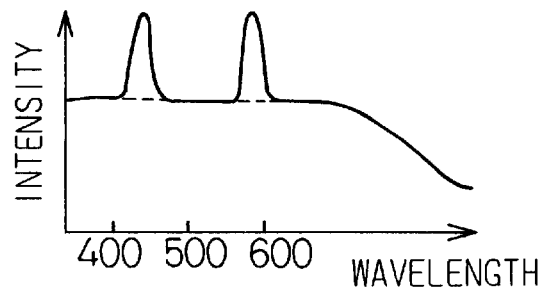
FIG. 26 is a view illustrating a characteristic curve of a light source having peaks.

In the embodiment, the yellow cut filter 70a and the cyan cut filter 70b are arranged on either side of the aperture 63. FIG. 26 shows an example of the light source 62 having a light intensity distribution having peaks at yellow and cyan regions. The yellow cut filter 70a and the cyan cut filter 70b can cut wavelength portions corresponding to the peaks to provide a uniform light intensity over all the wavelength region. Therefore, the cut filters 70a and 70b should be arranged depending on the characteristic of the light source 62.

Figure 27:
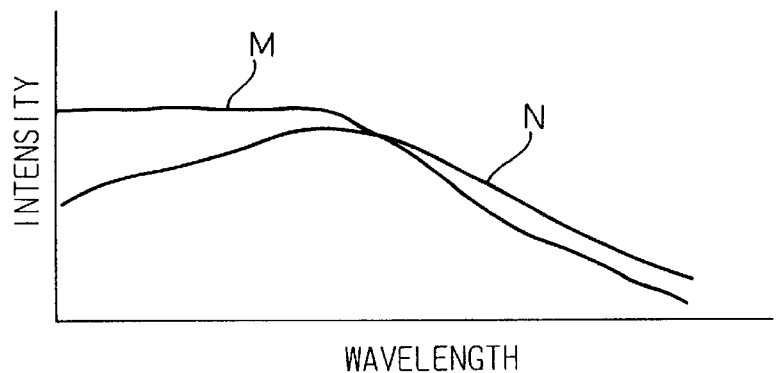
FIG. 27 is a view illustrating characteristic curves of a long life light source and a typical light source.

FIG. 27 shows another example of a light intensity distribution of further light sources 62. The curve M shows a light intensity distribution of a typical metal halide lamp, which has a relatively flat spectrum characteristic. However, the life of the metal halide lamp is relatively short. The curve N shows a light intensity distribution of a light source in which the gap distance is reduced so as to increase the life. However, if the light source having the characteristic of the curve N, the intensity of the red light component is reduced and the color balance of the formed image is deteriorated. In this case, it is advisable to change the areas of the display dots 26r, 26g and 26b, that is, to increase the area of the red display dot 26r, to improve the color balance.

Figure 28:
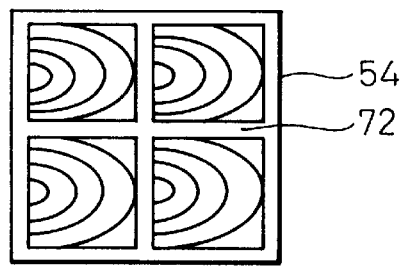
FIG. 28 is a view of an example of the diffraction grating member having a black matrix therein.

FIG. 28 shows an example in which a black matrix 72 is arranged for each unit region (each cell) of the diffraction grating member 54. In this case, the display device is arranged such that the cells of the diffraction grating member 54 are focussed on the screen (not shown). Therefore, the light is projected so that red, green and blue spots are formed on the screen without a gap between the two adjacent dots, and the quality of the image is improved. The resolution of the screen is designed, without depending on the least size of the display dots 26r, 26g and 26b, but depending on the size of the cells of the diffraction grating member 54 and it is not necessary to extremely reduce the resolution of the screen.

Figure 29:
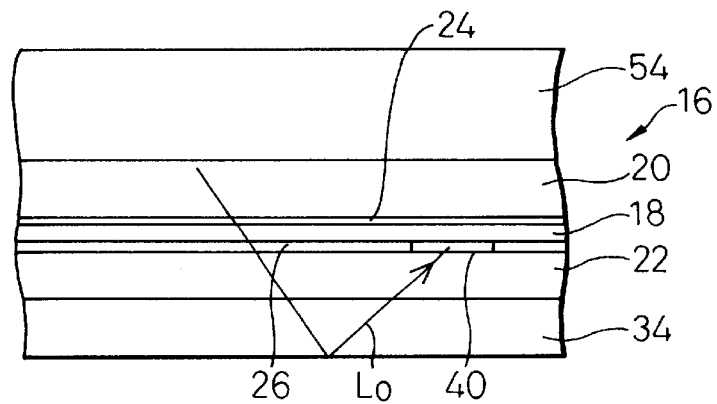
FIG. 29 is a view of an example of the analyzer having an anti-reflection coating thereon.

FIG. 29 shows an example of a modified liquid crystal panel 16. The layer of liquid crystal 18 is held between the transparent substrate plates 20 and 22, and the substrate plates 20 and 22 have transparent electrodes 24 and 26, respectively. The electrode 26 comprises display electrodes which are arranged with the TFTs 40. The analyzer 34 is adhered to the outer surface of the substrate plate 22. This analyzer 34 is a polarizer plate having an anti-reflection coating thereon. This anti-reflection coating is provided to prevent the diffracted light of the zeroth order $L_0$ from being reflected at the interface between the analyzer 34 and the outside air so as not to enter the TFT 40. Therefore, it is possible to prevent the TFTs 40 from being badly affected. It is also possible to adhere a polarization converting film (such as phase plate) in place the anti-reflection coating, so that the diffracted light of the zeroth order $L_0$ is converted into a P-polarized light at the interface between the analyzer 34 and the outside air. Due to the fact that the P-polarized light is less reflected, it is possible to prevent the TFTs 40 from being badly affected. Also, it is possible to use both the anti-reflection coating and the polarization converting film. Also, if the diffracted light of the zeroth order $L_0$ emerges from the analyzer 34 at Brewster's angle (that is, the diffracted light of the zeroth order $L_0$ is made incident to the analyzer 34 at Brewster's angle), the problem of reflection of the diffracted light of the zeroth order $L_0$ is solved.

Figure 30:
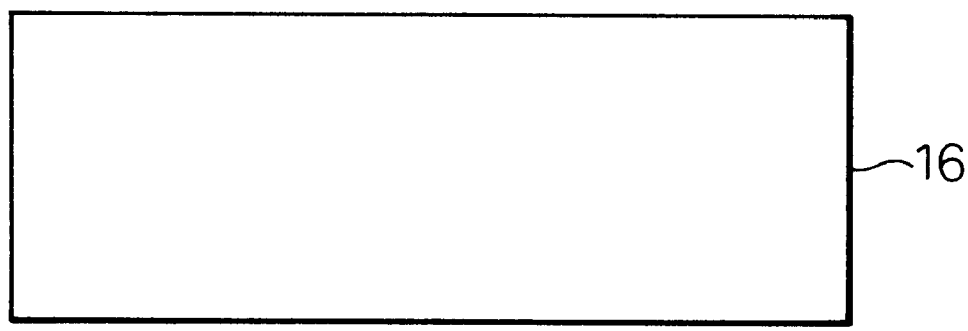
FIG. 30 is a view of an example in which an anamorphic projection lens is used.
Figure 30:
Figure 30:
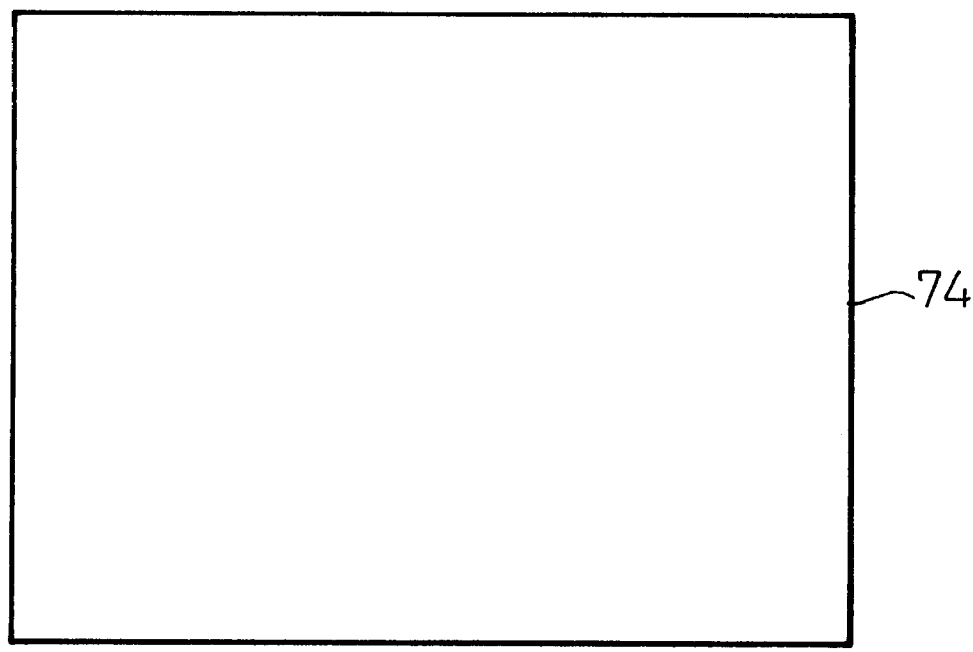

FIG. 30 shows the liquid crystal panel 16, the projection lens 66 and the screen 74. The ratio of the vertical size to the horizontal size of the liquid crystal panel 16 is 3:8, and the ratio of the vertical size to the horizontal size of the screen 74 is 3:4, for example. In this case, the projection lens 66 comprises an anamorphic lens in which its magnification changes in two mutually perpendicular directions, and the ratio of the vertical magnification and the horizontal magnification of the projection lens 66 is 2:1. In designing the display dots 26r, 26g and 26b, it is possible to change the ratio of the vertical size to the horizontal size of the liquid crystal panel 16 depending on the arrangement of the diffraction grating member 54 in this way.

Figure 31:
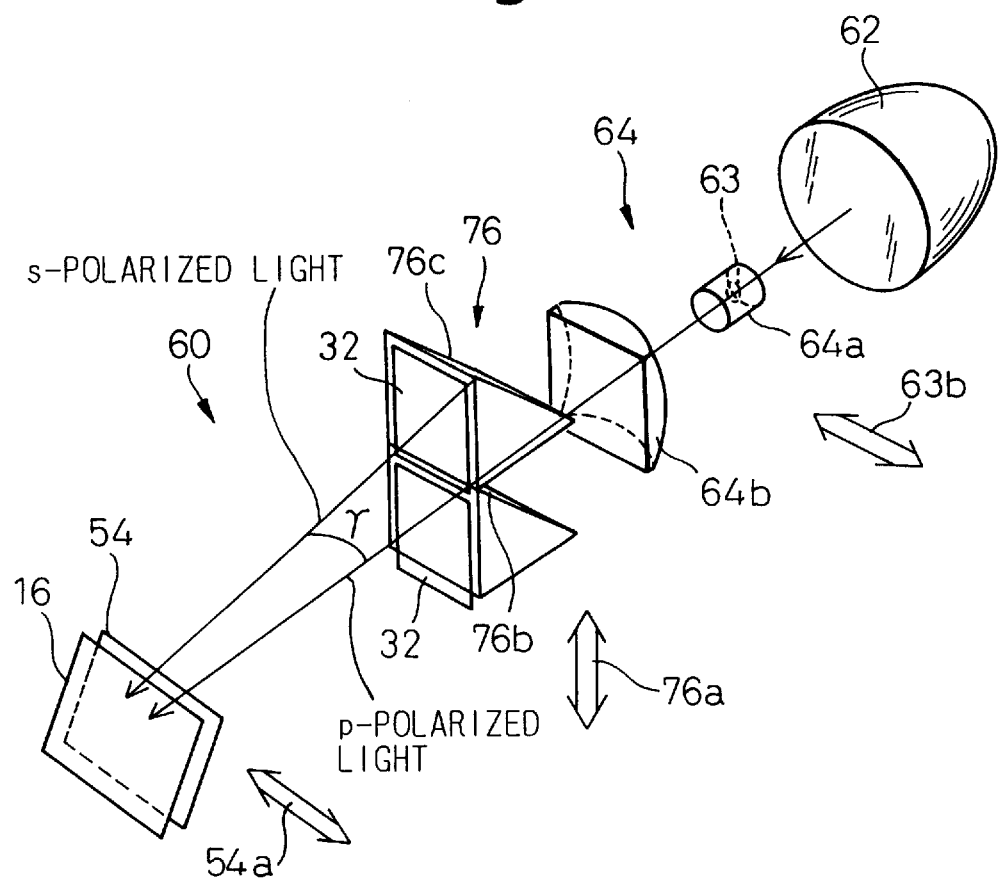
FIG. 31 is a view of a projection type display device according to the sixth embodiment of the present invention, including the polarization separating means and the diffraction grating member.

FIG. 31 shows another example of the projection type display device 60. The projection type display device 60 comprises the light source 62, the optical device 64 for converting light beams of the light emerging from the light source 62 into parallel beams, a polarization separating means 76, the diffraction grating member 54, the liquid crystal panel 16, and the projection lens 66 (not shown). The polarizer 32 is arranged between the optical device 64 and the diffraction grating member 54, and the analyzer 34 (not shown) is adhered to the liquid crystal panel 16.

The light source 62 comprises the lamp 62a such as a metal halide lamp and the reflector 62b. The optical device 64 comprises the image extinguishing lens 64a and the collimater lens 64b. The image extinguishing lens 64a has an aperture 63 having a predetermined size. The aperture 63 does not have a truly circular shape, and has mutually perpendicular long and short axes directions 63a and 63b.

Figure 32:
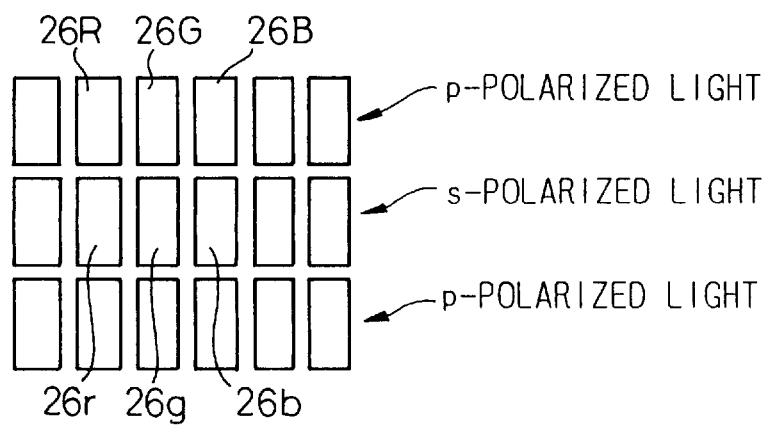
FIG. 32 is a view illustrating the arrangement of the display dots of FIG. 31.

The polarization separating means 76 separates the light of the light source 62 into a P-polarized light and an S-polarized light. The polarization separating direction is shown by the arrow 76a. The polarization separating means 76 comprises a polarization separating film 76b and a reflection mirror 76c, so that the P-polarized light passes through the polarization separating film 76b to the diffraction grating member 54, and the S-polarized light is reflected by the polarization separating film 76b and again reflected by the reflection mirror 76c toward the diffraction grating member 54. The P-polarized light and the S-polarized light propagate, forming a polarization separating angle γ therebetween, and are made incident to the alternating rows of the display dots 26r, 26g and 26b, as shown in FIG. 32.

Since the polarization separating device 76 separates the light of the light source 62 into the P-polarized light and the S-polarized light and the polarizer 32 receives the P-polarized light and the S-polarized light, the polarizer 32 does not absorb half of the light of the light source 62. Therefore, it is possible to increase the efficiency of the available light. In this case, the polarizer 32 can be omitted but it is preferably arranged to separate impure components of the P-polarized light and the S-polarized light.

The polarization separating direction 76a is determined in relation to the short axis directions 63b of the aperture 63 and the color separation plane 54a of the diffraction grating member 54. That is, at least one of the short axis direction 63b of the aperture 63, the color separating direction 54a of the diffraction grating member 54, and the polarization separating direction 76a of the polarization separating device 76, is not parallel to the remaining ones. The non-parallel direction is the direction having the greatest angle among the apparent field angle α of the aperture 63 (FIG. 24), the polarization separating angle γ of the polarization separating device 76 and the color separating angle 2θ of the diffracted grating member 54.

In the embodiment, the apparent field angle α is approximately 5° at most and the color separating angle 2θ is approximately 10°, but the polarization separating angle γ is approximately 15° based on the relationship of the disposition and size of the respective elements. Therefore, the polarization separating direction 76a is not parallel to the remaining directions. In the embodiment, the short axis directions 63b of the aperture 63 is horizontal, the polarization separating direction 76a of the polarization separating device 76 is vertical, and the color separating direction 54a of the diffraction grating member 54 is horizontal. Therefore, the polarization separating direction 76a of the polarization separating device 76 is parallel to the long axis directions 63a of the aperture 63. Therefore, the feature of the higher degree of parallelism in the short axis directions 63b of the aperture 63 is not influenced by the polarization separating direction 76a.

Figure 34:
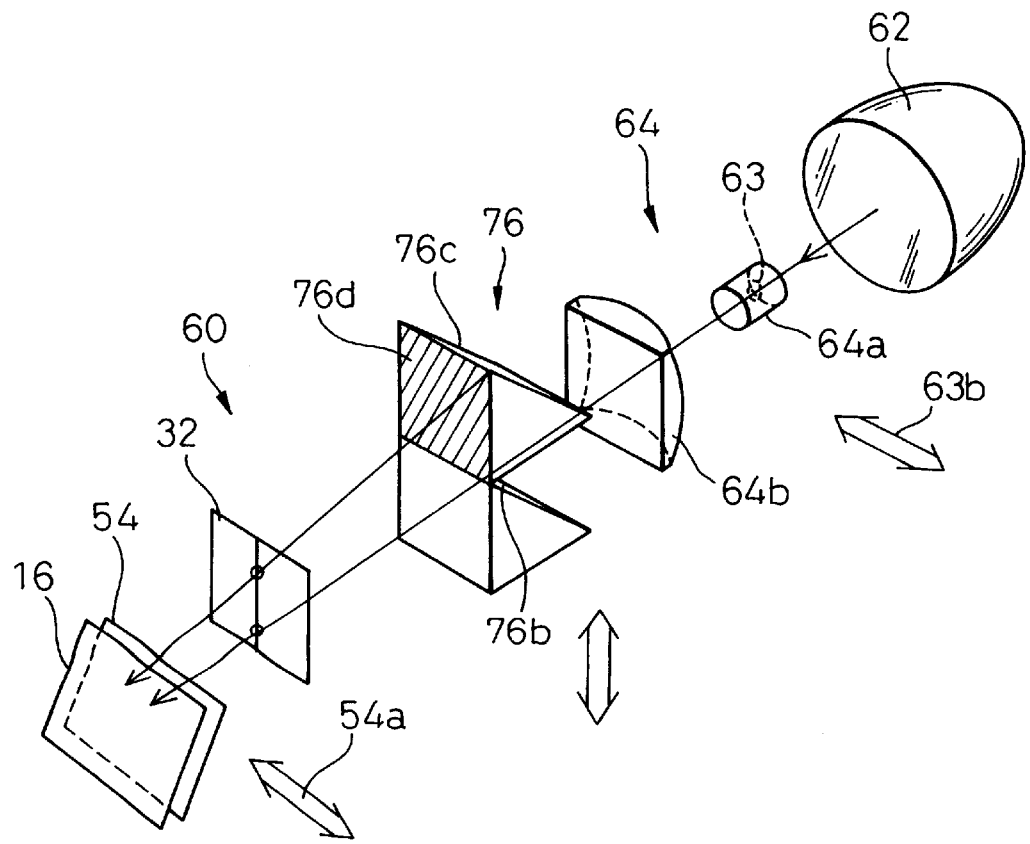
FIG. 34 is a view of a modified projection type display device.

FIG. 34 shows a modified example of the projection type display device 60 of FIG. 31. The projection type display device 60 differs from that of FIG. 31, in that it comprises the polarization separating film 76b, the reflection mirror 76c, and a polarization converting film 76d (such as phase plate) adhered to the reflection mirror 76c.

The P-polarized light passes through the polarization separating film 76b to the diffraction grating member 54, and the S-polarized light is reflected by the polarization separating film 76b and again reflected by the reflection mirror 76c to the diffraction grating member 54. This S-polarized light is converted to the P-polarized light by the polarization converting film 76d. Therefore, the two P-polarized lights travel, forming the polarization separating angle γ therebetween, and are made incident to the alternating rows of the display dots 26r, 26g and 26b, as shown in FIG. 32.

Figure 33:
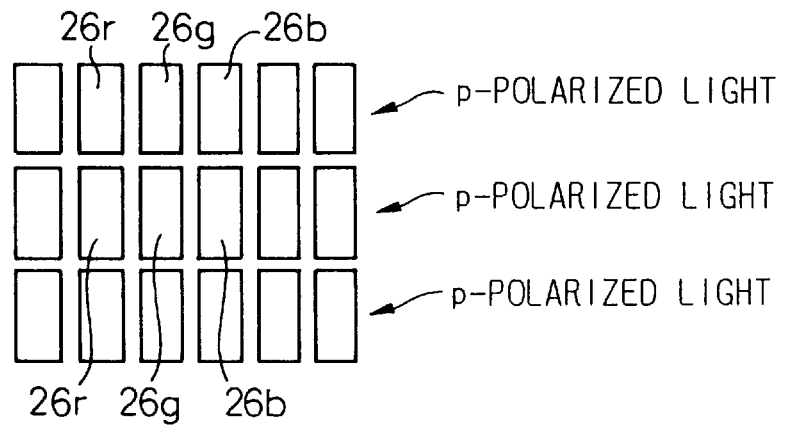
FIG. 33 is a view illustrating the arrangement of the display dots of FIG. 34.

The P-polarized light and the S-polarized light propagate, forming a polarization separating angle γ therebetween, and are made incident to the alternating rows of the display dots 26r, 26g and 26b, as shown in FIG. 33. In the case of FIG. 32, it is necessary to drive the liquid crystal, using a normally white mode and a normally black mode, in order to form the same images on the screen by the P-polarized light and the S-polarized light. However, it is not necessary to do so in the case of FIGS. 33 and 34.

Figure 35:
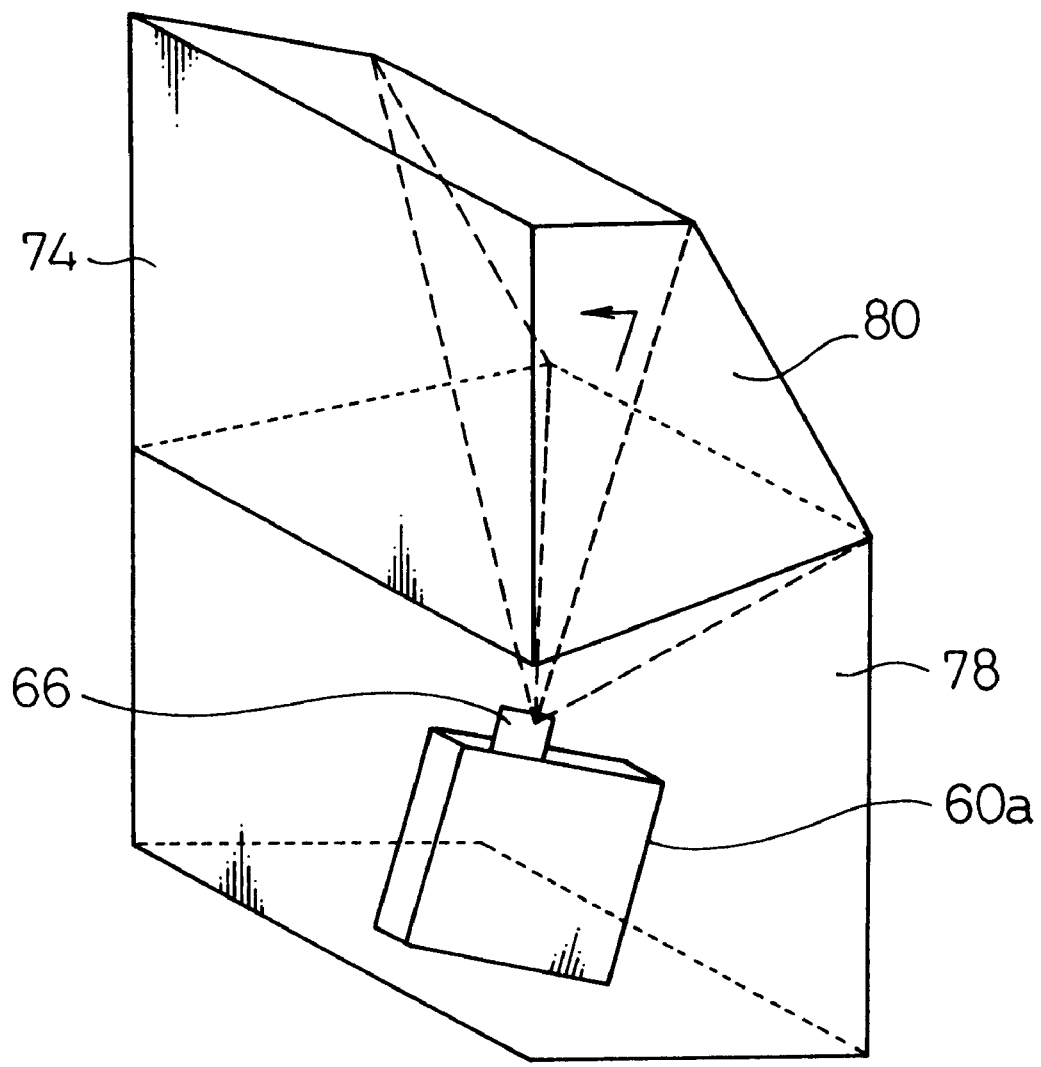
FIG. 35 is a view illustrating an example of the rear projection type liquid crystal display device.

FIG. 35 shows an example in which the projection type display device 60 of FIGS. 21 to 34 is constructed as a rear surface projection type display device. In this display device, an assembly 60a including the light source 62, the optical device 64, the diffraction grating member 54, the liquid crystal panel 16, and the projection lens 66 is arranged in a casing 78. The screen 74 is arranged on the front of the casing 78, and a mirror 80 is arranged between the projection lens 66 and the screen 74, so that the image light projected by the projection lens 66 is reflected by the mirror 80 and projected to the screen 74. The viewer sees the screen 74 from the outside the casing 78.

FURTHER FEATURE 2

FIGS. 36 to 69 show a further feature of the present invention. The display device comprises a light source 62, a polarization separating device 76, an array of micro-lenses 14 (condenser lens), a liquid crystal panel 16 arranged to receive the light passing through the array of micro-lenses 14 to modulate the light to form an image, and an analyzer 34. The polarization separating device 76 comprises a polarization separating film 76b for separating a polarized light into a P-polarized light and an S-polarized light by transmission and reflection and a reflection mirror 76c for reflecting the polarized light which passes through or is reflected by the polarization separating film 76b. The polarized light which passes through or is reflected by the polarization separating film 76b and travels toward the array of micro-lenses 14, and the polarized light which is reflected by the reflection mirror 76c, propagate toward the array of micro-lenses 14, forming a polarization separating angle γ therebetween.

In particular, the light of the light source 62 is a randomly polarized light and comprises suspected parallel beams. The polarization separating film 76b allows the P-polarized light to pass through and the S-polarized light to be reflected. Therefore, the S-polarized light reflected by the polarization separating film 76b travels toward the array of micro-lenses 14, and this S-polarized light is a substantially perfect linear polarized light. The P-polarized light passing through the polarization separating film 76b travels toward the reflection mirror 76c and is reflected by the reflection mirror 76c toward the array of micro-lenses 14 after again passing through the polarization separating film 76b. A part of the S-polarized light may pass through the polarization separating film 76b toward the reflection mirror 76c, and this S-polarized light along with the P-polarized light may be reflected by the reflection mirror 76c and travel toward the array of micro-lenses 14. However, since the separating film 76b allows the S-polarized light to be reflected, and the S-polarized light reflected by the reflection mirror 76c is reflected by the array of micro-lenses 14, it does not substantially reach the array of micro-lenses 14. Therefore, the P-polarized light is a substantially perfect linear polarized light. In this way, it is possible to obtain the liquid crystal display device in which loss of the polarized light is low and efficiency of the available light is high.

The polarization separating film 76b is formed as a plate type polarization beam splitter comprising laminated thin films. It is possible to arbitrarily set the polarization separating angle γ between the P-polarized light and the S-polarized light, by appropriately setting the oblique angle of the reflection mirror 76c relative to the polarization separating film 76b. The P-polarized light and the S-polarized lights separated in this way are made incident to the liquid crystal panel 16 having the array of micro-lenses 14. The focal distance of the array of micro-lenses 14 is designed so that the array of micro-lenses 14 focus at or near the display electrodes of the liquid crystal panel 16.

One of the micro-lenses 14 corresponds to two display dots, and the display dots to which the P-polarized light and the S-polarized lights are made incident are arranged alternatingly and horizontally (or vertically). The display dots to which the P-polarized light are made incident are arranged in rows horizontally (or vertically). The polarization plane of the polarized light passing through the display dot is rotated by driving the liquid crystal, and is absorbed by or allowed to pass through the analyzer 34 arranged behind the liquid crystal panel 16.

It is possible to obtain a highly bright display device according to this arrangement since loss of the light is small, compared with a conventional display device having a polarizer in front of the liquid crystal panel 16. In a typical conventional polarization beam splitter, several percent of the S-polarized light is transmitted and it is difficult to realize a perfect polarization separation. If the polarization separation is not perfect, the extinction ratio is reduced. In the polarization separation means 76 comprising the polarization separating film 76b and the reflection mirror 76c according to the present invention, such a reduction in the contrast does not occur.

Figure 38:
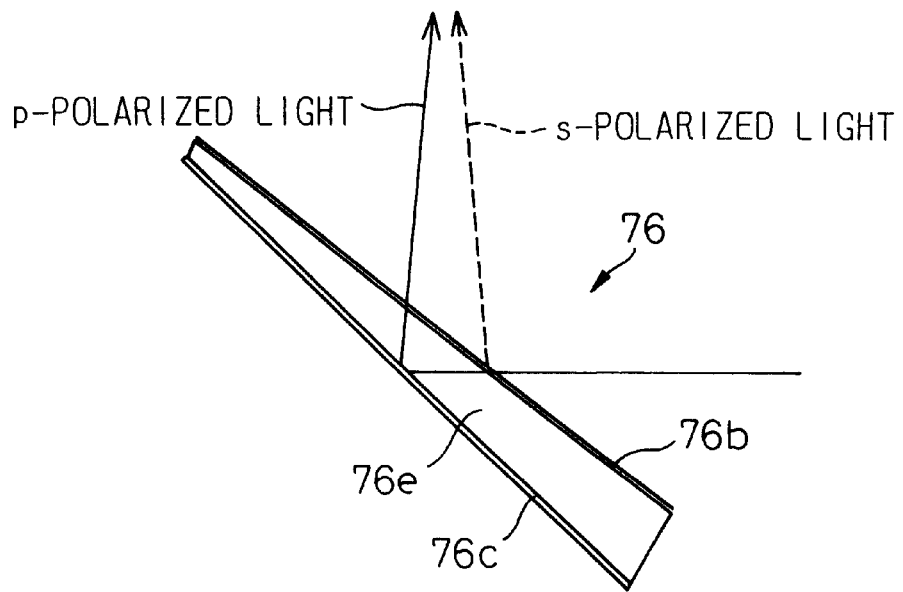
FIG. 38 is a view of a modified example of the polarization separating means.

FIG. 38 shows an example of the polarization separation means 76 in which the polarization separating film 76b and the reflection mirror 76c are attached to a wedge-shape common transparent base plate 76e. In this arrangement, it is possible to reduce the number of the parts and facilitate the adjustment of the assembly. The polarization separating film 76b is formed on the surface of the base plate 76e by laminating thin films, and the reflection mirror 76c is formed on the other surface of the base plate 76e by depositing aluminum thereon. It is possible to determine the polarization separating angle γ between the P-polarized light and the S-polarized light and the incident angle, by the design of the angle of the base plate 76e.

Figure 39:
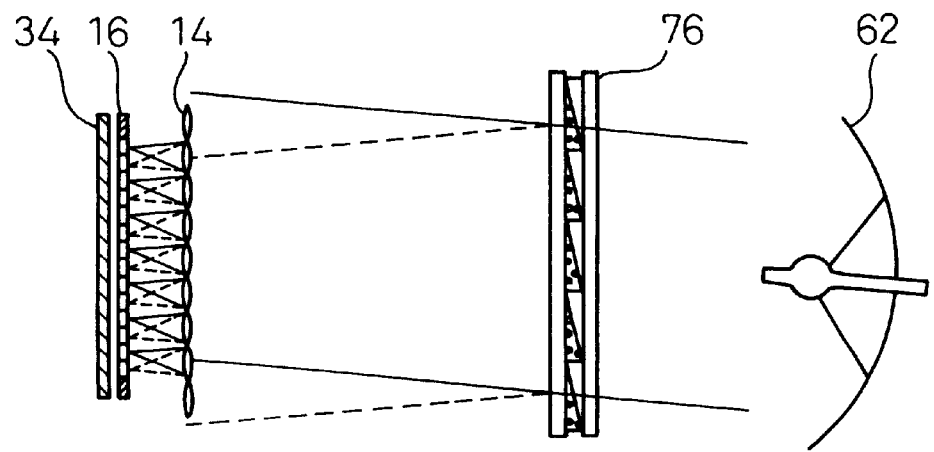
FIG. 39 is a view of a display device according to the eighth embodiment of the present invention.

FIG. 39 shows an example of a display device comprising a light source 62, a transmissive type polarization separating means 76, an array of micro-lenses 14 (condenser lens), a liquid crystal panel 16, and an analyzer 34.

Figure 40:
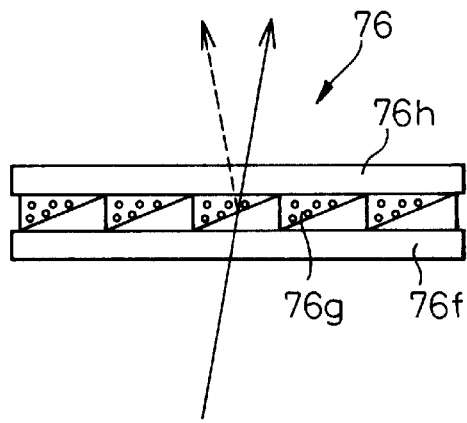
FIG. 40 is a partially enlarged view of the polarization separating means of FIG. 39.

As shown in FIGS. 39 and 40, the polarization separation device 76 comprises a transparent base plate 76f having a cavity having a prism-shaped cross section, and a material 76g having a birefringence such as liquid crystal. The polarization separation device 76 is made, by first fabricating the base plate 76f having the prism-shaped cavity and then inserting the liquid crystal 76g in the prism-shaped cavity after an opposite plate 76h is adhered to the base plate 76f. The liquid crystal 76g is arranged in a twistless alignment due to the alignment treatment of the substrate plates, and becomes a prism having a birefringence. It is possible to arbitrarily set the polarization separating angle γ between the P-polarized light and the S-polarized light, by setting the angle of the prism, the birefringence Δn, and the incident angle.

Figure 41:
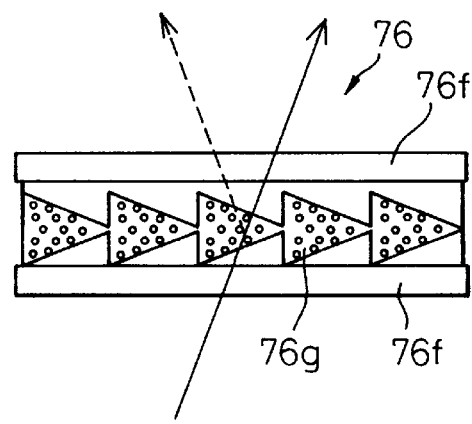
FIG. 41 is a view of an example of the polarization separating means modified from that of FIG. 40.

Also, it is possible to increase the polarization separating angle γ, by superposing two base plates 76f having the prism-shaped cross section, as shown in FIG. 41.

Figure 42:
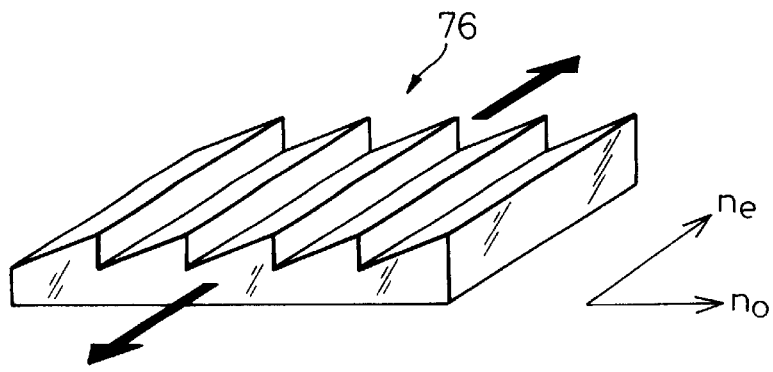
FIG. 42 is a view of a modified example of the polarization separating means.
Figure 43:
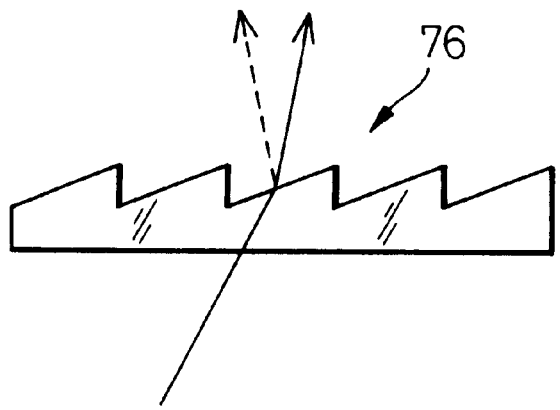
FIG. 43 is a view illustrating an example of the polarization separating means modified from that of FIG. 43.

FIG. 42 and 43 show an example of the polarization separation device 76 which comprises an organic high polymer having a prism-shaped cross section, the organic high polymer being stretched. For example, the prism having a birefringence can be fabricated by forming an organic high polymer such as PVA into a prismatic shape and stretching the organic high polymer in one direction shown by the arrow in FIG. 42. According to this step, it is possible to obtain a cheaper prism having a birefringence since it is possible to use a generally available organic high polymer.

Figure 44:
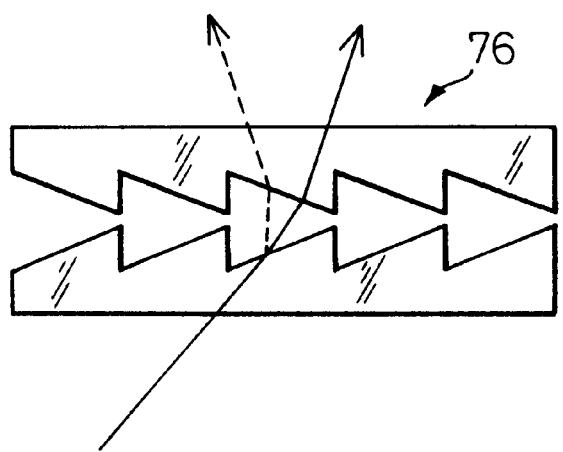
FIG. 44 is a view of an example of the polarization separating means modified from that of FIG. 40.

Also, it is possible to increase the polarization separating angle γ, by superposing two prisms of FIG. 42, as shown in FIG. 44.

Figure 36:
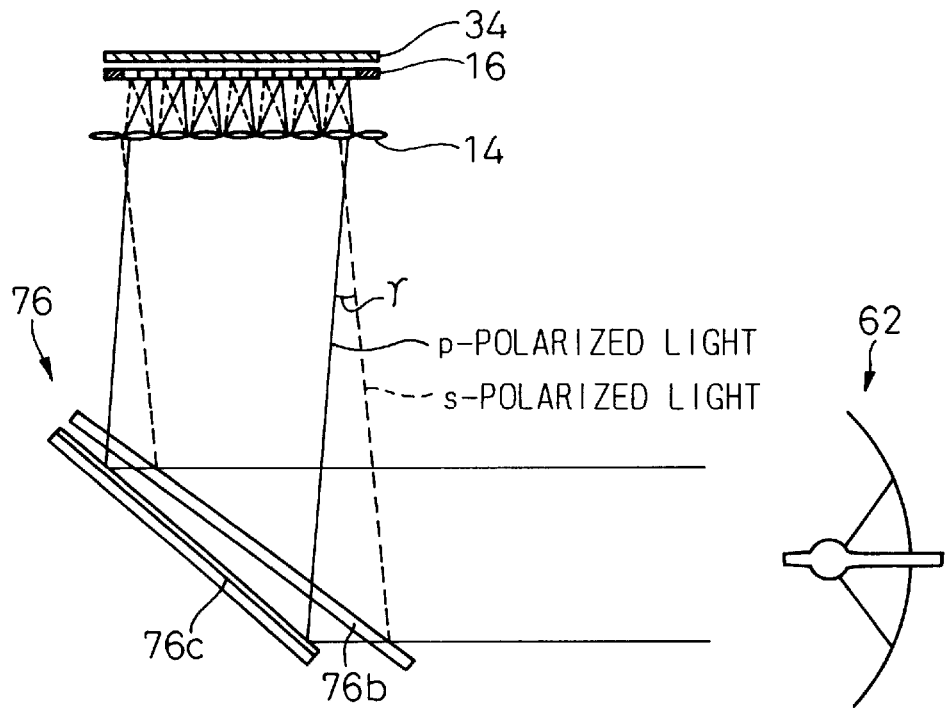
FIG. 36 is a view of a display device according to the seventh embodiment of the present invention.
Figure 37:
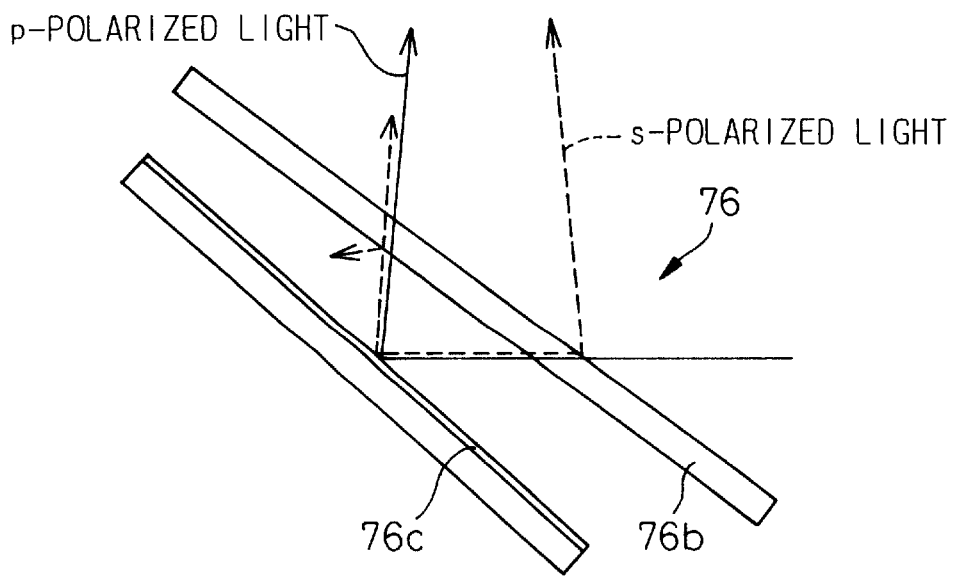
FIG. 37 is a partially enlarged view of the polarization separating means of FIG. 36.
Figure 45:
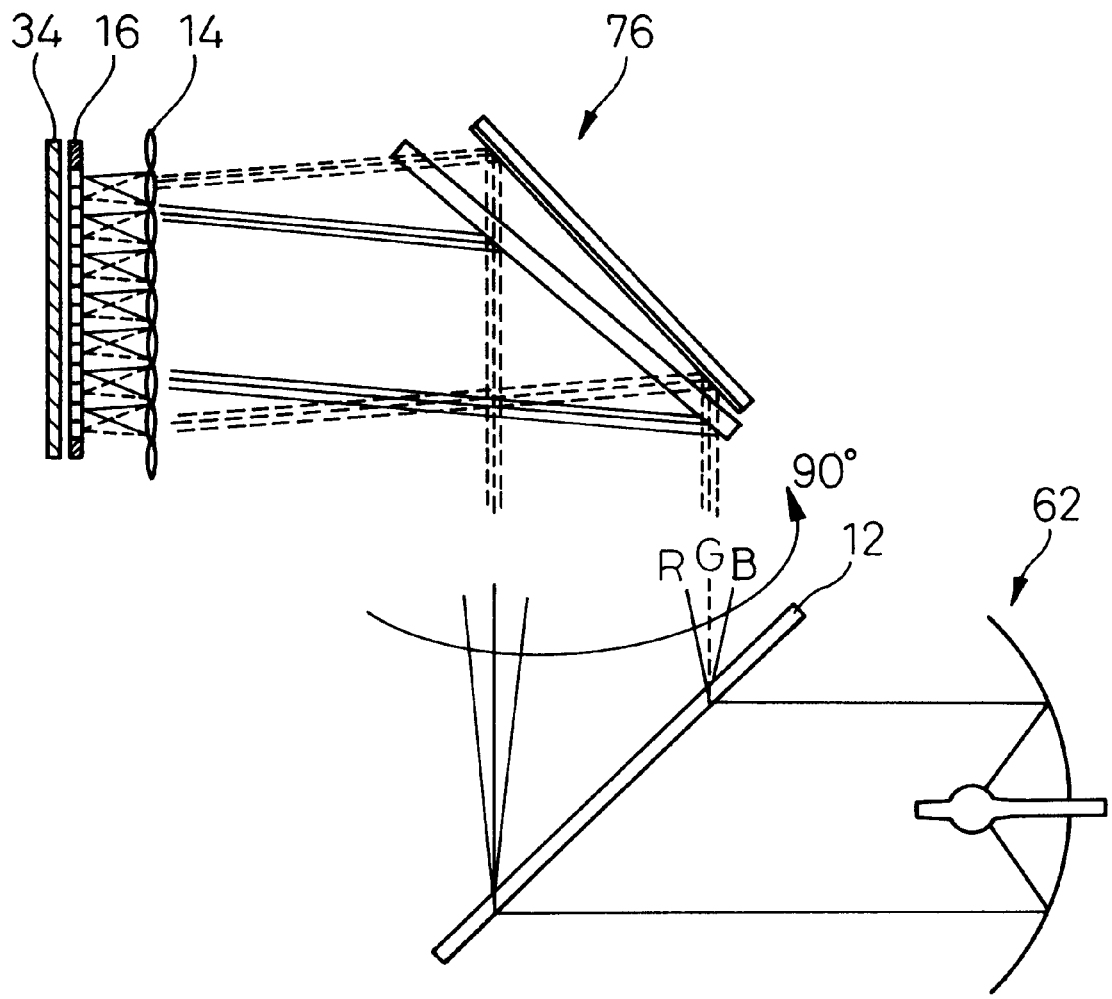
FIG. 45 is a view of the display device similar to that of FIG. 36, with a diffraction grating added thereto.
Figure 46:
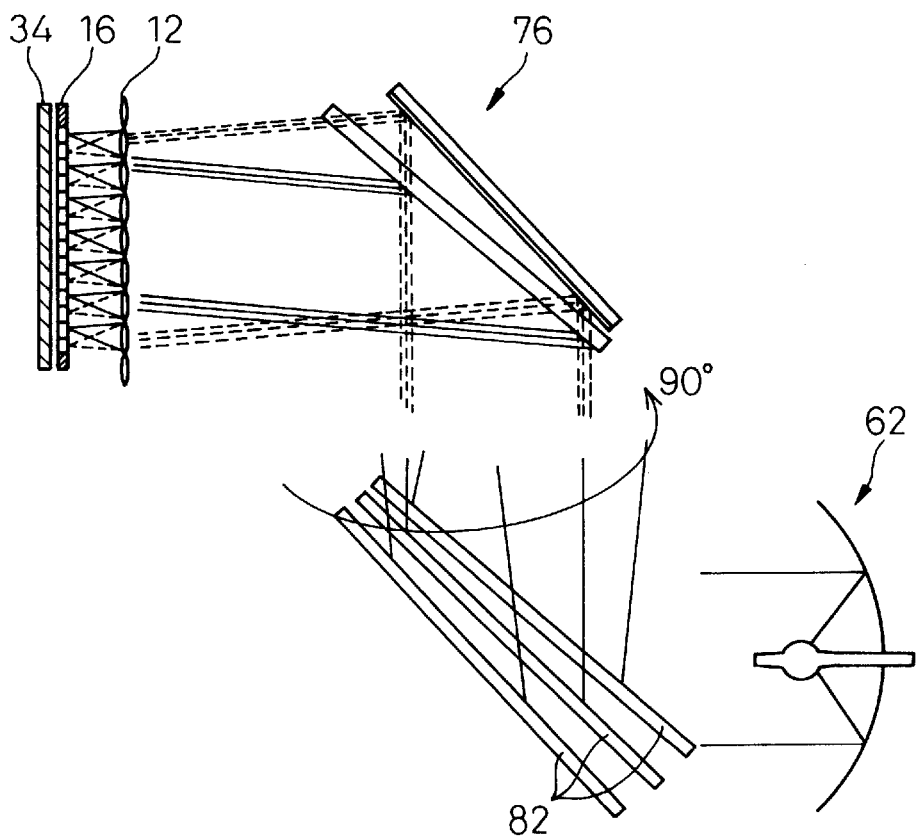
FIG. 46 is a view of the display device similar to that of FIG. 36, with dichroic mirrors added thereto.

FIGS. 45 and 46 show examples of an arrangement in which a color separating means is added to the display device of FIG. 36.

In FIG. 45, the color separating means comprises a diffraction grating 12. The operation of this embodiment will be apparent from the foregoing embodiments.

In FIG. 46, the color separating means comprises dichroic mirrors 82. The dichroic mirrors 82 comprise conventional dichroic mirrors and are arranged for red, green and blue colors, respectively. The three dichroic mirrors 82 function in a similar way to the diffraction grating 12.

Figure 47:
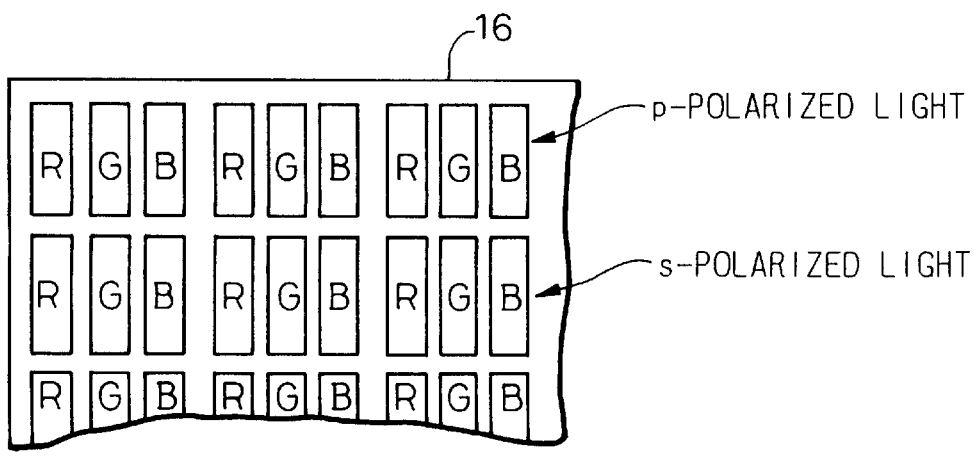
FIG. 47 is a view of the display electrodes of the display devices of FIGS. 45 and 46.
Figure 48:
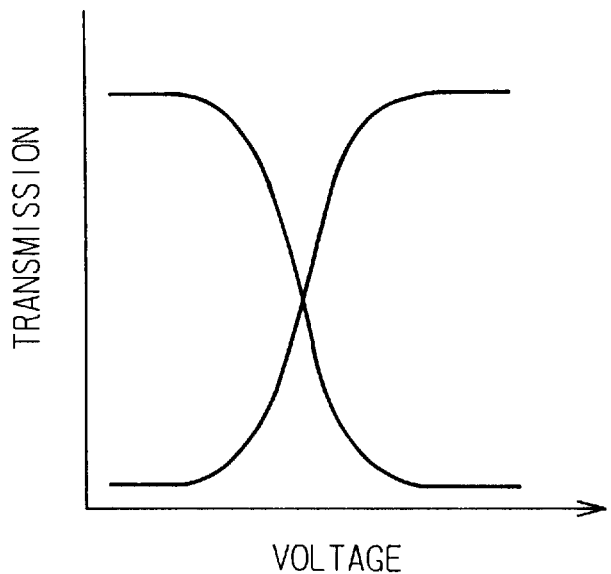
FIG. 48 is a view illustrating the relationship of transmission and voltage applied to the display electrodes of FIG. 47.

FIG. 47 shows the disposition of the display elements regarding the arrangement of FIGS. 45 and 46. The light of the light source is separated into color light components by the diffraction grating 12 or by the dichroic mirrors 82, and the incident angles of the color components having different wavelengths change. In the illustrated example, the light is horizontally separated into R, G and B components. The separated color light components are then vertically separated into the P-polarized light and the S-polarized light, and the angle of propagation of the light changes with respect to the states of the polarized lights. Therefore, each picture element is divided vertically into two and horizontally into three, so that six display dots correspond to one micro-lens. The driving voltage applied to the display dots for the P-polarized light is changed in reverse relative to the driving voltage applied to the display dots for the S-polarized light, so that a normal display can be obtained.

Figure 49:
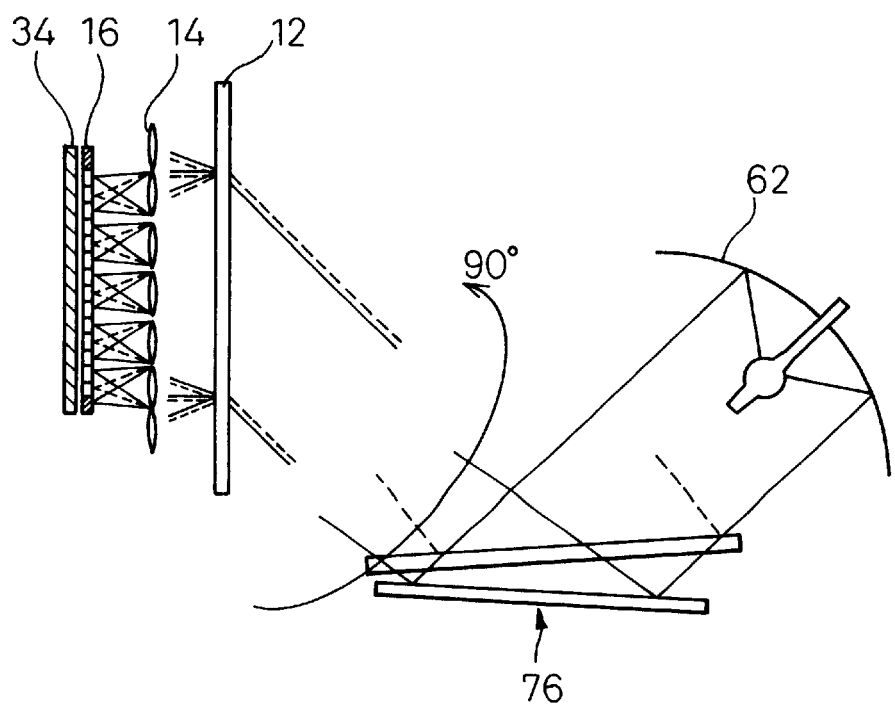
FIG. 49 is a view of an example having the polarization separating means and the diffraction grating member arranged in reverse to those of FIG. 45.

FIG. 49 shows an example in which the arrangement of the diffraction grating 12 and the polarization separating means 76 is reversed to that of FIG. 45.

Figure 50:
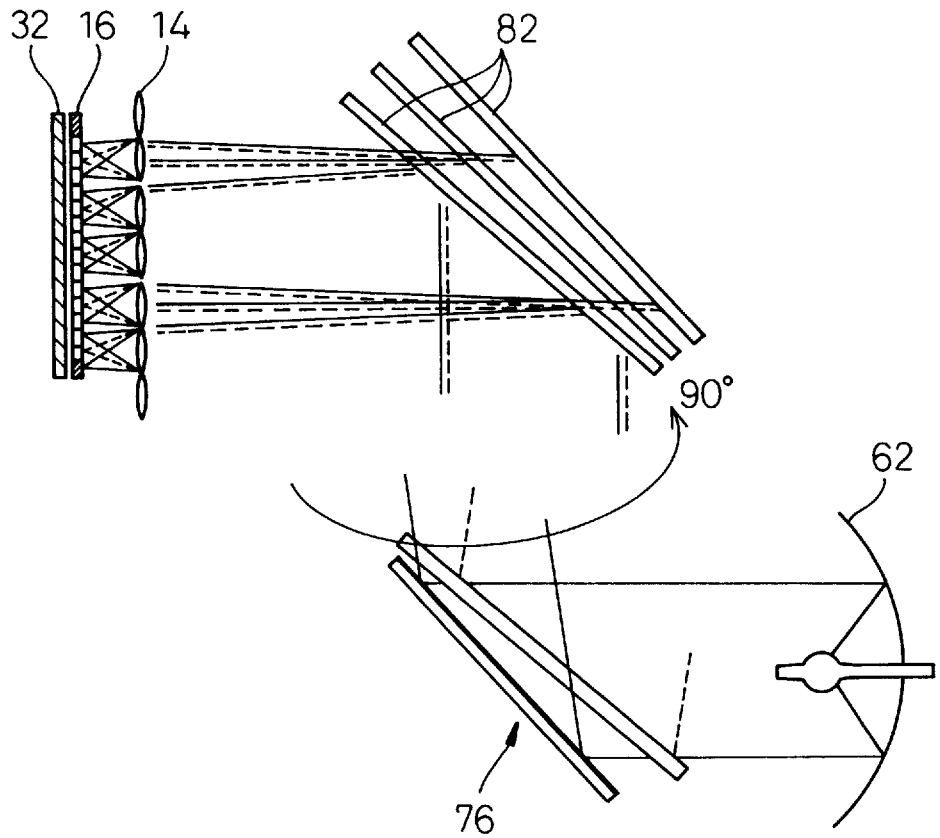
FIG. 50 is a view of an example having the polarization separating means and the dichroic mirrors arranged in reverse to those in FIG. 46.

FIG. 50 shows an example in which the arrangement of the diffraction grating 12 and the polarization separating means 76 is reversed to that of FIG. 46.

Figure 51:
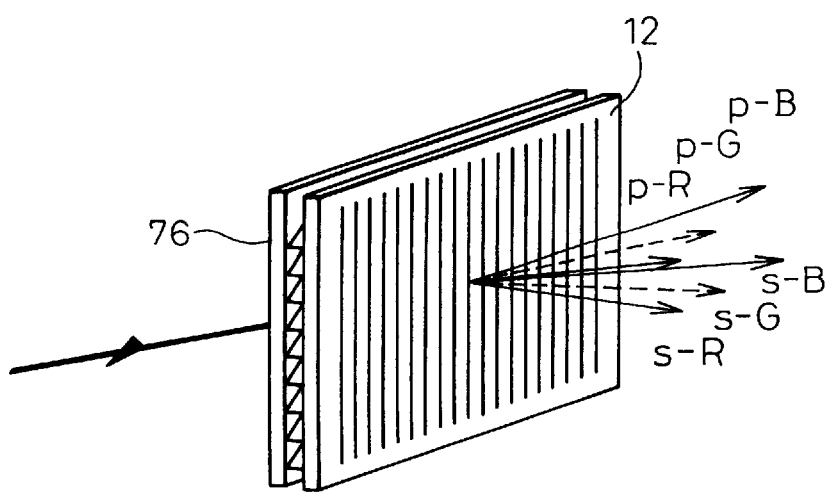
FIG. 51 is a view of an example of a composite element comprising the polarization separating element and the color separating element.
Figure 52:
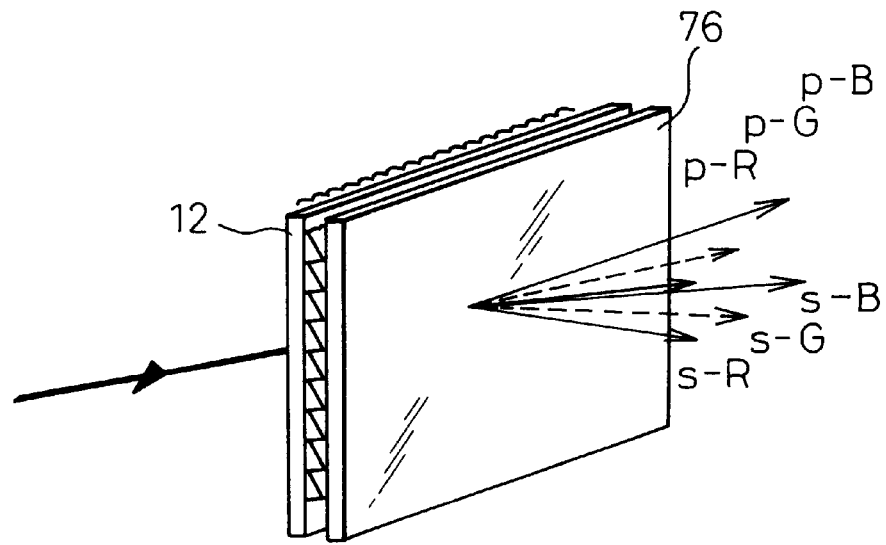
FIG. 52 is a view of an example having the polarization separating means and the color separating element arranged in reverse to those of FIG. 51.

FIGS. 51 and 52 show the polarization separating and color separating means comprising the transmissive type polarization separating means 76 shown in FIGS. 39 to 41 and the diffraction grating 12 which are attached to each other. The light is vertically separated into the P-polarized light and the S-polarized light by the polarization separating means 76, which comprises the liquid crystal prism or the birefringence prism, and then horizontally separated into the color components by the diffraction grating 12. The color light components separated in this way are made incident to the liquid crystal panel 16 having the array of the micro-lenses 14, and it is possible to produce a display device in a simple construction with a high efficiency for available light.

Figure 53:
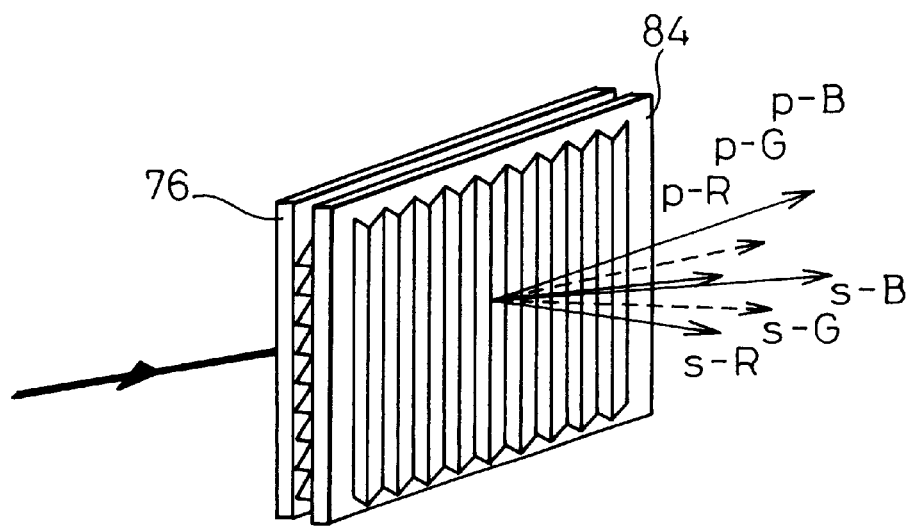
FIG. 53 is a view of another example of a composite element comprising the polarization separating element and the color separating element.

FIG. 53 shows an example which uses a wavelength dispersion of a prism 84 as the color separating means. It is possible to arbitrarily separate the light into color components by appropriately designing the material for, and the angle of, the prism 84.

Figure 54:
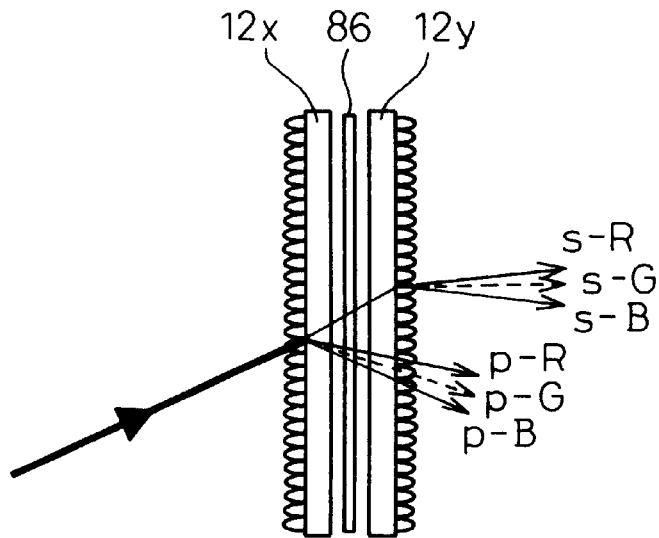
FIG. 54 is a view of an example having two diffraction gratings for carrying out polarization separation and color separation.

FIG. 54 shows a composite element comprising two diffraction gratings 12x and 12y and a polarization converting element 86 to effect the polarization separation and the color separation.

Figure 55:
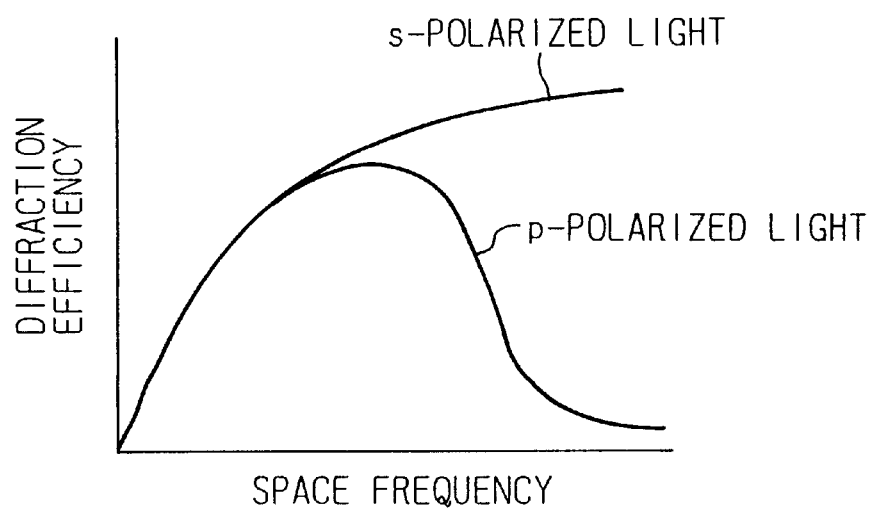
FIG. 55 is a view illustrating an example of a diffraction grating in which S-polarized light only can diffract light.

As shown in FIG. 55, the diffraction grating provides a polarization characteristic according to the space frequency of the grating interval. That is, a certain diffraction grating can diffract the S-polarized light only at a certain space frequency. The two diffraction gratings 12x and 12y are able to diffract the S-polarized light only.

In FIG. 54, the first diffraction grating 12x diffracts only the S-polarized light within the source light and the color separation is carried out by this diffraction. This S-polarized light passes through the polarization converting element 86 (1/2 phase plate) which causes the polarization state to be rotated 90 degrees so as to convert the S-polarized light into the P-polarized light, and the light passes through the second diffraction grating 12y as the P-polarized light. The initially S-polarized light is thus converted into the P-polarized light when passing through the second diffraction grating 12y and is not diffracted by the second diffraction grating 12y. On the other hand, the P-polarized light of the light source is not diffracted when passing through the first diffraction grating 12x, and the polarization state of the P-polarized is rotated 90 degrees by the polarization converting element 86 (1/2 phase plate) and converted into the S-polarized light. This S-polarized light is diffracted when passing through the second diffraction grating 12y and the color separation is carried out by this diffraction. In this way, the composite element of FIG. 54 can carry out the polarization separation and the color separation.

Figure 56:
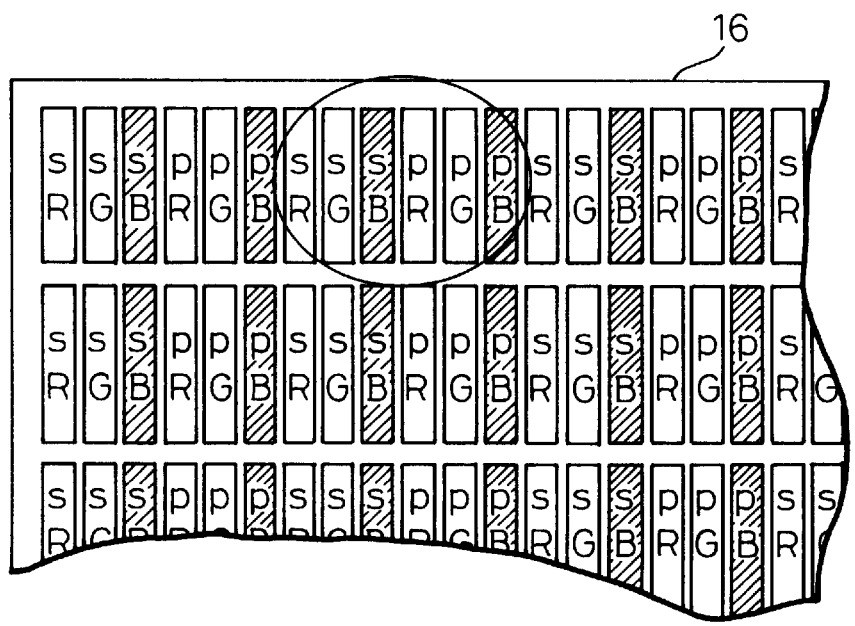
FIG. 56 is a view of the arrangement of the picture electrodes of the display device of FIG. 54.

It is possible to enable the polarization separating function and the color separating function simultaneously, by using two diffraction gratings 12x and 12y with different space frequencies. Also, in the case where the space frequencies of two diffraction gratings 12x and 12y are identical, it is possible to obliquely arrange one of the two diffraction gratings 12x and 12y relative to one another, so that the direction of the polarization separation is identical to the direction of the color separation. Therefore, the picture elements in this case are arranged, as shown in FIG. 56. One micro-lens corresponds to six horizontally-arranged display dots.

Figure 57:
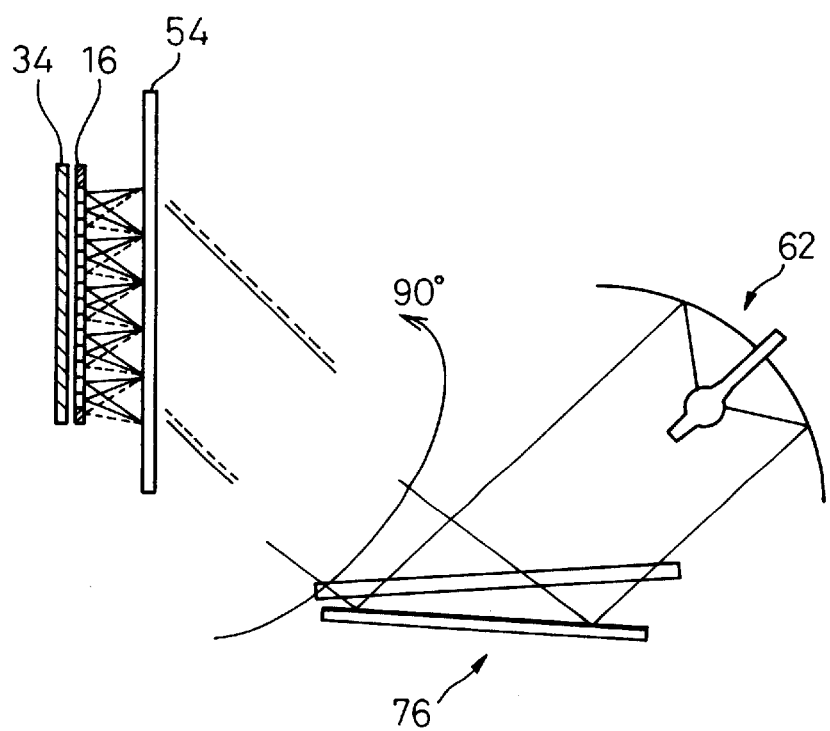
FIG. 57 is a view of a further example of the display device comprising the polarization separating element and the color separating element.

In the above description, the diffraction grating 12 and the array of micro-lenses 14 are arranged separately, but it is possible to use the diffraction grating member 54 having the color separating function and the light condensing function, in place of the diffraction grating 12 and the array of micro-lenses 14. For example, as shown in FIG. 57, it is possible to use the polarization separating means 76 and the diffraction grating member 54 in combination.

Figure 58:
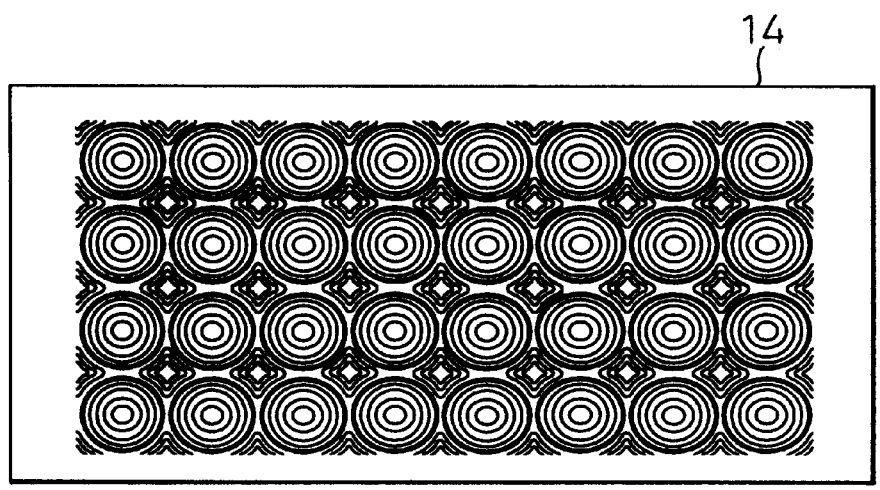
FIG. 58 is a view of the arrangement of the lenses of the array of micro-lenses.
Figure 59:
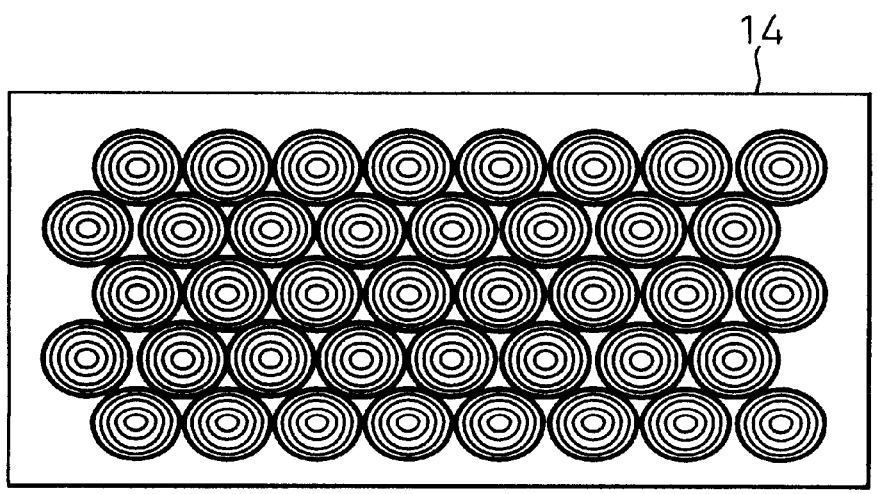
FIG. 59 is a view of another arrangement of the lenses of the array of micro-lenses.

In addition, the arrangement of the micro-lenses of the array of micro-lenses 14 can be arranged in the body centered arrangement as shown in FIG. 58 or in the close packed arrangement as shown in FIG. 59. The diffraction grating can be fabricated by a lithography technique or by a direct drawing by laser beams.

Figure 60:
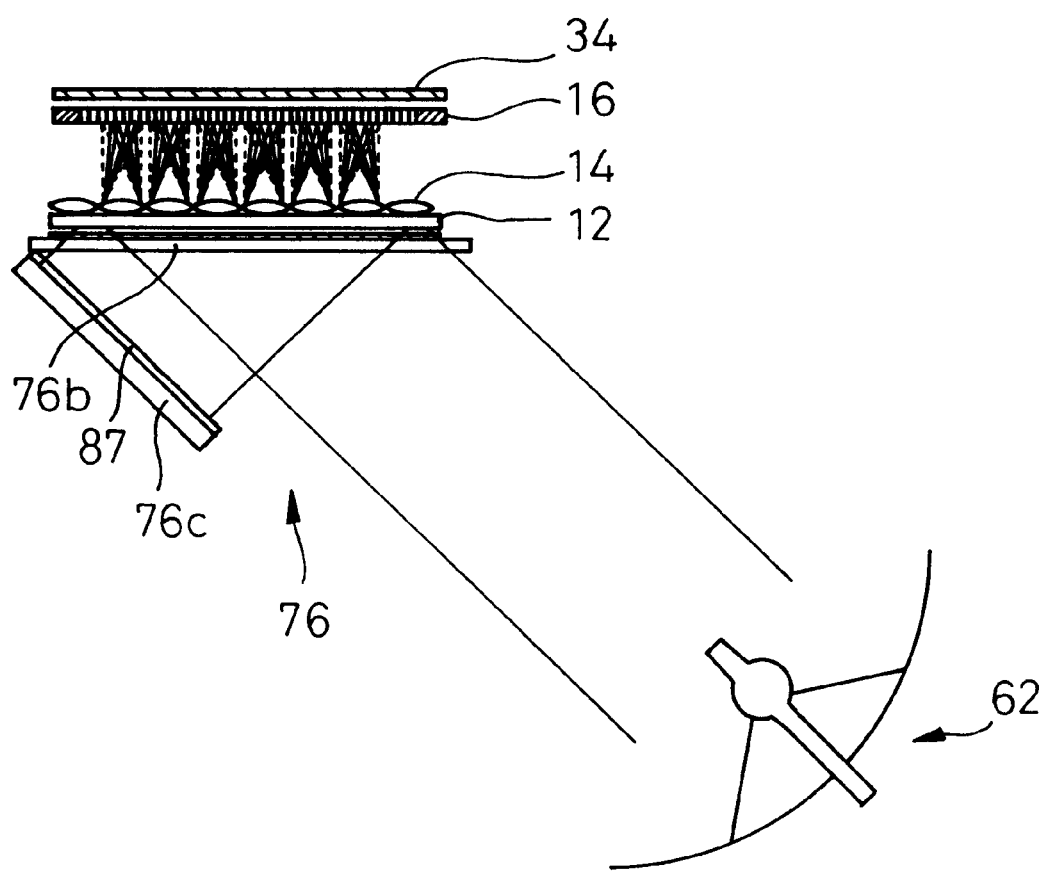
FIG. 60 is a view of a modified example of the polarization separating means.
Figure 61:
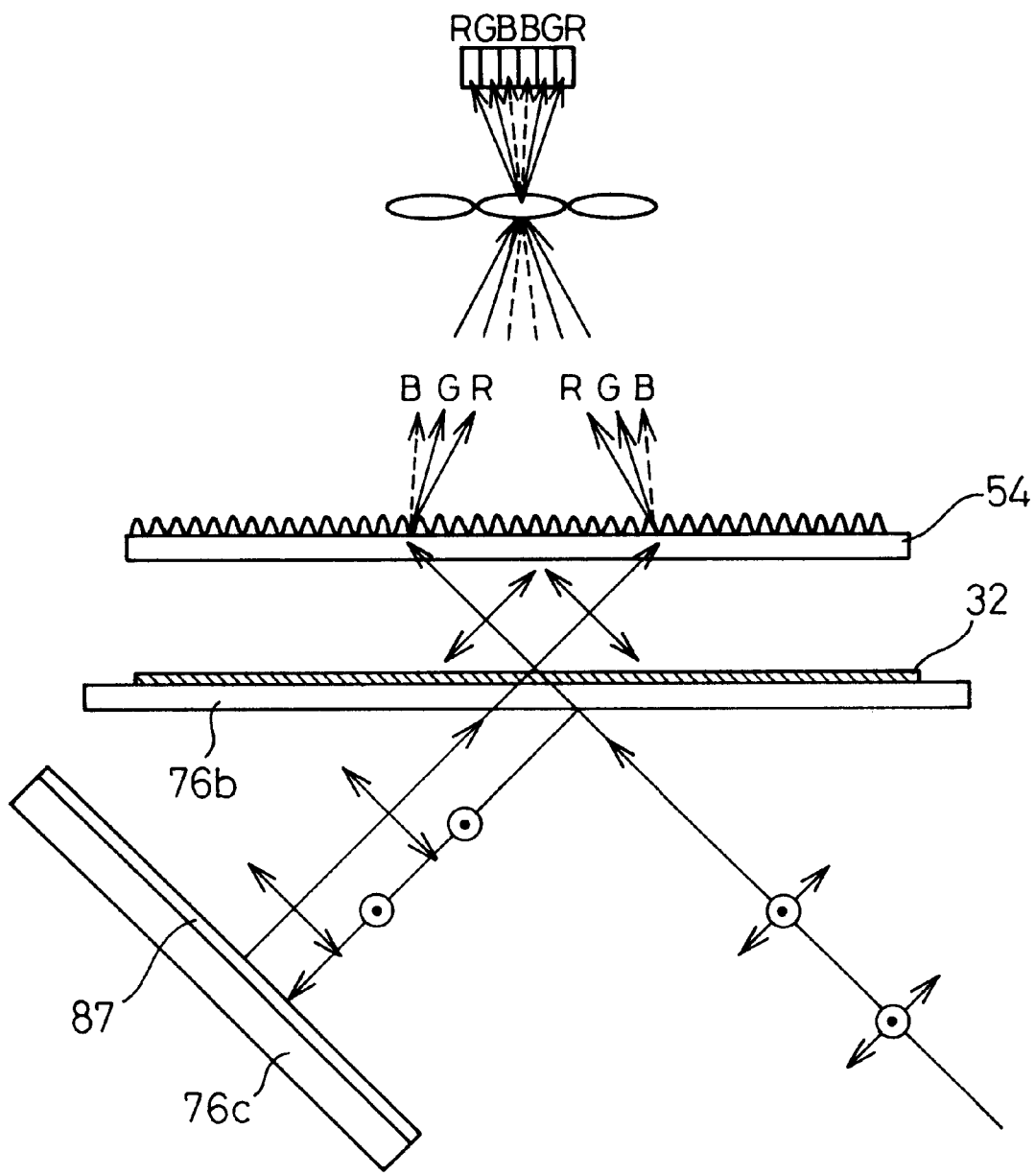
FIG. 61 is a partially enlarged view of the polarization separating means of FIG. 60.
Figure 62:
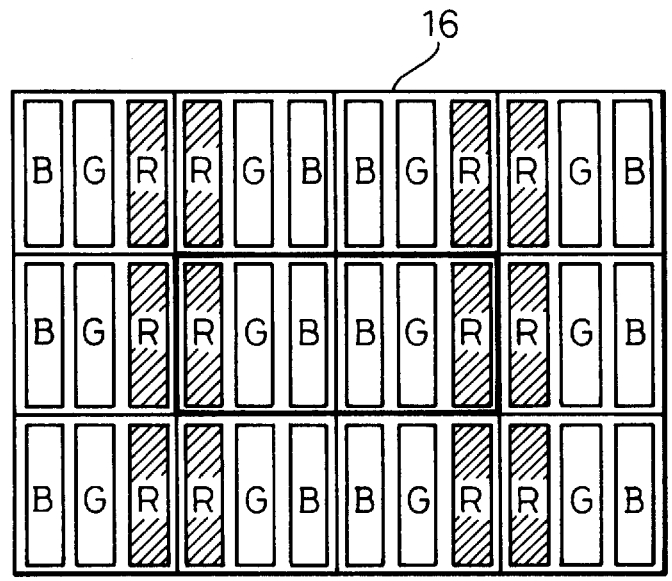
FIG. 62 is a view of the arrangement of the picture elements of FIG. 60.

FIGS. 60 and 61 show an example in which the separated P- and S-polarized lights are converted again into the identical polarized light. FIG. 62 shows the arrangement of the picture elements of this case. The display device in this case comprises a light source 62, a polarization separating means 76, a diffraction grating member 54, an array of micro-lenses 14, a liquid crystal panel 16, and an analyzer 34. The polarization separating device 76 comprises a polarization separating film 76b for separating a polarized light into a P-polarized light and an S-polarized light by transmission and reflection, a reflection mirror 76c for reflecting the polarized light which passes through or reflected by the polarization separating film 76b, and a polarization converting means 87 (phase film or 1/4 wavelength plate).

Similar to the case of FIG. 36, the P-polarized light passes through the polarization separating film 76b toward the diffraction grating member 54, and the S-polarized light is reflected by the polarization separating film 76b and by the reflection mirror 76c. However, in this case, the S-polarized light is converted into the P-polarized light by the polarization converting means 87 and travels toward the diffraction grating member 54. By this feature, all the light components are used as the P-polarized light which can be made incident to the diffraction grating member 54 and the liquid crystal panel 16, without the reversal of the driving voltage.

Figure 63:
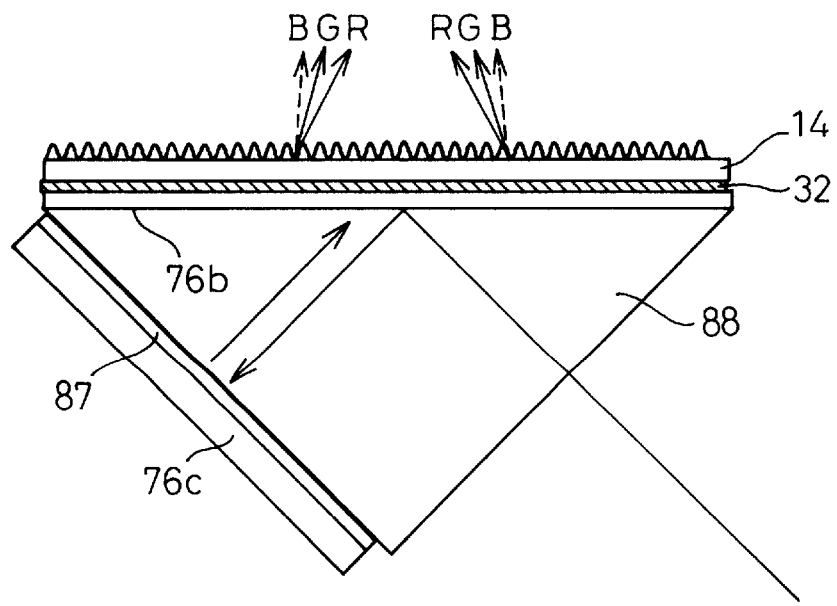
FIG. 63 is a view of an example of the polarization separating means modified from that of FIG. 61.

FIG. 63 shows an example in which the polarization separating film 76b, the reflection mirror 76c and the polarization converting means 87 are attached to a wedge-shaped common transparent prism 88.

Figure 64:
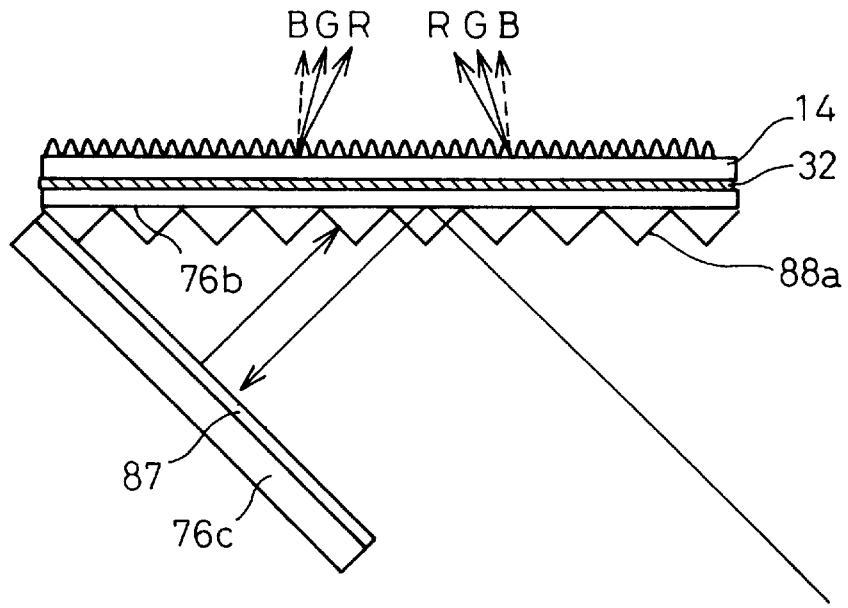
FIG. 64 is a view of another example of the polarization separating means modified from that of FIG. 61.

FIG. 64 shows an example in which the polarization separating film 76b, the reflection mirror 76c and the polarization converting means 87 are attached to a wedge-shaped common transparent prism array 88a.

Figure 65:
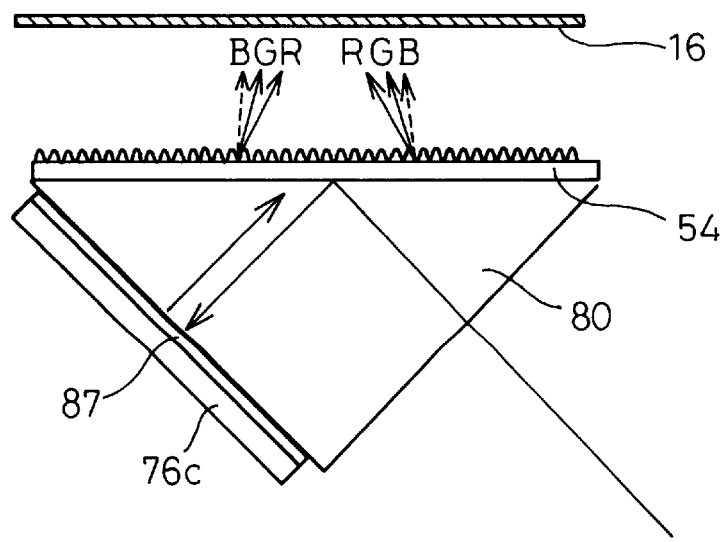
FIG. 65 is a view of an example in which the diffraction grating member having a greater polarization characteristic is used as a polarization separating means.
Figure 66:
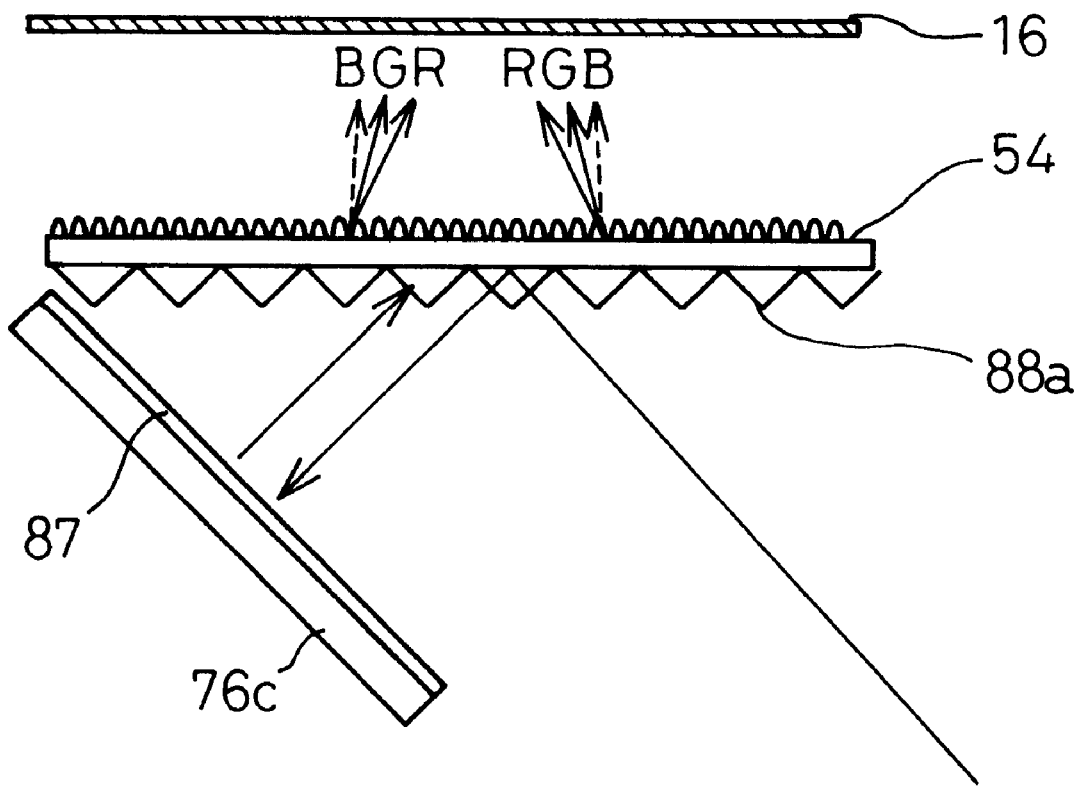
FIG. 66 is a view of another example in which a diffraction grating member having a greater polarization characteristic is used as a polarization separating means.

FIGS. 65 and 66 show an example in which the diffraction grating member (or diffraction grating) 54 also has the function of the polarization separating film 76b. The diffraction grating member 54 has property of a greater polarization characteristic, so that it can perform the diffraction function and the polarization separating function of the polarization separating film 76b. In this case, the diffraction grating member 54 has property that the S-polarized light passes therethrough and is diffracted, and the P-polarized light and the diffracted light of the zeroth order is reflected. The P-polarized light reflected by the diffraction grating member 54 is reflected by the reflection mirror 76c and converted into the S-polarized light by the polarization converting means 87. The S-polarized light then travels to the diffraction grating member 54 and passes through the diffraction grating member 54 while being diffracted thereby. The diffracted light of the zeroth order reflected by the diffraction grating member 54 is again reflected by the diffraction grating member 54 and does not enter the diffraction grating member 54. Therefore, it is possible to prevent the reduction of the contrast caused by the diffracted light of the zeroth order which is not used. If the display device is arranged such that the S-polarized light is reflected by the polarization separating film 76b or by the diffraction grating member 54, a portion of the S-polarized light can pass therethrough. In this case, if the display device is arranged such that the S-polarized light is made incident to the polarization separating film 76b or to the diffraction grating member 54 at the Brewster's angle, it is possible that the S-polarized light is entirely reflected.

FIGS. 67A to 69B show examples of further arrangement of the picture elements and the driving voltages.

Figure 67A:
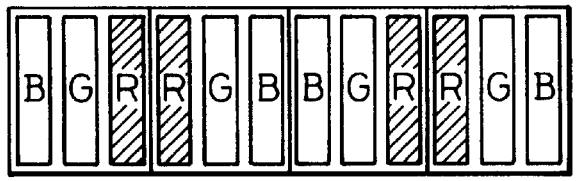
FIG. 67A is a view of another arrangement of the display dots.
Figure 67B:
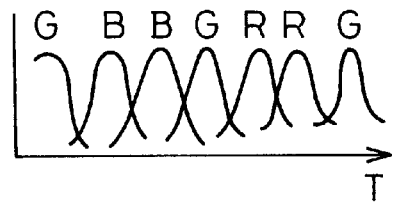
FIG. 67B is a view illustrating the relationship of transmission and voltage for the display dots of FIG. 67A.
Figure 68A:
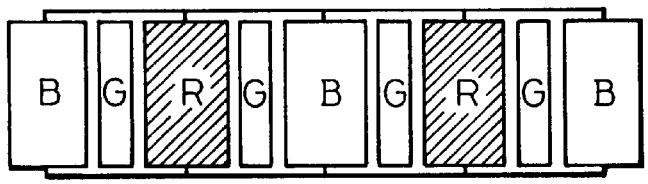
FIG. 68A is a view of a further arrangement of the display dots.
Figure 68B:
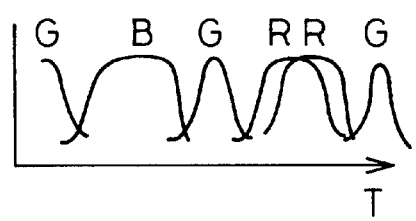
FIG. 68B is a view illustrating the relationship of transmission and voltage for the display dots of FIG. 68A.

In FIGS. 67A and 67B, the display dots are arranged in a row as a unit of (RGBBGR). Therefore, two "R"s and two "G"s are in succession. In FIGS. 68A and 68B, two successive "R"s and "G"s of FIGS. 67A and 67B are merged to respective one larger display dots, and these display dots are driven as one display dot or two display dots.

Figure 69A:
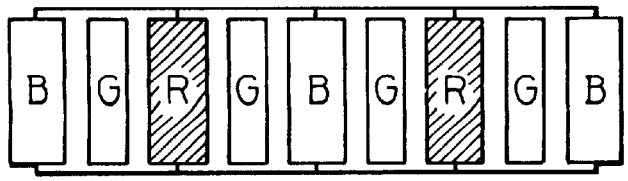
FIG. 69A is a view of a further arrangement of the display dots.
Figure 69B:
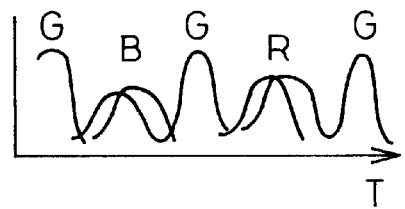
FIG. 69B is a view illustrating the relationship of transmission and voltage for the display dots of FIG. 69A.

In FIGS. 69A and 69B, the display dots R and G corresponding to two display dots have an area smaller than that of two dots, so that the display dot G is relatively larger. In addition, the driving voltage for the display dot G is higher than that of the display dots R and B, so that the green display is more intense than the remaining display dots.

FURTHER FEATURE 3

Figure 70:
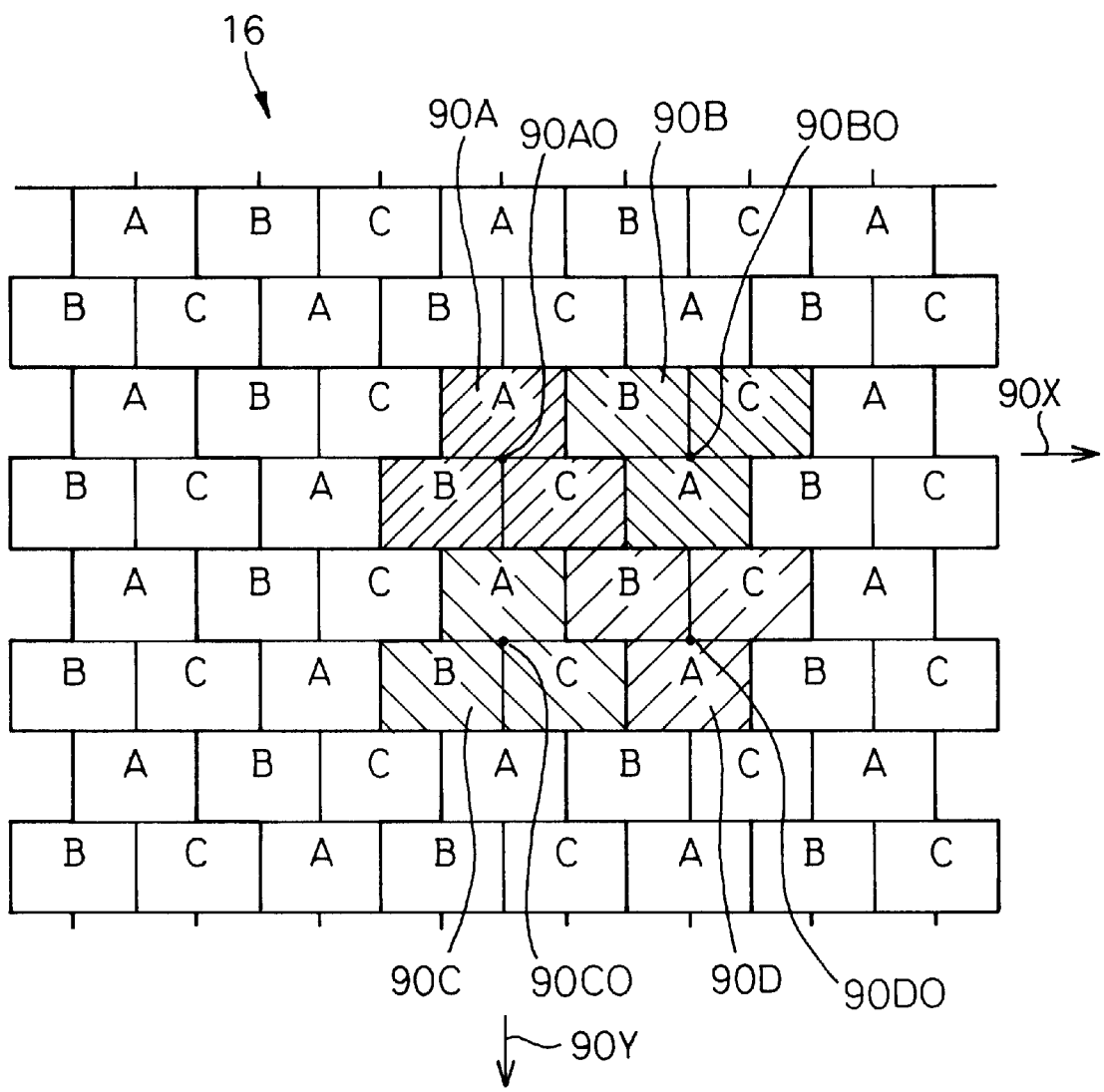
FIG. 70 is a view of the arrangement of the display elements with the display dots according to the ninth embodiment of the present invention.
Figure 71:
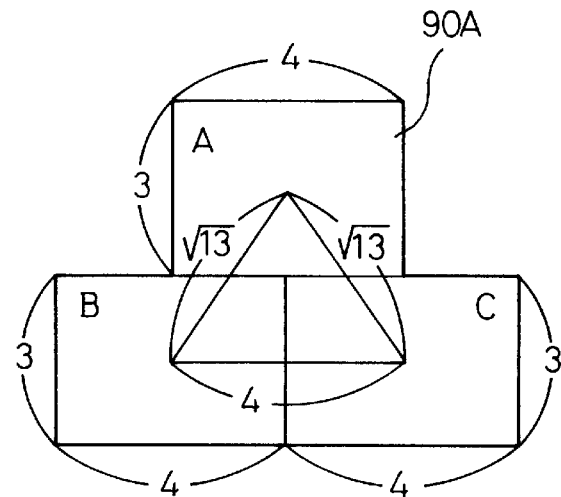
FIG. 71 is a view of one of the picture elements of FIG. 70.
Figure 72:
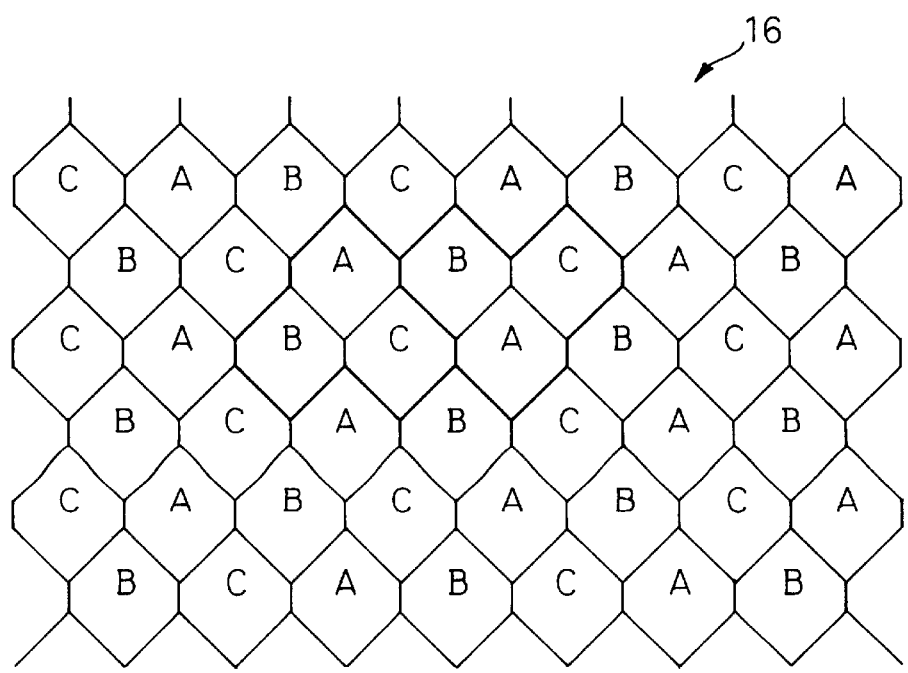
FIG. 72 is a view of an example of the picture element arrangement modified from that of FIG. 70.

FIGS. 70 to 72 show a further feature of the present invention. FIGS. 70 to 72 show the feature of the arrangement of the display dots of the liquid crystal panel 16.

The image is formed by a plurality of picture elements, and each picture element is formed by "R", "G" and "B" display dots. That is, the smallest unit for forming the image is the display dot. Conventionally, the display dots are arranged in an in-line disposition or a delta disposition. In the case of the in-line disposition, if the picture element has a square shape, each display dot has a rectangular shape having a vertical side and a horizontal side with the ratio of the long side to the short side being 3:1. Therefore, the display dot has an extremely elongated shape, so that the diffraction phenomena occurs remarkably and problems occur in the direction of distribution of light, the uneven intensity of distribution of light, color changes, a glaring display and so on. In addition, the available width of the short side of the display dot becomes smaller since the TFTs or the like must also be included.

In the case of the delta disposition of the display dots, since each display dot can be formed in a square shape or a shape close to a square shape, it is possible to solve the above described problems which arise from an elongated display dot. However, conventionally, in the case of the delta disposition of the display dots, since the picture elements are also arranged in a delta disposition, so that the adjacent two picture elements are obliquely contiguous, it is not possible to draw linear lines in the mutually perpendicular directions. It is possible to draw linear lines having the width corresponding to a plurality of picture elements, but definition of the image is reduced to one half or lower.

In the disposition of the picture elements of the embodiment of the present invention shown in FIG. 70, the liquid crystal panel 16 comprises a plurality of picture elements 90A, 90B, 90C, and 90D, and each picture element is formed by three display dots A, B and C. These display dots A, B and C correspond to any combination of the above described "R", "G" and "B" display dots 26r, 26g and 26b. The display dots A, B and C of each picture element are arranged in a delta disposition. That is, segments connecting the centers of the three display dots A, B and C or the centers of apertures of the three display dots A, B and C form a triangle. In addition, a disposition of triangles formed of segments connecting the centers of the three display dots A, B and C or the centers of apertures of the three display dots A, B and C is a tetragonal disposition in which triangles are arranged at constant pitches in the mutually perpendicular first direction 90Y and second direction 90X. That is, the points 90AO, 90BO, 90CO and 90DO which are deemed to be the centers of four picture elements form a square shape.

In particular, regarding the first direction 90Y, triangles which are symmetrically shaped with respect to a line passing through the centers of the triangles of the respective picture elements or points near the centers and extending in the first direction 90X are arranged and, regarding the second direction 90X, triangles which are mirror images with respect to a line passing through the centers of the triangles of the respective picture elements or points near the centers and extending in the second direction 90X. Also, three display dots A, B and C constituting one picture element are three different kind of display dots. Regarding the first direction 90Y, picture elements having display dots in the identical dispositions are arranged. Regarding the second direction 90X, picture elements having display dots in the dispositions in which the adjacent picture elements are rotated by 180 degrees with respect to each other and are mirror images with respect to a line passing through the centers of the respective picture or points near the centers and extending in the second direction 90X.

In other word, three display dots A, B and C contact each other along the long side of the display dot A. In the vertical direction, the picture elements having the identical triangles in which the display dot A is arranged at the top or bottom of the triangle are arranged, and in the horizontal direction, a picture element in which the display dot A is arranged at the top thereof and a picture element in which the display dot A is arranged at the bottom thereof, are alternatingly arranged.

With this arrangement, it is possible to form the display dots in such a shape that the display dots are not narrowed in a particular direction and as close to a square as possible, and to arrange the picture elements at high density. Therefore, it is possible to form a clearer image with high definition. Also, it is possible to draw linear lines in the mutually perpendicular directions.

In addition, this arrangement of the picture elements can be applied to a display device carrying out color separation and polarization separation, a display device carrying out color separation only, or a display device not carrying out color separation or polarization separation. However, when carrying out color separation by the diffraction grating, since the three color display dots can be arranged at positions closer to each other when measured on a line, it is possible to carry out clearer color separation even if the color separation angle is small. In addition, it is also possible to use this arrangement of the picture elements in a projection type display device.

Preferably, as shown in FIG. 71, one display dot A, B or C has a rectangular shape having a first side parallel to the first direction and a second side parallel to the second direction with the ratio of the length of the first side to the length of the second side being generally 3:4, and the segments connecting the centers of apertures forming the display dots of the picture element form an isosceles triangle with the ratio of the segments being $4:\sqrt{13}:\sqrt{13}$. In this case, the distance between the central points 90AO, 90BO, 90CO and 90DO of the respective picture elements A, B, C and D is 6. Therefore, in order to make a tetragonal disposition, the ratio of the length of the long side and that of the short side of each display dot should satisfy a certain condition.

As an actual example, in a SVGA (800×600 picture elements) display device having a diagonal dimension of 3.5 inch and an aspect ratio of 4:3, each rectangular display dot has the size of 29.7×44.4 μm. Also, in an XGA (1024×768 picture elements) display device having a diagonal dimension of 3.5 inch and an aspect ratio of 4:3, each rectangular display dot has the size of 23.2×34.7 μm.

FIG. 72 shows an example in which the display dots have hexagonal shapes having three pairs of parallel sides. In this case too, the segments connecting the centers of the display dots of the picture element or the segments connecting the centers of apertures forming the display dots of the picture element form an isosceles triangle with the ratio of the segments being generally $4:\sqrt{13}:\sqrt{13}$. By arranging in this way, the display dots A, B and C become more and more close to circles, i.e., to the shape of the micro-lenses.

FURTHER FEATURE 4

FIGS. 73 to 90 show a further feature of the present invention. FIGS. 73 to 90 show the feature of the arrangement of the picture elements and bus lines in the display panel having the diffraction grating 12 or 52 or the diffraction grating member 54. The display dots 26r, 26g and 26b are formed as apertures in the black matrix (shading layer) 92.

Figure 73:
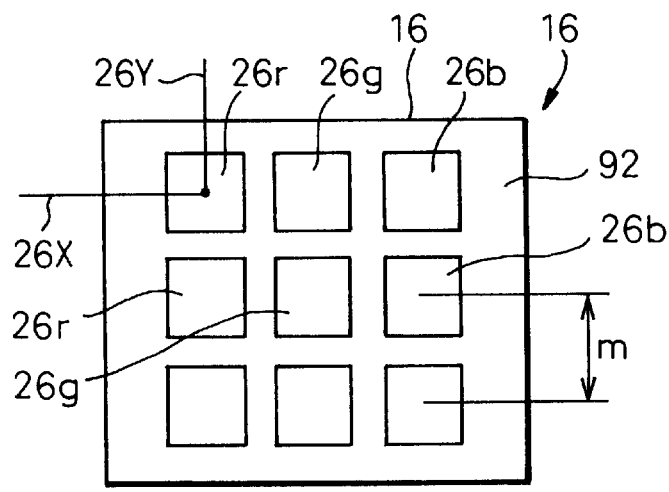
FIG. 73 is a view of the arrangement of the picture elements according to the tenth embodiment of the present invention.

The liquid crystal panel 16 includes a plurality of display dots 26r, 26g and 26b which are identically shaped to each other. The shape of one display dot is symmetrical with respect to first and second mutually perpendicular lines 26Y and 26X passing through the center of said one display dot. In FIG. 73, the display dots are arranged in a stripe arrangement, but it is possible to arrange the display dots in a delta arrangement, as described later.

Figure 20:
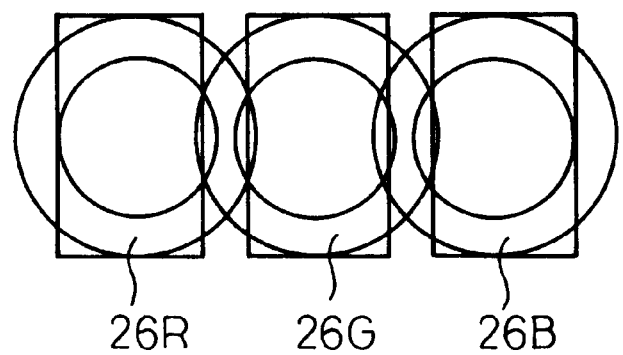
FIG. 20 is a view of the picture electrodes of FIG. 17, with the diffracted light made incident to the picture electrodes.
Figure 74:
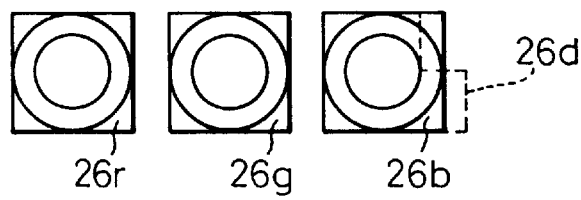
FIG. 74 is a view of the display dots in one picture element and the diffracted light of the first order made incident to the former.

FIG. 74 is a view similar to FIG. 20. In the display device having the diffraction grating member 54, color light components are made incident to the display dots 26r, 26g and 26b in concentric patterns in which red, green and blue light components are arranged in the centers of the pattern, respectively. Therefore, it is possible to most effectively introduce respective color light components emerging from the diffraction grating member 54 into the respective display dots 26r, 26g and 26b, by arranging such that the display dots 26r, 26g and 26b are identically shaped to each other, and the shape of one display dot is symmetrical with respect to the first and second mutually perpendicular lines 26Y and 26X passing through the center of said one display dot.

If the display dot has a zigzag shape, as shown by the broken line, an undesirable surplus wavelength component is made incident to the portion which is outside the display dots 26r, 26g and 26b having the above described shape, and in contrary, a necessary wavelength component is not made incident to the portion which is inside the display dots 26r, 26g and 26b having the above described shape. Therefore, it is possible to obtain an image having a designed white purity and without uneven color distribution.

In addition, the distance "m" between two vertically adjacent display dots 26r, 26g and 26b is constant. By this feature, it is possible to constantly arrange the micro-lenses of the array of the micro-lenses 14 and to provide positioning margins between the diffraction grating member 54 and the liquid crystal panel 16, so color does not change even if there is a small positioning error.

FIGS. 75 to 78 show examples of the display dots 26r, 26g and 26b satisfying the above described feature.

Figure 75:
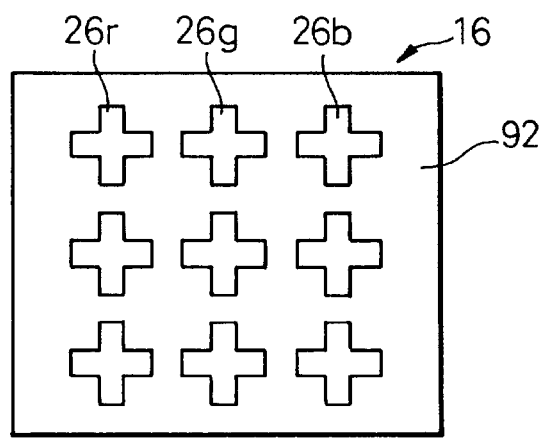
FIG. 75 is a view of a further example of the display dots.

In FIG. 75, the display dots 26r, 26g and 26b are formed in a cross shape.

Figure 76:
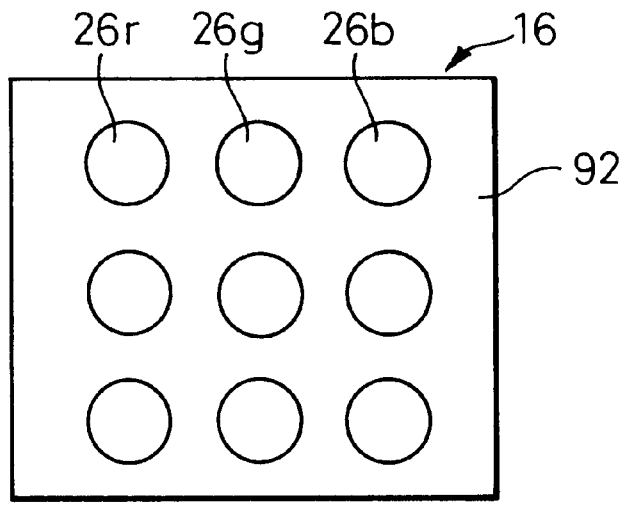
FIG. 76 is a view of a further example of the display dots.

In FIG. 76, the display dots 26r, 26g and 26b are formed in a circular shape.

Figure 77:
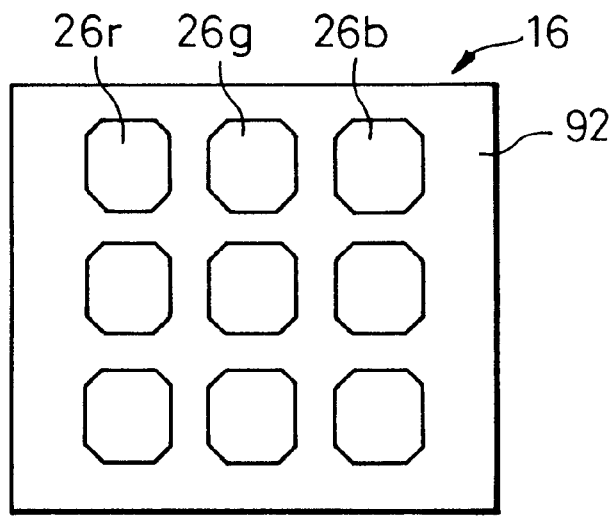
FIG. 77 is a view of a further example of the display dots.

In FIG. 77, the display dots 26r, 26g and 26b are formed in an octagonal shape.

Figure 78:
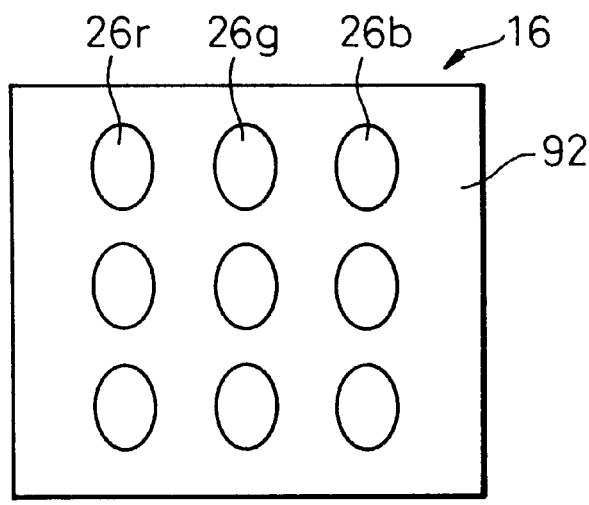
FIG. 78 is a view of a further example of the display dots.

In FIG. 78, the display dots 26r, 26g and 26b are formed in an ellipse shape.

In addition, the display dots 26r, 26g and 26b of FIGS. 75 to 78, the shape of the display dot 26r, 26g and 26b is such that a first (central) portion of the display dot located on a line extending perpendicular to the color separating direction (horizontal direction) and passing through the center of the display dot is greater than outer portions of the display dot located outside the first portion.

Figure 79:
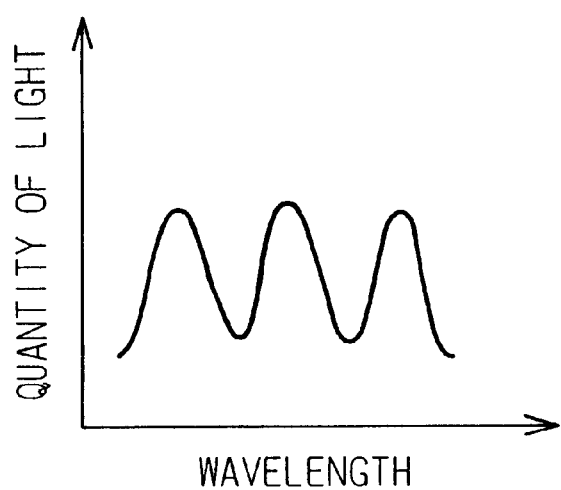
FIG. 79 is a view illustrating the relationship of quantity of light and the wavelength of the light.

As shown in FIG. 79, the light travelling from the diffraction grating member 54 into the liquid crystal panel 16 has a wavelength distribution having peaks for red, green and blue components. Therefore, it is desirable to enlarge the size of the apertures so that a lot of light can be introduced at the peaks for red, green and blue components.

Figure 80:
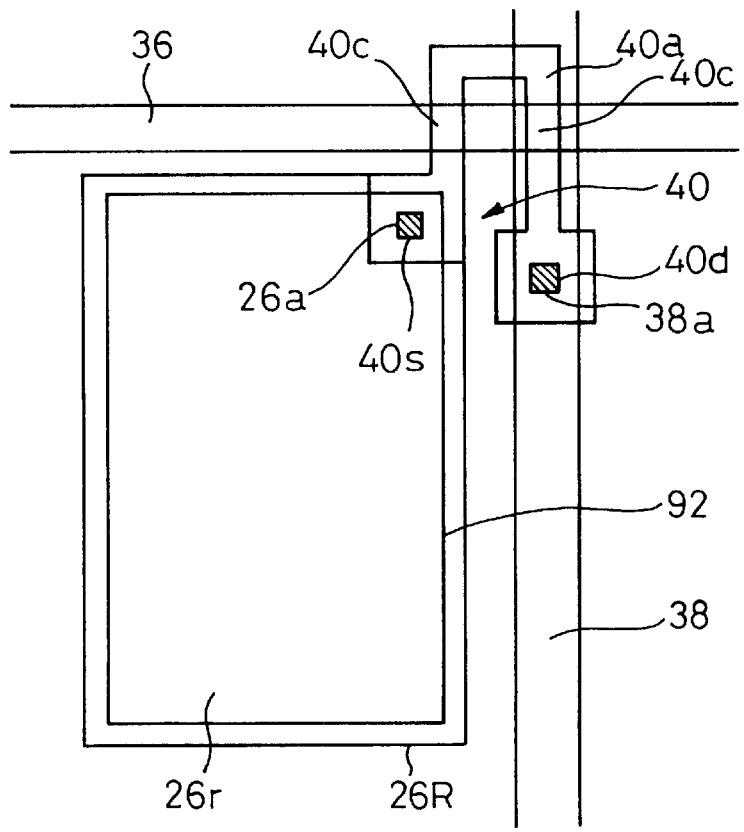
FIG. 80 is a view of an example of the TFT made from polysilicon.
Figure 81:
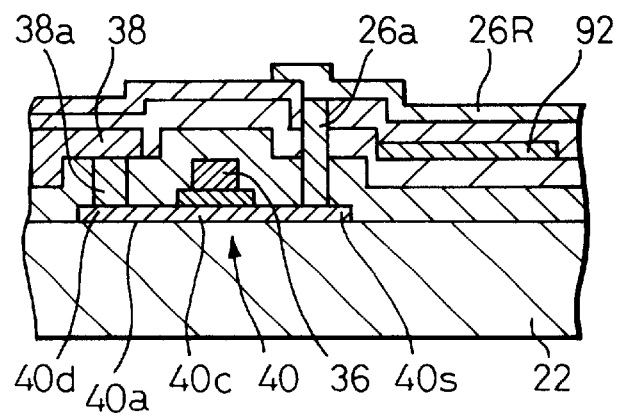
FIG. 81 is a cross-sectional view of the TFT of FIG. 80.

FIGS. 80 and 81 show an active matrix structure having thin film transistors (TFTs) 40, gate bus lines 36 and data bus lines 38. In this example, the operating semiconductor of TFTs 40, the drain electrodes and the source electrodes are formed from polysilicon. That is, the TFT 40 has a layer 40a of polysilicon, and a portion 40c of this layer 40a of polysilicon overlapping with the gate bus line 36 via an insulating layer is an operative semiconductor, i.e., a channel of the TFT 40. There are two channels. The layer 40a of polysilicon has a portion 40d overlapping with the data bus line 38 via an insulating layer, and this portion 40d is connected to the data bus line 38 by a through hole 38a, forming the drain electrode. The layer 40a of polysilicon has a portion 40s overlapping with the display dot 26r via an insulating layer, and this portion 40s is connected to the display dot 26r by a through hole 26a, forming the source electrode. The black matrix 92 is formed on the substrate plate on which the display dot 26r is arranged.

Polysilicon is adapted for fabricating a high definition display device since polysilicon makes it possible to form smaller TFTs 40 relative to the display dots 26r, 26g and 26b. In addition, the portion of the display electrode covered by polysilicon is not shaded since polysilicon is transparent. Therefore, the display dot 26r is defined only by the aperture of the black matrix 92, which has a rectangular shape. In FIGS. 80 and 81, the display electrode 26R is also shown.

Figure 82:
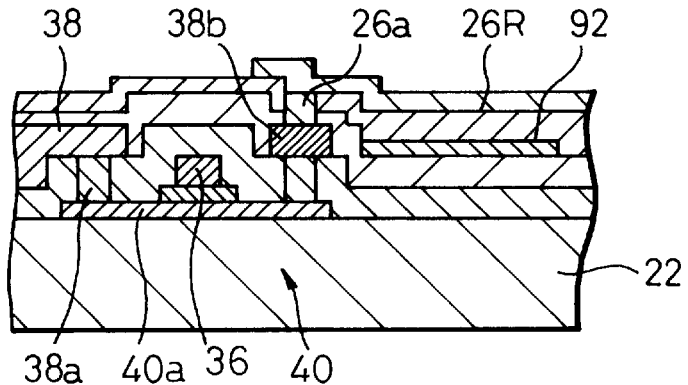
FIG. 82 is a view of an example of the TFT modified from that of FIG. 81.

FIG. 82 shows an arrangement similar to that of FIG. 81. In FIG. 82, if the display electrode is directly connected to polysilicon, the display electrode may be broken and a defect arises in the display, since the thickness (=~1000 Å) of the display electrode is small relative to the length (=~approximately 10000 Å) of the through hole 26a connecting the display dot 26r to the source electrode. Therefore, it is advisable that a lower half portion of the through hole 26a is made of the material 38b of the data bus line 38, as shown in FIG. 92. In this case, a portion of the through hole 26a in FIG. 80 is covered by a shading layer since the material 38b of the data bus line 38 has a light shading property.

Figure 83:
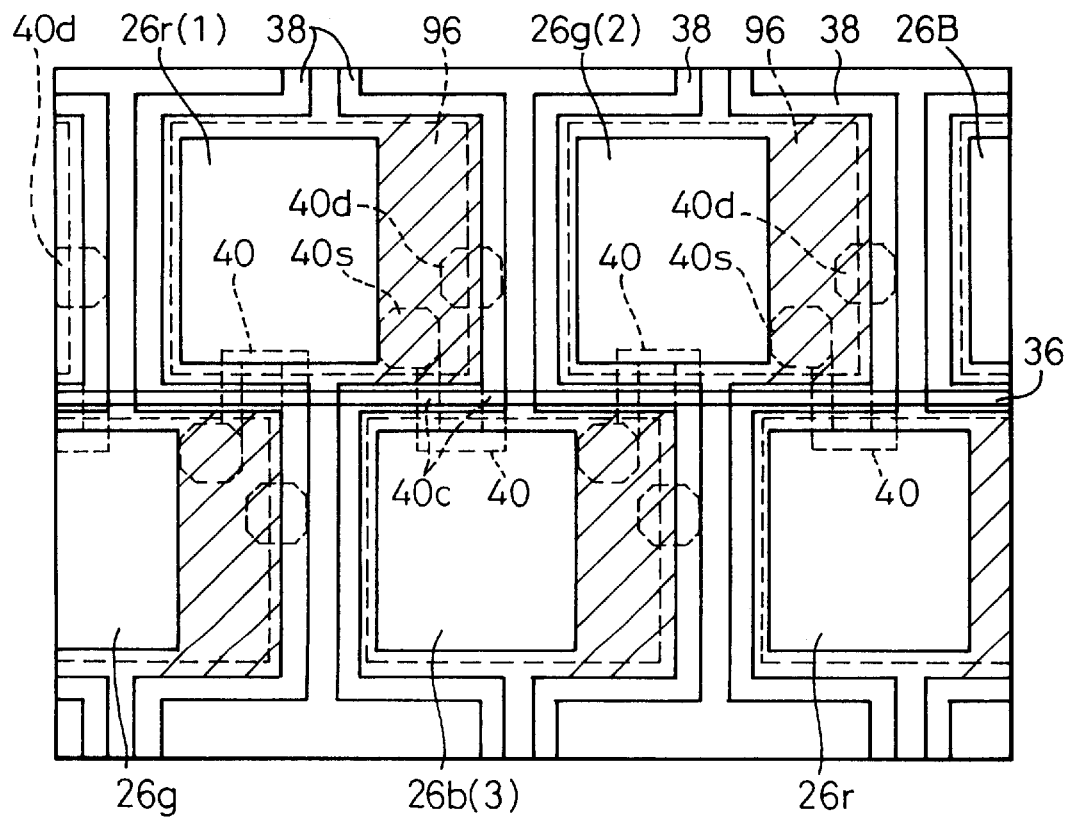
FIG. 83 is a view of an example of the TFT having one gate bus line and three data bus lines for one picture element.

In this case, a shading layer 96 is arranged on the opposite substrate plate, as shown in FIG. 83, so that the shading layer 96 and the black matrix 92 on the side of the TFT substrate plate together work as a shading layer having apertures defining the display dots 26r, 26g and 26b.

In addition, in FIG. 83, the gate bus lines 36 and the data bus lines 38 are bent to partially surround the display dots 26r, 26g and 26b.

In addition, the display dots 26r, 26g and 26b are arranged in the delta disposition, and there are one gate bus line 36 and three data bus lines 38 for each picture element. Regarding three display dots 26r, 26g and 26b arranged in the reverse Δ disposition and appearing at the center of FIG. 83, the data bus line 38 extending along the right side of the left upper display dot 26r(1) is connected to that display dot 26r(1), the data bus line 38 extending along the left side of the right upper display dot 26g(2) is connected to the display dot 26b(3) below the right upper display dot 26g(2), and the data bus line 38 extending along the right side of the right upper display dot 26g(2) is connected to that display dot 26g(2). In this way, it is possible to minimize the area occupied by the gate bus line 36 and the data bus lines 38 and to form the display dots 26r, 26g and 26b in a rectangular shape which is close to a square shape.

Figure 84:
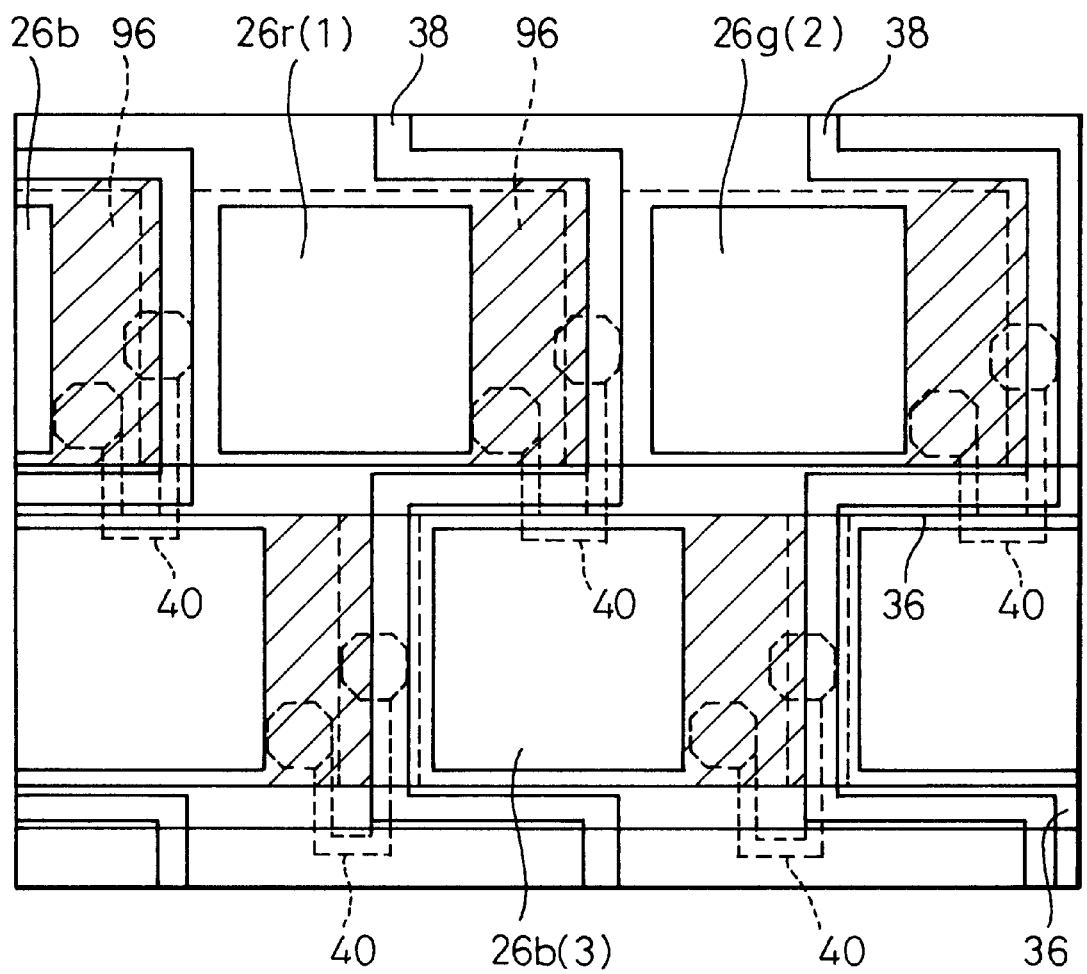
FIG. 84 is a view of an example of the TFT having two gate bus lines and two data bus lines for one picture element.

FIG. 84 shows an example similar to the arrangement of FIG. 83, but there are two gate bus lines 36 and two data bus lines 38 for each picture element. The data bus line 38 extending along the right side of the left upper display dot 26r(1) is connected to that display dot 26r(1), and the data bus line 38 extending along the right side of the right upper display dot 26g(2) is connected to that display dot 26g(2) and to the display dot 26b(3) below the right upper display dot 26g(2). The display dot 26b(3) is connected to the lower gate electrode 36 and the remaining two display dots 26g(2) and 26b(3) are connected to the upper gate electrode 36.

Figure 85:
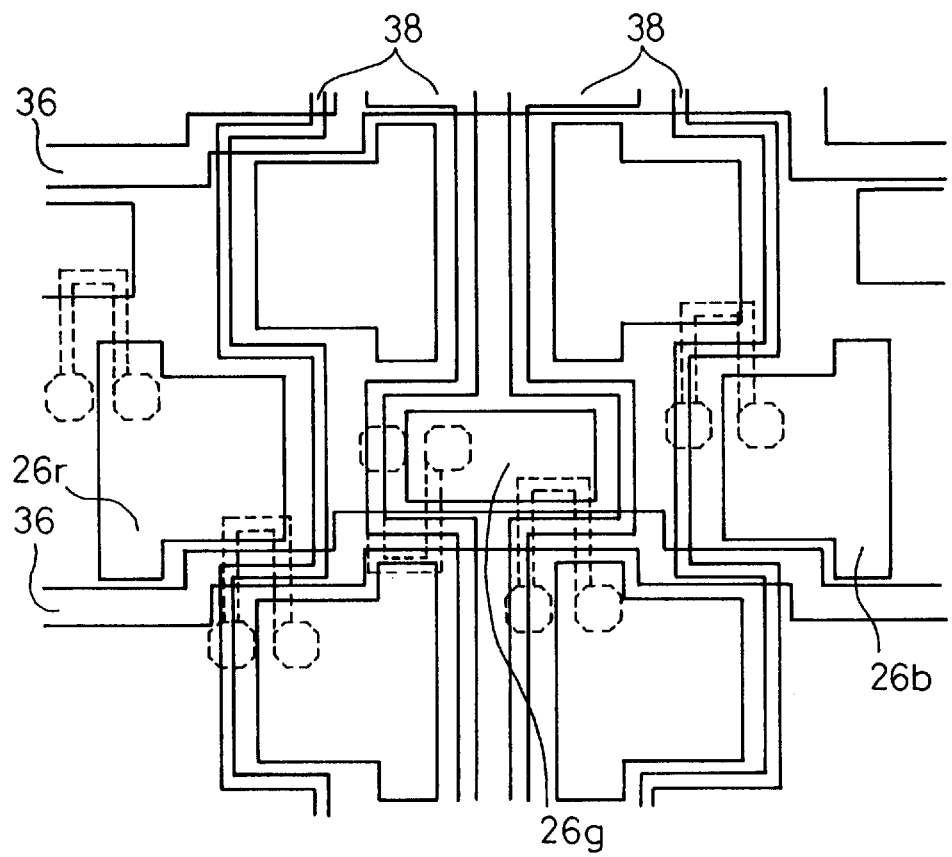
FIG. 85 is a view of an example of the TFT in which the green display dot is made smaller than the other display dots.

FIG. 85 shows an example in which one of three display dots has an aperture area smaller than that of the remaining display dots. In this embodiment, the size of the aperture area of the green display dot 26g is smaller than that of the red and blue display dots 26r and 26b. Also, in this embodiment, there are one gate bus line 36 and three data bus lines 38 for each picture element.

Figure 86:
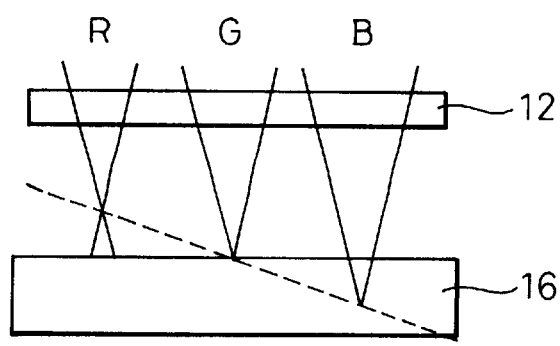
FIG. 86 is a view of the diffraction grating and the liquid crystal panel, illustrating that focal distances are different from each other.

As shown in FIG. 86, when the diffracted light of first order travels from the diffraction grating 12 to the liquid crystal panel 16, a blue light having a shorter wavelength component, a green light having an intermediate wavelength component, and a red light having a longer wavelength component travel the same distance from the same point, but the focal distances are different due to the difference in the wavelength, as shown by the broken line. Therefore, there are differences in the intensity of light and the condensing degree in the display dots 26r and 26b. Therefore, it may be preferable to arrange that the sizes of the aperture areas are changed for the respective display dots 26r and 26b and the red light is focused on the red display dot 26r, in order that the intensity of light and the condensing degree are equal to each other in all the display dots 26r, 26g and 26b.

Figure 87:
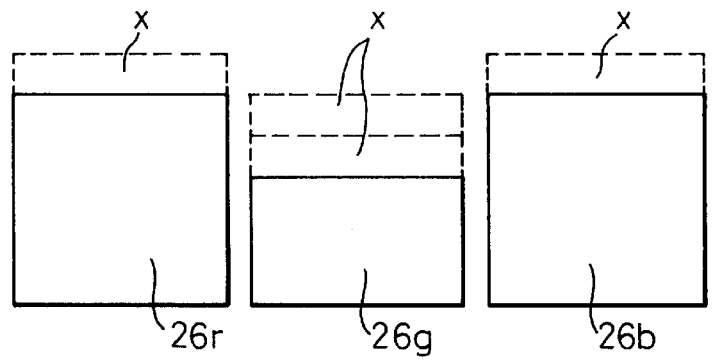
FIG. 87 is a view of an example of the TFT in which the green display dot is made smaller than the other display dots.

In FIG. 87, the green display dot 26g is the smallest and the bottoms of all the display dots 26r, 26g and 26b are in line.

Figure 88:
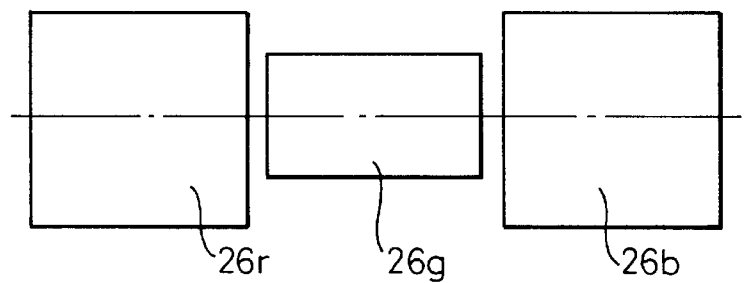
FIG. 88 is a view of an example of the TFT in which the green display dot is made smaller than the other display dots.

In FIG. 88, the green display dot 26g is the smallest and the centers of all the display dots 26r, 26g and 26b are in line.

Figure 89:
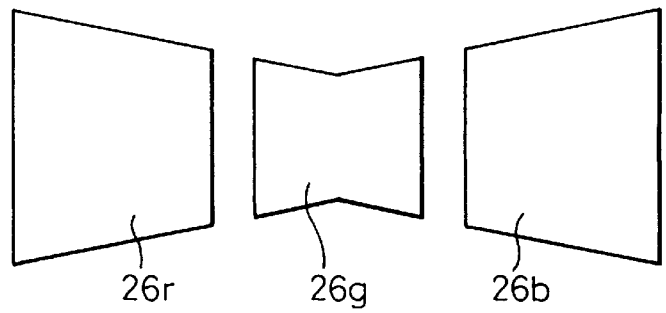
FIG. 89 is a view of an example of the TFT in which the green display dot is made smaller than the other display dots.

In FIG. 89, the green display dot 26g is the smallest and the shapes of the display dots 26r, 26g and 26b become smaller from the outer one to the inner one.

In FIG. 87, the ratio of the aperture area of the smallest display dot 26g to the aperture area of the greatest display dot is (1−2x) to (1+x), where "x" is a real number. That is, all the display dots 26r, 26g and 26b are initially formed in the identical size, and "2x" is taken from the green display dot 26g and "x" is added to each of the remaining display dots 26r and 26b. For example, in the arrangement of FIG. 85, the ratio of the aperture area of the smallest display dot 26g to the aperture area of the remaining display dots is 1:2.3.

Figure 90:
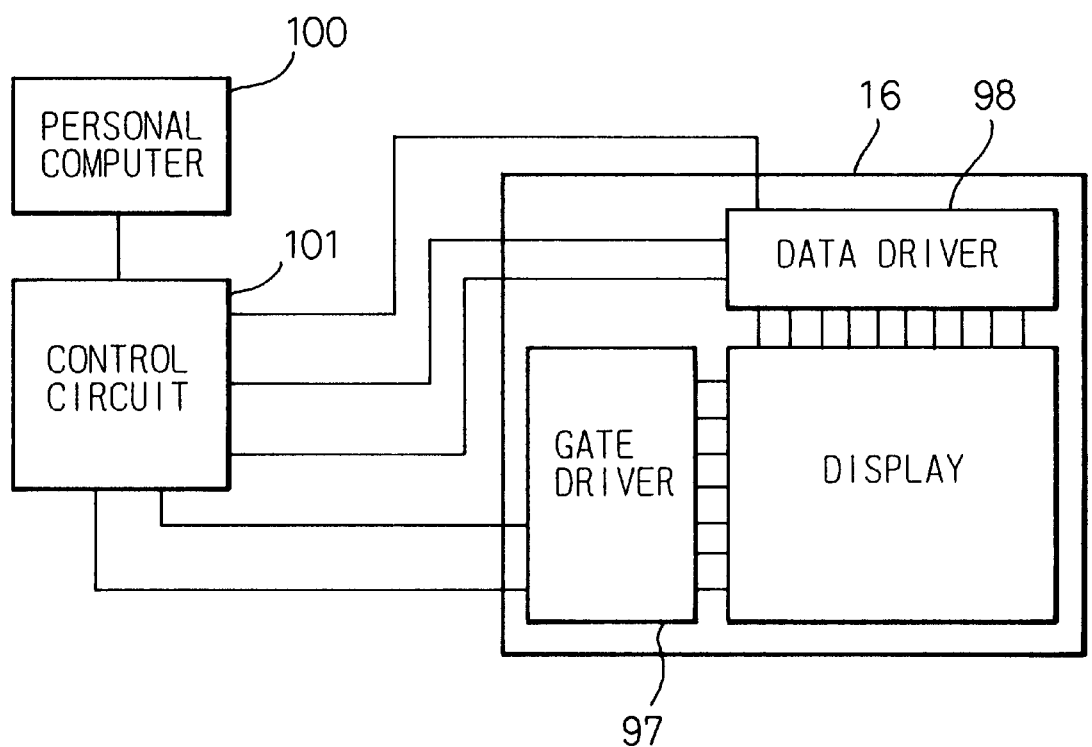
FIG. 90 is a view of the display device in which the gate driver and the data driver are arranged on the substrate plate of the liquid crystal panel.

FIG. 90 shows an example in which a gate driver 97 and a data driver 98 are formed with the active matrix structure on the substrate plate 22 of the liquid crystal panel 16. The gate driver 97 is connected to the gate bus lines 36 and the data driver 98 is connected to the data bus lines 38. The gate driver 97 and the data driver 98 are controlled by a control circuit 101 of a personal computer 100.

As explained in greater detail, according to the present invention, it is possible to realize a high definition and high quality color display with a wide viewing angle, by producing a color display using a diffraction grating which separates a light into different colors and which enables the display dots to be arranged at a uniform pitch, so that the diffracted light of the zeroth order is directed out of the field of vision, the diffracted light of the zeroth order is used as a displaying light, or the diffracted light of the zeroth order is shaded.

We claim:

1. A projection type display device comprising:
   a light source;
   an optical device having an aperture for converting beams of light emerging from said light source into parallel beams, said aperture having a non-circular shape and mutually perpendicular long and short axis directions;
   a diffraction grating member arranged to receive the light passing through said optical device;
   a light valve arranged to receive the light passing through the diffraction grating member to modulate the light to form an image; and
   a projection lens for projecting the image formed by the light valve;
   wherein said optical device is arranged so that said short axis direction of said aperture is generally parallel to a color separating plane of said diffraction grating member.

2. A projection type display device according to claim 1, wherein the light valve comprises a liquid crystal panel and further comprising a polarizer arranged between the optical device and the diffraction grating member and an analyzer arranged between the liquid crystal panel and the projection lens.

3. A projection type display device according to claim 2, wherein the polarizer is arranged so that a P-polarized light or an S-polarized light is made incident to the diffraction grating member.

4. A projection type display device according to claim 2, wherein the analyzer comprises a polarizer plate with an anti-reflection coating and is adhered to a substrate of the liquid crystal panel on the light exit side.

5. A projection type display device according to claim 2, wherein the analyzer is arranged so that the emerging light is a P-polarized light at the emerging interface of the analyzer.

6. A projection type display device according to claim 5, wherein the analyzer is arranged so that the light is made incident to the emerging interface of the analyzer at the Brewster's angle.

7. A projection type display device according to claim 2, wherein the analyzer is adhered to a substrate plate of the liquid crystal panel on the light exit side, and a phase plate is adhered to the analyzer.

8. A projection type display device according to claim 1, wherein the optical device is arranged so that the long axis direction of the aperture is generally parallel to a longer side of a display dot.

9. A projection type display device according to claim 1, further comprising a polarization separating means for separating the light passing through the optical device into a P-polarized light and an S-polarized light, the P-polarized light and the S-polarized light forming a polarization separating angle ($\gamma$) therebetween.

10. A projection type display device according to claim 9, wherein the P-polarized light and the S-polarized light are made incident to different display dots in the light valve.

11. A projection type display device according to claim 9, further comprising a polarization converting means for converting one of the P-polarized light and the S-polarized light separated by the polarization separating means into the other polarized light, the non-converted polarized light and the converted polarized light being made incident to different display dots in the light valve.

12. A projection type display device according to claim 9, wherein at least one of the short axis direction of the aperture, a polarization separating direction of the polarization separating means and a color separating direction of the diffraction grating member is not parallel to the remaining ones.

13. A projection type display device according to claim 12, wherein the non-parallel arranged one of the directions is the direction having the greatest angle among an apparent field angle ($\alpha$) of the aperture, a polarization separating angle ($\gamma$) of the polarization separating means and a color separating angle of the diffracted grating member.

14. A projection type display device according to claim 13, wherein the short axis direction of the aperture is generally perpendicular to the polarization separating direction of the polarization separating means, and the polarization separating direction of the polarization separating means is generally parallel to the color separating plane of the diffraction grating member.

15. A projection type display device according to claim 1, wherein the optical device comprises an image extinguishing lens having said aperture and a collimating lens.

16. A projection type display device according to claim 15, further comprising a cut filter arranged in the image extinguishing lens for cutting a predetermined range of wavelength.

17. A projection type display device according to claim 1, further comprising a field lens arranged between the light valve and the projection lens.

18. A projection type display device according to claim 1, wherein the projection lens comprises an anamorphic lens in which its magnification changes in two mutually perpendicular directions.

19. A projection type display device according to claim 1, further comprising a shading layer provided for each unit region of the light valve.

* * * * *